United States Patent
Ohtake

Patent Number: 5,666,229
Date of Patent: Sep. 9, 1997

[54] VARIABLE FOCAL LENGTH OPTICAL SYSTEM

[75] Inventor: Motoyuki Ohtake, Ohmiya, Japan

[73] Assignee: Nikon Corporation, Tokyo, Japan

[21] Appl. No.: 503,338

[22] Filed: Jul. 17, 1995

Related U.S. Application Data

[63] Continuation-in-part of Ser. No. 272,329, Jul. 8, 1994, abandoned.

[30] Foreign Application Priority Data

| Jul. 12, 1993 | [JP] | Japan | 5-171494 |
| Jul. 22, 1993 | [JP] | Japan | 5-180533 |
| Nov. 29, 1993 | [JP] | Japan | 5-323284 |
| Nov. 29, 1993 | [JP] | Japan | 5-323285 |
| Mar. 15, 1994 | [JP] | Japan | 6-70033 |
| May 13, 1994 | [JP] | Japan | 6-124599 |
| Jul. 29, 1994 | [JP] | Japan | 6-197233 |

[51] Int. Cl.[6] .................................. G02B 15/14
[52] U.S. Cl. .............................. 359/683; 359/684
[58] Field of Search ........................ 359/683, 684

[56] References Cited

U.S. PATENT DOCUMENTS

| 5,042,927 | 8/1991 | Ogawa et al. | 359/683 |
| 5,126,883 | 6/1992 | Sato et al. | 359/683 |
| 5,241,421 | 8/1993 | Endo et al. | 359/684 |

Primary Examiner—Georgia Y. Epps
Assistant Examiner—Dawn-Marie Bey
Attorney, Agent, or Firm—Shapiro and Shapiro

[57] ABSTRACT

A variable focal length optical system includes, in order from an object side, a first lens group having a positive refractive power, a second lens group having a negative refractive power, a third lens group having a positive refractive power, a fourth lens group having a positive refractive power, and a fifth lens group having a negative refractive power. When the lens groups are moved from a wide-angle end to a telephoto end, at least the first lens group and the fifth lens group are moved toward the object side. In this case, the air gap along an optical axis between the first lens group and the second lens group, and the air gap along an optical axis between the third lens group and the fourth lens group are increased, respectively. At the same time, the air gap along an optical axis between the fourth lens group and the fifth lens group is decreased. In the variable focal length optical system, at least one lens group among the second to fourth lens groups carries out a focusing operation.

48 Claims, 24 Drawing Sheets

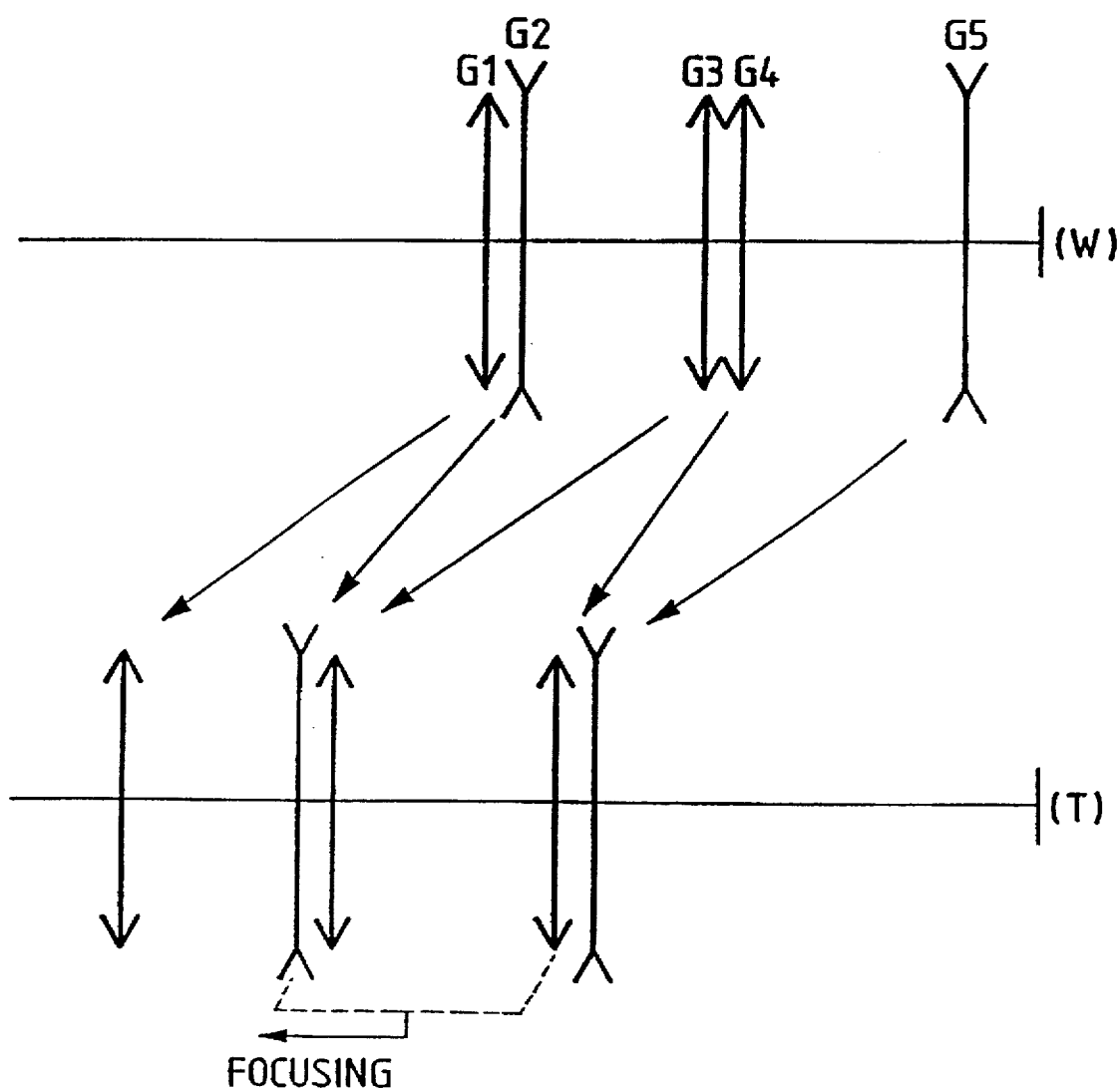

VARIABLE FOCAL LENGTH OPTICAL SYSTEM

CROSS-REFERENCE TO RELATED APPLICATION

This application is a continuation-in-part of application Ser. No. 08/272,329 filed Jul. 8, 1994 (abandoned).

BACKGROUND OF THE INVENTION

1. Field of the Invention

The present invention relates to a variable focal length optical system that is suitable for photographing lenses used for cameras.

2. Related Background Art

Recently, variable focal length optical systems are going mainstream as photographing lenses for lens shutter-type cameras. With sophisticated variable focal length optical systems, various types of variable focal length optical systems have been proposed. In recent years, the advance of technology on lens barrels allows proposing various variable focal length optical systems with great zoom ratio that use so called multiple variable focal length optical systems each of which is formed of at least three movable groups. Various proposals regarding the multiple variable focal length optical system focusing method have been made with such an advanced technology.

Generally, the so called multiple variable focal length optical system can provide the degrees of freedom of zooming locus of a movable lens group when a refractive power is varied from a wide-angle end to a telephoto end. Hence, when the aberration correction is carried out, the freedom of lens designing increases, and changing air gaps for zooming increase, so the share of zooming operation to each lens group is reduced. Moreover, the advance of the lens barrel technology has overcome somewhat the problem that the lens barrel structure is complicated with movable portions increased, thus increasing the degrees of freedom in optical engineering. As a result, it is possible to design higher performance variable focal length optical systems with high variable refractive power.

In conventional variable focal length optical systems with no limitation in back focus, in order to reduce the entire length of a lens system and to reduce the diameter of each lens, a negative lens group is arranged at a position nearest to an image. A refractive power adjustment is effectively made ranging from a wide-angle end to a telephoto end by varying largely the back focus. A positive lens group is arranged at a position nearest to an object in a lens system. It is engineered to reduce the entire length of the lens system by arranging the positive lens group at a telephoto end near the object, in comparison with its position at a wide-angle end.

As described above, a three-group variable focal length optical system including a positive lens group, a positive lens group and a negative lens group, or a four-group variable focal length optical system including a positive lens group, a negative lens group, a positive lens group and a negative lens group is concretely listed as a multiple variable focal length optical system which is suitable for its high variable refractive power operation and its compactness. Conventionally various proposals have been made for such a lens structure.

Japanese Laid-open Patent Application No. 2-256015, for example, discloses a positive, positive, and negative-type three-group variable focal length optical system. This variable focal length optical system includes a first lens group with a positive refractive power, a second lens group with a positive refractive power with an air gap therebetween maintained to be unchanged which is formed of a second lens group a, and a second lens group b, and a third lens group with a negative refractive power, the first, second and third lens groups being arranged in order from the side of an object. With a variable refractive power operation ranging from a wide-angle end to a telephoto end, the air gap between the second lens group and the third lens group is decreased while the air gap between the first lens group and the second lens group is increased.

In addition, Japanese Laid-open Patent Application No. 60-57814 discloses a positive, negative, positive, and negative-type four-group variable focal length optical system. This variable focal length optical system includes a first lens group with a positive refractive power, a second lens group with a negative refractive power, a third lens group with a positive refractive power, and a fourth lens group with a negative refractive power which are arranged in order from the side of an object. With a variable refractive power operation ranging from a wide-angle end to a telephoto end, the air gap between the first lens group and the second lens group is decreased while the air gap between the third lens group and the fourth lens group is increased. In order to reduce the entire lens length at a telephoto end, the refractive power of the first lens group is positively stronger than that of the entire lens system at a telephoto end and the composite refractive power of the second lens group and the fourth lens group at the telephoto end is negative.

However, it is difficult for the conventional multiple variable focal length optical systems to achieve a good imaging performance with a small number of lenses, thus maintaining a high variable refractive power, and compactness in size. For example, in the variable focal length optical system disclosed on the Japanese Laid-open Patent Application No. 2-256015, in the case of a high variable refractive power operation, the third lens group, which is burdened with most of the variable refractive power operation causes a large variation in off-axis aberration is a variable refractive power operation ranging from a wide-angle end to a telephoto end. In order to suppress a variation in aberration due to the variable refractive power operation, the number of lenses forming the second lens group may be increased, or the air gap along an axis between the second lens group a and the second lens group b may be sufficiently widened. However, such an approach defies the object of the present invention which is a reduced number of lenses and compactness in a variable focal length optical system.

Moreover, according to Japanese Laid-open Patent Application No. 60-57814, $1/\beta 2 \cong 0$, where $\beta 2$ is a use refractive power (magnification) of the second lens group at a wide-angle end. In this case, since the composite refractive power of each of the first and second lens groups is nearly 0, a design for a high-angle causes an insufficient back focus, thus increasing the effective diameter of the rear lens.

In the lens described above, the first to third lens groups are burdened with the variable refractive power operation ranging from a wide-angle end to a telephoto end by varying largely the air gap between the second lens group and the third lens group. Thus the lens structure allows a higher variable refractive power operation, compared with the positive, positive and negative-type three-group variable focal length optical system. However, in the case while a high variable refractive power operation as well as compactness are desired, it is difficult to perform good correction of a variation in an off-axis aberration occurring in the second lens group because an off-axis luminous flux does not virtually vary its height passing the second lens group but varies only its incident angle.

As described above, it is difficult to establish high performance in addition to compactness and high variable refractive power operation using the conventional positive, positive, and negative-type three-group variable focal length optical system or a positive, negative, positive, and negative-type four-group variable focal length optical system. Realizing a higher variable refractive power operation using a small number of lenses increases a burden of each lens group at the time of variable refractive power operation. Hence, it is difficult to correct properly a variation in aberrations in a variable refractive power operation ranging from a wide-angle to a telephoto end.

Next, let us explain focusing of the multiple variable focal length optical system.

Generally, it is required that a lens group, or focusing group, that moves along the optical axis to focus a variable focal length optical system to an object has small movement and small weight. This approach has an advantage in that reducing the movement of the focusing group leads to the compactness of an entire lens system. Making the focusing group light of weight has the advantage of simplifying the mechanism of driving it.

Conventionally, in order to focus the multiple variable focal length optical system to an object positioned from a long distance to a short distance, there are three focusing methods:

(A) FF (Front Focusing) method
(B) IF (Inner Focusing) method
(C) RF (Rear Focusing) method.

Various proposals are advanced for the methods above.

In the multiple variable focal length optical system which has no limitation for back focus, including the conventional positive, positive, and negative-type three-group variable focal length optical system or the conventional positive, negative, positive, and negative-type four-group variable focal length optical system, a positive lens group is arranged at a position nearest to an object in a lens system. However, in order to provide good correction to a distortion aberration occurring at a wide-angle end, the refractive power of the positive lens group at a position nearest to the object is adjusted slightly to a positive side. For that reason, the focusing according to the front focusing method (A) causes an excessive movement of the first lens group, which is a focusing group.

A negative lens group is arranged at a position nearest to an image, and the back focus is short at a wide-angle end. Therefore, the negative lens group which has a lens diameter larger than the lens diameter of another lens group is largely burdened with the variable refractive power of the negative lens group. For that reason, at least two lenses are required to form a negative lens group at a position nearest to an image. The rear focusing method (C) is not preferable to perform a focusing operation because the negative lens group which is a focusing group, gains weight.

In the case of the use of the inner focusing method (B), as disclosed in, for example, Japanese Laid-open Patent Application No. 4-338910, the second lens group is divided into a front subgroup and a rear subgroup to move the front subgroup of the second lens group toward an object, thus performing a focusing operation. However, using the front subgroup of the second lens group as a focusing group, which is formed of a large number of lenses and has a weak positive refractive power, results in an excessive movement of the focusing group at a short distance focusing operation.

On the other hand, the positive, negative, positive, and negative-type variable focal length optical system, as disclosed in Japanese Laid-open Patent Application No. 3-39920, executes a focusing operation using the second lens group. However, since the second lens group varies largely in its use refractive power during a refractive power varying operation, the number of lenses forming the second lens group has to be increased to suppress a variation in aberration during a focusing operation together with a variation in aberration occurring at a refractive power varying time. As a result, using the second lens group as a focusing group results in undesirably increased weight.

In the variable focal length optical system disclosed in Japanese Laid-open Patent Application No. 3-225309, a focusing operation is performed by moving plural lens groups. However, unlike telephoto variable focal length optical systems, a wide-angle variable focal length optical system needs to correct properly the off-axis aberration occurring during at a focusing operation over wider angles. Therefore, the variable focal length optical system of the type disclosed in Japanese Laid-open Patent Application No. 3-225309 cannot provide a sufficient correction against a variation in off-axis aberration.

As described above, in the conventional multiple variable focal length optical systems, it has been difficult to provide good imaging performance with a small number of lenses, in addition to a realization of a wider angle, a high variable refractive power, and a reduced size. Moreover, it is not sufficient to reduce work (=weight×movement) during a focusing operation.

SUMMARY OF THE INVENTION

In order to overcome the foregoing problems, an object of the present invention is to provide a small, high variable refractive power variable focal length optical system that is formed of a small number of lenses and has good performance.

Another object of the present invention is to provide a variable focal length optical system that can maintain its good imaging performance ranging infinity to a short distance while the focusing group is suppressed to a small movement at a focusing time.

In order to achieve the objects described above, the variable focal length optical system according to the present invention includes, in order from an object side, a first lens group having a positive refractive power; a second lens group having a negative refractive power; a third lens group having a positive refractive power; a fourth lens group having a positive refractive power; and a fifth lens group having a negative refractive power; at least the first lens group and the fifth lens group being moved toward the object side when the lens groups are moved from a wide-angle end to a telephoto end; whereby both an air gap along an optical axis between the first lens group and the second lens group and an air gap along an optical axis between the third lens group and the fourth lens group are increased, respectively; whereby an air gap along an optical axis between the fourth lens group and the fifth lens group are decreased.

The configuration of a variable focal length optical system according to the present invention will be detailed with reference to FIG. 1A.

FIG. 1A shows the allocation of a variable focal length optical system according to the present invention, with the use of a thin lens system which is composed of a first lens group G1 having a positive refractive power, a second lens group G2 having a negative refractive power, a third lens group G3 having a positive refractive power, a fourth lens group G4 having a positive refractive power and a fifth lens group G5 having a negative refractive power, these groups being arranged in the mentioned order from the object side. With this arrangement, upon moving of lens groups from the wide-angle end to the telephoto end, these lens groups are displaced so that the spacial distance between the first lens group G1 and the second lens group G2 is increased while the air spacial distance (air gap) between the second lens group G2 and the third lens group G3 is decreased, and the spacial distance between the third lens group G3 and the fourth lens group G4 is increased while the air spacial distance between the fourth lens group G4 and the fifth lens group G5 is decreased.

At the wide-angle end, the second lens group G2 having a negative refractive power is located near to the first lens group G1 so that the synthetic refractive power of the first lens group G1 and the second lens group G2 becomes negative, and accordingly, positive distortion aberration is satisfactorily corrected so as to obtain a sufficient back focus. Further, the third lens group G3 having a positive refractive power and the fourth lens group G4 are located near to each other so that the synthetic refractive power of the third lens group G3 and the fourth lens group G4 becomes positive and strong.

Further, at the telephoto end, the first lens group G1 and the second lens group G2 are arranged so as to have a long air spacial distance therebetween while the second lens group G2 and the third lens group G3 are arranged so as to have a short air spacial distance therebetween, and the synthetic refractive power of the second lens group G2 and the third lens group G3 is made to be positive and stronger than the positive refractive power of the first lens group G1, thereby it is possible to aim at shortening the overall length of the lens.

As mentioned above, it is effective for the variable focal length optical system having no limitation to the back focus thereof, to locate the negative lens group on the image side in order to shorten the overall length of the lens. Thus, even in the present invention, the fifth lens group G5 which is located, nearest to the image side, has a negative refractive power. Further, in order to aim at enhancing the wide angle, the back focus at the wide-angle end is suitably shortened so that the height of an off-axis light beam passing through the fifth lens group G5 is set to be off from the optical axis, and accordingly, the on-axis light beam and the off-axis light beam are compensated independent from each other. Further, the overall length of the lens at the wide-angle end is shortened so as to cause the height of the off-axial beam passing through the first lens group to be set so as to be near to the optical axis, thereby it is possible to decrease the effective diameter of the front lens.

Further, by increasing the back focus at the telephoto end, the height of the off-axis light beam passing through the fifth lens group G5 is set so as to be near to the optical axis in comparison with the wide-angle end, and accordingly, the variation in the height of the off-axis light beam passing through the fifth lens group G5 increases upon variation of refractive power. Accordingly, it is possible to satisfactorily restrain variation in off-axis aberration which occurs at the fifth lens group G5 upon variation of refractive power.

According to the present invention, since the synthetic refractive power of the first lens group G1 and the second lens group G2 is always negative throughout variation of refractive power, and since the air spacial distance between the first lens group G1 and the second lens group G2 increases during moving of lens group from the wide-angle end to the telephoto end, the available magnification of the second lens group G2 is used for magnification. Accordingly, the synthetic refractive power of the first lens group G1 and the second lens group G2 becomes negative and weaker.

In particular, by setting the available magnification βw of the second lens group G2 at the wide-angle end in a range such as −1<βw<0, a sufficient back focus can be obtained at the wide-angle end, and further, since the height of the off-axis light beam passing through the second lens group G2 is set to be near to the optical axis, it is possible to aim at decreasing the effective diameter of the front lens. Further, since the synthetic lens refractive power of the first lens group G1 and the second lens group G2 becomes negative and weaker, it is possible to aim at shortening the overall length of the lens at the telephoto end.

Next, explanation will be made of the allocation of refractive power for the second lens group G2, the third lens group G3 and the fourth lens group G4 with reference to FIG. 1B.

FIG. 1B shows the positions of the third lens group G3 and the fourth lens group G4 upon variation of power from the wide-angle end (W) to the telephoto end (T), relative to the second lens group G2 in the form of a thin lens system. Here estimation is made for the sake of brevity in explanation such that the air spacial distance between the second lens group G2 and the fourth lens group G4 are maintained to be constant always during moving of lens groups. At the wide-angle end as shown, the third lens group G3 and the fourth lens group G4 are arranged adjacent to each other. Meanwhile, at the telephoto end, the second lens group G2 and the third lens group G3 are arranged adjacent to each other.

In this configuration, the synthetic refractive power φw, at the wide-angle end, of the second lens group G2 to the fourth lens group G4 is given by the following expression:

$$\phi w = \phi 2 + (\phi 3 + \phi 4) - \phi 2 \cdot (\phi 3 + \phi 4) \cdot d \quad (a)$$

where φ2 is the refractive power of the second lens group G2, φ3 is the refractive power of the third lens group G3, and φ4 is the refractive power of the fourth lens group. Further, at the telephoto end, the synthetic refractive power φt of the second lens group G2 to the fourth lens group G4 is given by the following expression:

$$\phi t = (\phi 2 + \phi 3) + \phi 4 - (\phi 2 + \phi 3) \cdot \phi 4 \cdot d \quad (b)$$

Since φ3>0, there are obtained:

$$|\phi 2| > |\phi 2 + \phi 3| \quad (c)$$

$$\phi 4 < (\phi 3 + \phi 4) \quad (d)$$

Thus, it is understood that the synthetic refractive power φt at the telephoto end is positively stronger than the synthetic refractive power φw at the wide-angle end. Further, it is also understood that the second lens group G2 to the fourth lens group G4 contribute to the variation of refractive power.

It is preferable that the variable focal length optical system according to the present invention can satisfy the following condition:

$$0.4 < (Bft - Bfw)/(ft - fw) < 0.8 \quad (1)$$

where fw is the effective focal length of the entire lens system at the wide-angle end, ft is the effective focal length of the entire lens system at the telephoto end, Bfw is the back focus at the wide-angle end and Bft is the back focus at the telephoto end.

The conditional expression (1) specifies the ratio between the displacement of the fifth lens group G5 and the variation in the effective focal length of the entire lens system at the wide-angle end. Since the displacement of the fifth lens group G5 corresponds to a variation in the back focus of the entire lens system, it is understood that the conditional expression (1) is a condition relating to the proportion with which the fifth lens group G5 effects the variation in the effective focal length of the entire lens system. In the present invention, the fifth lens group G5 is a negative lens group which is located near to the image side, and is used for magnification upon variation of refractive power from the wide-angle end to the telephoto end. Thus, the greater the variation in the back focus with respect to the variation in the effective focal length of the entire lens system, the greater the variation in the magnification under image formation of the fifth lens group. That is, the conditional expression (1)

specifies the proportion with which the fifth lens group G5 contributes to the variation ratio of refractive power of the entire lens group.

In the case of exceeding the upper limit of the conditional expression (1), the proportion with which the fifth lens group G5 contributes to the variation of refractive power, becomes excessive, and accordingly, it is difficult to satisfactory restrain variation of the off-axis aberration which occurs at the fifth lens group G5.

On the contrary, in the case of falling below the lower limit of the conditional expression, the proportion with which the fifth lens group G5 contributes to the variation of refractive power becomes less, the variation of the off-axis aberration which occurs at the fifth lens group G5 can be satisfactorily restrained. However, since the proportion with which the first to fourth lens group contribute to the variation of refractive power becomes larger, that is, in particular upon variation of refractive power, the height of the off-axis light beam passing through the second lens group G2 does not vary appreciably but the incident angle varies greatly, it is difficult to satisfactorily restrain variation of off-axis aberration which occurs at the second lens group G2.

Further, it is preferable that the variable focal length optical system according to the present invention satisfies the following conditions:

$$0.15 \leq |f2|/f1 < 0.45; f2<0 \quad (2)$$

$$0.05 < (d3t-d3w)/(d4w-d4t)<0.7 \quad (3)$$

where f1 is the effective focal length of the first lens group, f2 is the effective focal length of the second lens group, d3w and d3t are the air spacial distances along the optical axis between the third lens group and the fourth lens group at the wide-angle end and the telephoto end, respectively, and d4w and d4t are the air spacial distance between the fourth lens group and the fifth lens group at the wide-angle end and the telephoto end.

The conditional expression (2) specifies the ratio between the degree of effective focal length f1 of the first lens group and the degree of effective focal length f2 of the second lens group.

In the case of exceeding the upper limit of the conditional expression, since the effective focal length f1 of the first lens group G1 becomes positively smaller than the effective focal length f2 of the second lens group G2, the convergent action is dominant so that the off-axis light beam passing through the first lens group G1 is off from the optical axis, and accordingly, the effective diameter of the front lens has to be large although the overall length of the lens at the telephoto end may be shortened. In particular, at the telephoto end, since the first lens group G1 is displaced largely toward the image side, the distribution of refractive power becomes asymmetric, and accordingly, it is impossible to satisfactorily restrain positive distortion aberration. Further, since the convergent action becomes dominant as mentioned above, no sufficient back focus can be obtained at the wide-angle end, and accordingly, the effective diameter of the rear lens has to be large, which is contrary to the purpose of the present invention so that is unpreferable.

On the contrary, in the case of falling below the lower limit of the conditional expression (2), a sufficient back focus can be obtained at the wide-angle end so that the height of the off-axis light beam passing through the fifth lens group G5 is set to be near to the optical axis, and accordingly, the overall length of the lens at the telephoto end becomes larger, which is contrary to the purpose of the present invention, although the effective diameter of the rear lens can be decreased.

The conditional expression (3) specifies the ratio between the variation in the air spacial distance between the third lens group G3 and the fourth lens group G4, and the variation in the air spacial distance between the fourth lens group G4 and the fifth lens group G5 upon variation of refractive power from the wide-angle end to the telephoto end, that is, it specifies the proportions with which the third lens group G3 to the fifth lens group G5 contribute to the variation of refractive power.

In the case of exceeding the upper limit of the conditional expression (3), since the variation in the magnification of image formation by the third lens group G3 and the fourth lens group G4 becomes large during moving of lens groups so that the proportion with which these lens groups contributes to the variation of refractive power becomes excessively large, restraint on variation in on-axis aberration caused by the third lens group G3 and the fourth lens group G4 becomes difficult. Further, in order to obtain a satisfactory function, it is preferable to set the upper limit value to 0.7.

On the contrary, in the case of falling below the lower limit value of the conditional expression (3), since the variation in the magnification of image formation by the fifth lens group G5 becomes large during moving of lens groups so that the proportion with which this lens group contributes to the variation of refractive power excessively becomes large, satisfactory restraint on variation in the magnification of image formation caused by the fifth lens group G5 becomes difficult.

Further, it is preferable for the variable focal length optical system according to the present invention to satisfy at least one of the following conditions:

$$0.8 < f1/(fw \cdot ft)^{1/2} < 1.4 \quad (4)$$

$$0.9 < f3/f4 < 2.5 \quad (5)$$

$$0.75 < f5/f2 < 2.0 \quad (6)$$

where f3 is the effective focal length of the third lens group G3, f4 is the effective focal length of the fourth lens group G4, and f5 is the effective focal length of the fifth lens group G5.

The conditional expression (4) determines a suitable range for the effective focal length f1 of the first lens group G1 with respect to the effective focal length fw at the wide-angle end and the effective focal length ft at the telephoto end.

In the case of exceeding the upper limit value of the conditional expression (4), the effective focal length f1 of the first lens group G1 becomes large in positive value, the conversion becomes less so that the overall length of the lens at the telephoto end becomes long.

On the contrary, in the case of falling below the lower limit value of the conditional expression (4), the effective focal length f1 of the first lens group G1 becomes less in positive value, negative spherical aberration cannot be corrected at the telephoto end, satisfactory correction for variation in the curvature of field caused by the first lens group G1 during moving of lens groups from the wide-angle end to the telephoto end becomes difficult.

The conditional expression (5) determines a suitable ratio between the effective focal length of the third lens group G3 and the effective focal length of the fourth lens group G4.

In the case of exceeding the upper limit value of the conditional expression (5), since the effective focal length of the fourth lens group G4 becomes large in positive value, with respect to the third lens group G3, the height of the off-axis beam passing through the fourth lens group G4 is set to be near to the optical axis, and accordingly, the difference in the height at which the off-axis beam passes becomes small during moving of lens groups from the wide-angle end to the telephoto end. Thus, in the case of aiming at increasing the variation of refractive power, satisfactory restraint on variation in off-axis aberration caused by the fourth lens group G4 during moving of lens groups from the wide-angle end to the telephoto end becomes difficult.

On the contrary, in the case of falling below the lower limit value of the conditional expression (5), although the effective focal length of the third lens group G3 becomes small in positive value, with respect to the effective focal length of the fourth lens group G4, the synthetic principal point of the third lens group G3 and the fourth lens group G4 at the wide-angle end is moved largely to the object side at the telephoto end, and accordingly, the overall length of the lens at the telephoto end can be shortened. Accordingly, in the case of aiming at increasing the variation of refractive power, restraint on variation in on-axis aberration caused by the third lens group G3 during moving of lens groups from the wide-angle end to the telephoto end becomes difficult.

The conditional expression (6) determines a suitable ratio between the effective focal length of the second lens group G2 and the effective focal length of the fifth lens group G5.

In the case of exceeding the upper limit value of the conditional expression (6), since the effective focal length of the second lens group G2 becomes small in negative value, with respect to the effective focal length of the fifth lens group G5, variation in off-axis aberration during moving of lens groups from the wide-angle end to the telephoto end cannot be restrained satisfactorily. Further, the height of the main beam passing through the second lens group G2 is set to be near to the optical axis, and accordingly, restraining coma aberration caused by an angle of field at the wide-angle end becomes difficult.

On the contrary, in the case of falling below the lower limit value of the conditional expression, the effective focal length of the fifth lens group G5 becomes less, with respect to the effective focal length of the second lens group G2, variation in off-axis aberration during moving of lens groups from the wide-angle end to the telephoto end cannot be restrained satisfactorily, and further, positive distortion aberration occurs at the wide-angle end.

Further, in order to obtain a more excellent performance, the fifth lens group G5 preferably includes at least one positive meniscus lens having its concave side facing the object side and one negative lens having its concave side facing the object side.

Further, during moving of lens groups from the wide-angle end to the telephoto end the first lens group G1 and the fifth lens group G5 are displaced with an air gap therebetween maintained to be unchanged, or the second lens group G2 and the fourth lens group G4 are displaced with an air gap therebetween maintained to be unchanged, and accordingly, it is possible to aim at simplifying the structure of the lens barrel. Further, upon moving of lens groups from the wide-angle end to the telephoto end, the first lens group G1 and the fifth lens group G5, and the second lens group G2 and the fourth lens group G4 can be displaced with an air gap therebetween maintained to be unchanged, thereby it is possible to aim at further simplifying the structure of the lens barrel.

Explanation will be hereinbelow made of the focussing by the variable focal length optical system according to the present invention.

The focusing by the variable focal length optical system according to the present invention is carried preferably by at least one of the second to fourth lens groups.

At first, the variable focal length optical system according to the present invention, in which the third lens group G3 is displaced toward the image side during the focusing from a far distance object to a near distance object, will be explained.

The above-mentioned variable focal length optical system comprises, in order from an object side, a first lens group having a positive refractive power, a second lens group having a negative refractive power, a third lens group having a positive refractive power, a fourth lens group having a positive refractive power and a fifth lens group having a negative refractive power, and upon moving of lens groups from the wide-angle end to the telephoto end, at least the first lens group and the fifth lens group are moved toward the object side, an air gap along the optical axis between the first lens group and the second lens group is increased, while both an air gap along the optical axis between the second lens group and the third lens group and an air gap along the optical axis between the fourth lens group and the fifth lens group are decreased, respectively. When the third lens group is moved toward the image side during focusing from the far distance object to the near distance object, the following conditions are satisfied:

$$0.2 < f2/f1 < 0.7; f2 < 0 \qquad (7)$$

$$0.3 < f2/f3 < 0.8 \qquad (8)$$

where f1 is the effective focal length of the first lens group, f2 is the effective focal length of the second lens group, and f3 is the effective focal length of the third lens group.

Alternatively, the above-mentioned variable focal length optical system comprises, in order from an object side, a first lens group having a positive refractive power, a second lens group having a negative refractive power, a third lens group having a positive refractive power, a fourth lens group having a positive refractive power and a fifth lens group having a negative refractive power, and upon moving of lens groups from the wide-angle end to the telephoto end, at least the first lens group and the fifth lens group are moved toward the object side, an air gap along the optical axis between the first lens group and the second lens group is increased, while both an air gap along the optical axis between the second lens group and the third lens group and an air gap along the optical axis between the fourth lens group and the fifth lens group are decreased, respectively. When the third lens is moved during focusing from a far distance object to a near distance object, the following conditions are satisfied:

$$-1 < \beta 2w < -0.3 \qquad (9)$$

$$-0.5 < 1/\beta 3t < 0.2 \qquad (10)$$

where $\beta 2w$ is the magnification of image formation by the second lens group at the wide-angle end, and $\beta 3t$ is the magnification of image formation by the third lens group at the telephoto end.

Further, in this arrangement, it is preferable to satisfy the following condition:

$$0.4 < (Bft - Bfw)/(ft - fw) < 0.8 \qquad (11)$$

where fw is the effective focal length of the entire lens system at the wide-angle end, ft is the effective focal length of the entire lens system at the telephoto end, Bfw is the back focus at the wide-angle end, and the Bft is the back focus at the telephoto end.

Further, it is preferable to satisfy the following condition:

$$-0.4 < ri/ro < 0.5; ri < 0 \qquad (12)$$

where ro is the radius of curvature of the surface of the above-mentioned third lens group, which is nearest to the object side, and ri is the radius of curvature of the surface thereof which is nearest to the image side.

Further, during moving of lens groups from the wide-angle end to the telephoto end, such an arrangement that the first lens group and the fifth lens group are displaced with an air gap therebetween maintained to be unchanged, or the second lens group and the fourth lens group are displaced with an air gap therebetween maintained to be unchanged is preferable for variation of refractive power.

Referring to FIG. 2 (similar to FIG. 1A), which shows the allocation of refractive power of this variable focal length optical system, focusing is carried out by the third lens group. In this case, when the object is moved from a far distant position to a near distant position, it is preferable to displace the third group lens in order to maintain the position of the object point by the third lens group, rather than that by the first lens group, with respect to the fourth lens group, and further, it is preferable that the displacement A of the third lens group is small.

Explanation will be hereinbelow made of the conditions with which the displacement A of the third lens group is made to be small with the use of a thin lens system.

FIG. 3 shows the relationship of the displacement of the third lens group G3 in such a case that the position of the object point with respect to the fourth lens group G4 is maintained.

As shown in FIG. 3, when the position of the object point with respect to the third lens group G3 is moved by $\delta$, if the third lens group G3 is displaced by $\Delta$ in order to maintain the position of the object point with respect to the fourth lens group G4, $\Delta$ is exhibited by the following expression:

$$\Delta = \beta 3^2/(\beta 3^2 - 1) \cdot \delta \quad (e)$$

where $\beta 3$ is the magnification of image formation of the third lens group G3.

Substituting $k = \beta 3^2/(\beta 3^2 - 1)$ into the expression (e), the following expressions are obtained:

$$1 \leq k (\beta 3^2 > 1)$$

$$0 > k (\beta 3^2 < 1)$$

Thus, in order to make A as small as possible, if $\beta 3^2 > 1$, it is necessary to allow k to approach 1 as near as possible, that is, it is necessary to allow $1/\beta 3$ to approach zero as near as possible. Alternatively, in the case of $\beta 3^2 < 1$, it is necessary to allow k to approach zero as near as possible, that is, the magnification $\beta 3$ of image formation of the third lens group G3 has to approach zero.

Accordingly, according to the present invention, $1/\beta 3$ which is the reciprocal of the magnification $\beta 3$ of image formation of the third lens group G3 is set to approach zero.

Next, explanation will be made of the relationship of the displacement of the position of the image point by the first lens group G1 and the second lens group G2 when the position of the object point being moved from the infinite point to a near distance point with reference to FIGS. 4A and 4B. When the object distance D0 is infinite, as shown in FIGS. 4A and 4B, the position of the image point is moved to x, but when the object distance DO is definite, the position of the image point by the first lens group G1 and the second lens group G2 is moved to x'. This situation can be expressed by the expressions, that is, $f(0)=x$, $f(-1/D0)=x'$. Further, the position $f(m)$ of the image point by the first lens group G1 and the second lens group G2 is exhibited by the following expression, $$f(m) = [1-(m+\phi 1) \cdot d12]/[m+\phi 1+\phi 2\{1-(m+\phi 1) \cdot d12\}] \quad (f)$$

where m is given by $m=-1/D0$, $\phi 1$ is the refractive power of the first lens group G1, $\phi 2$ is the refractive power of the second lens group G3, and d12 is the spacial distance between the first lens group G1 and the second lens group G2.

By differentiating the expression (f) with m, the following expression is obtained:

$$df/dm = -[(m+1) + \phi 2\{1-(m+\phi 1) \cdot d12\}]^{-2} \quad (g)$$

This expression relates to the displacement of the position $f(m)$ of the image point by the first lens group G1 and the second lens group G2 when the position of the object point is moved from the infinite point to a near distance point.

In particular, if m=0, the expression (g) is exhibited by:

$$[df/dm]_{m=0} = -\{\phi 1 + \phi 2(1-\phi 1 \cdot d12)\}^{-2} \quad (h),$$

if $\phi 1 + \phi 2 - \phi 1 \cdot \phi 2 \cdot d12 = 0$, that is, if the synthetic refractive power of the first lens group G1 and the second lens group G2 becomes zero, $[df/dm]_{m=0}$ becomes infinite.

Accordingly, from the expressions (g) and (h), if the displacement of the image point by the first lens group G1 and the second lens group G2 when the position of the object being moved from the infinite point to a near distance point is set to $\delta (=f(m)-f(0))$, the synthetic refractive power of the first lens group G1 and the second lens group G2 is strong, that is, the available magnification of the second lens group G2 is preferably near to zero in order to reduce $\delta$.

As mentioned above, in the case of focusing with the use of the third lens group G3, it is required to set the magnifications of the image formation of the second lens group G2 and the third lens group G3 to predetermined values. Specifically, according to the present invention, during moving of lens groups from the wide-angle end to the telephoto end, since the air spacial distance between the first lens group G1 and the second lens group G2 increases, and since the synthetic refractive power of the first lens group G1 and the second lens group G2 is always negative during moving of lens groups, the available magnification of the second lens group G2 can be used for magnification. Accordingly, by allowing the available magnification of the second lens group G2 to approach zero as near as possible at the wide-angle end, the displacement of the third lens group during focusing is decreased, and further, as to the magnification $\beta 3$ of image formation of the third lens group G3, $1/\beta 3$ is set to be near to zero.

Explanation will be made of the above-mentioned respective conditional expressions (7) to (12).

The conditional expressions (7) and (8) specify the ratio between the effective focal length f1 of the first lens group G3 and the effective focal length f2 of the second lens group G2, and the ratio between the effective focal length f2 of the second lens group G2 and the effective focal length f3 of the third lens group G3, respectively. Either one of them relates to the displacement the third lens group during focusing.

In the case of exceeding the upper limit value of the conditional expression (7), since the effective focal length of the second lens group G2 becomes longer so that the action of divergence becomes less, the overall length of the lens can be reduced. However, since the back focus becomes shorter, the off-axis beam passing through the fifth lens group G5 is separated away from the optical axis so as to increase the lens diameter. Further, since the displacement of the third lens group G3 during focusing increases, it is contrary to the object of the present invention.

On the contrary, in the case of falling below the lower limit value of the expression (7), the displacement of the third lens group G3 during focusing becomes small, but the synthetic refractive power of the first lens group G1 and the second lens group G2 becomes strong in negative value so as to enhance the divergent action, and the size of the lens system is unpreferably increased.

In the case of exceeding the upper limit value of the conditional expression (8), the overall length of the lens can be decreased, but the displacement of the third lens group G3 during focusing increases unpreferably.

On the contrary, in the case of falling below the lower limit value, the displacement of the third lens group G3 decreases, but the refractive power of the second lens group G2 becomes strong in negative value and, the overall length of the lens at the telephoto end is unpreferably increased.

The conditional expressions (9) and (10) give conditions such that the displacement of the third lens group G3 is decreased during focusing with the use of the third lens group G3 so as to obtain a satisfactory function from the infinite point to a near distance point.

In the case of exceeding the upper limit value of the conditional expression (9), the displacement of the third lens group G3 decreases during focusing, the synthetic refractive power of the first lens group G1 and the second lens group G2 becomes strong in negative value so that the divergent action is increased, and accordingly, the overall length of the lens at the telephoto end is increased.

In the case of falling below the lower limit value of the conditional expression (9), the displacement of the third lens group G3 during focusing increases, and further, negative astigmatism which occurs during focusing increases, and accordingly, variation in off-axis aberration is increased.

In the case of exceeding the upper limit value of the conditional expression (10), the synthetic refractive power of the first lens group G1 to the third lens group G3 becomes strong in positive value, the overall length of the lens can be decreased, but, the displacement of the third lens group G3 during focusing is unpreferably increased.

It is required to satisfy the above-mentioned conditional expressions (7) and (8), or the conditional expressions (9) and (10), and it is preferable to satisfy the conditional expression (11) in order to obtain a further satisfactory image forming function. It is noted that detailed explanation of the conditional expression (11) is omitted since the conditional expression (11) is identical with the aforementioned conditional expression (1).

It is preferable to satisfactory the above-mentioned conditions, and it is further preferable to satisfy the conditional expression (12) in order to obtain a further image forming function.

The conditional expression (12) specifies the ratio between the radius ri of curvature of the nearest image side surface of the third lens group G3 which is nearest to the image side, and the radius ro of curvature of the nearest object side surface thereof, and which gives a condition for satisfactorily restraining variation in aberration during focusing.

In the case of exceeding the upper limit value of the conditional expression (12), variation in the curvature of field which occurs during focusing increases.

On the contrary, in the case of falling below the lower limit value of the conditional expression (12), negative spherical aberration which occurs at the third lens group G3 increases, and accordingly, variation in spherical aberration which occurs during moving of lens groups from the wide-angle end to the telephoto end, is increased, and further, variation in spherical aberration which occurs during focusing is also unpreferably increased.

With the variable focal length optical system in the above-mentioned embodiment, by satisfying the above-mentioned conditional expressions, and further, and by displacing the first lens group G1 and the fifth lens group G5 with an air gap therebetween maintained to be unchanged during moving of lens groups from the wide-angle end to the telephoto end or displacing the second lens group G2 and the fourth lens group G4 with an air gap therebetween maintained to be unchanged during moving of lens groups from the wide-angle end to the telephoto end, it is possible to aim at simplifying the structure of the lens barrel. Further, during moving of lens groups from the wide-angle end to the telephoto end, the first lens group G1 and the fifth lens group G5, and the second lens group G2 and the fourth lens group G4 are displaced with an air gap therebetween maintained to be unchanged, respectively, thereby it is possible to aim at further simplifying the structure of the lens barrel.

Next, explanation will be made of a variable focal length optical system according to the present invention in which the second lens group and the fourth lens group are displaced toward the object during focusing from a far distance object to a near distance object.

As shown in FIG. 5 (similar to FIG. 1A), the variable focal length optical system as mentioned above is composed of a first lens group having a positive refractive power, a second lens group having a negative refractive power, a third lens group having a positive refractive power, a fourth lens group having a positive refractive power and a fifth lens group having a negative refractive power, these groups being arranged in the mentioned order from the object side. With this arrangement, during moving of lens groups from the wide-angle end to the telephoto end, at least the first lens group and the fifth lens group are displaced toward the object side so that the air spacial distance between the first lens group and the second lens group along the optical axis, and the air spacial distance between the third lens group and the fourth lens group along the optical axis are respectively increased while the air spacial distance between the second lens group and the third lens group along the optical axis and the air spacial distance between the fourth lens group and the fifth lens group along the optical axis are respectively decreased, and during focusing from a far distance object to a near distance object, the second lens group and the fourth lens group are displaced toward the object side.

Further, the following conditions are satisfied:

$$0.15 < |f2|/f1 < 0.5 \qquad (13)$$

$$0.4 < (Bft-Bfw)/(ft-fw) < 0.8 \qquad (14)$$

$$-0.25 < (f3-f4)/(f3+f4) < 0.4 \qquad (15)$$

where f1 is the effective focal length of the first lens group, f2 is the effective focal length of the second lens group, f3 is the effective focal length of the third lens group, f4 is the effective focal length of the fourth lens group, fw is the effective focal length of the entire lens system at the wide-angle end, ft is the effective focal length of the entire lens system at the telephoto end, Bfw is the back focus at the wide-angle end, and Bft is the back focus at the telephoto end.

The conditional expression (13) specifies a suitable range for the ratio between the effective focal length f1 of the first lens group G1 and the effective focal length f2 of the second lens group G2.

In the case of exceeding the upper limit value of the conditional expression (13), the effective focal length f1 of the first lens group G1 becomes small in positive value, and accordingly, the convergent action is enhanced, and the overall length of the lens at the telephoto end can be decreased. However, the off-axis optical beam passing through the first lens group G1 is largely separated away from the optical axis, it and causes the front lens to have a large effective diameter. In particular, since the first lens group G1 is displaced largely toward the object side at the telephoto end, the allocation of the refractive power becomes asymmetric, accordingly, it is impossible to satisfactorily restrain positive distortion aberration.

Further, since the convergent action is enhanced, as mentioned above, the sufficient back focus cannot be obtained at the wide-angle end. As a result, the rear end lens has a large effective diameter.

On the contrary, in the case of falling below the lower limit value of the conditional expression (13), a sufficient back focus can be obtained at the wide-angle end, and the height of the off-axis light beam passing through the fifth lens group G5 is set to be near to the optical axis, thereby it is possible to aim at decreasing the effective diameter of the rear lens.

However, since the overall length of the lens at the telephoto end is increased, it is contrary to the miniaturization which is one of the objects of the present invention.

Explanation of the conditional expression (14) is abbreviated since it is identical with the conditional expression (1).

The conditional expression (15) specifies the balance between the effective focal length of the third lens group G3 and the effective focal length of the fourth lens group G4.

In the case of exceeding the upper limit value of the conditional expression (15), the effective focal length of the fourth lens group G4 becomes small in positive value, in comparison with the effective focal length of the third lens group G3. As a result, the position of the synthetic principal point of the third lens group G3 and the fourth lens group G4 at the telephoto end is moved toward the image side, and accordingly, the overall length of the lens at the telephoto end becomes large.

Further, the position of the synthetic principal point of the first lens group G1 to the fourth lens group G4 is moved toward the image surface at the telephoto end, and accordingly, the magnification of image formation of the fifth lens group G5 becomes large in positive. As a result, during moving of lens groups from the wide-angle end to the telephoto end, the proportion of the contribution to the variation of refractive power by the fifth lens group G5 increases, and accordingly, it is difficult to satisfactorily correct variation in off-axis aberration which occurs at the fifth lens group G5 during moving of lens groups.

On the contrary, in the case of falling below the lower limit value of the conditional expression (15), the effective focal length of the third lens group G3 becomes small in positive value, in comparison with the effective focal length of the fourth lens group G4. As a result, the position of the synthetic principal point of the first lens group G1 to the fourth lens group G4 is moved toward the object side at the telephoto end, the magnification of image formation of the fifth lens group G5 becomes small in positive value, and the proportion of contribution to the variation of refractive power by the fifth lens group G5 is decreased.

However, the proportion of contribution to the variation of refractive power by each of the first lens group G1 to the fourth lens group G4 is increased, and in particular, the proportion of the contribution to the variation of refractive power by the second lens group G2 becomes large during moving of lens groups from the wide-angle end to the telephoto end. As a result, it is difficult to satisfactorily correct variation in off-aberration which occurs at the second lens group G2 during moving of lens groups.

In the variable focal length optical system in the embodiment as mentioned above, the second lens group G2 and the fourth lens group G4 are displaced with an air gap therebetween maintained to be unchanged, thereby it is possible to aim at simplifying the structure of the lens barrel.

Further, according to a preferred embodiment of the present invention, it is preferable to satisfy the following conditions:

$$0.8 < f1/(fw \cdot ft)^{1/2} < 1.4 \quad (16)$$

$$0.75 < f5/f2 < 2.0 \quad (17)$$

where f1 is the effective focal length of the first lens group, f2 is the effective focal length of the second lens group, f5 is the effective focal length of the fifth lens group, fw is the effective focal length of the entire lens system at the wide-angle end, and ft is the effective focal length of the entire lens system at the telephoto end.

The conditional expression (16) determines a suitable range for the effective focal length of the first lens group G1 with respect to the effective focal length fw of the entire lens system at the wide-angle end, and the effective focal length ft of the entire lens system at the telephoto end.

In the case of exceeding the upper limit value of the conditional expression (16), the effective focal length f1 of the first lens group G1 becomes large in positive value, the convergent action becomes weak, and the overall length of the lens at the telephoto end is increased.

On the contrary, in the case of falling below the lower limit value, the effective focal length f1 of the 10 first lens group G1 becomes small in positive value, it is impossible to correct negative spherical aberration at the telephoto end. Further, it is difficult to satisfactorily correct variation in curvature of field which occurs at the first lens group G1 during moving of lens groups from the wide-angle end to the telephoto end.

The conditional expression (17) determines a suitable range for the ratio between the effective focal length of the second lens group G2 and the effective focal length of the fifth lens group G5.

In the case of exceeding the upper limit value of the conditional expression (17), the effective focal length of the second lens group G2 becomes small in negative in comparison with the effective focal length of the fifth lens group G5, it is impossible to satisfactorily restrain variation in off-axis aberration during moving of lens groups from the wide-angle end to the telephoto end.

Further, since the height of the main light beam passing through the second lens group G2 is set to be near the optical axis, it is difficult to restrain variation in coma aberration at the wide-angle end.

On the contrary, in the case of falling below the lower limit value of the conditional expression (17), the effective focal length of the fifth lens group G5 becomes small in comparison with the effective focal length of the second lens group G2. As a result, it is difficult to satisfactorily restrain variation in off-axis aberration which occurs during moving of lens groups from the wide-angle end to the telephoto end. Further, positive distortion aberration occurs at the wide-angle end.

Further, in the variable focal length optical system in the above-mentioned embodiment, the first lens group G1 and the fifth lens group G5 are moved toward the object side with an air gap therebetween maintained to be unchanged during moving of lens groups from the wide-angle end to the telephoto end, or the second lens group G2 and the fourth lens group G4 are displaced with an air Gap therebetween maintained to be unchanged during moving of lens groups from the wide-angle end to the telephoto end, and thereby it is possible to aim at simplifying the structure of the lens barrel.

Further, during moving of lens groups from the wide-angle end to the telephoto end, the first lens group G1 and the fifth lens group G5 are displaced toward the object side with an air gap therebetween maintained to be unchanged, and further the second lens group G2 and the fourth lens group G4 are displaced with an air gap therebetween maintained to be unchanged, and thereby it is possible to aim at simplifying the structure of lens barrel.

Next explanation will be made of a variable focal length optical system according to the present invention in which the second lens group G2, the third lens group G3 and the fourth lens group G4 are displaced during focusing from a far distance object to a near distance object.

As shown in FIG. 6 (similar to FIG. 1A), the variable focal length optical system as mentioned above is composed of a first lens group having a positive refractive power, a second lens group having a negative refractive power, a third lens group having a positive refractive power, a fourth lens group having a positive refractive power and a fifth lens group having a negative refractive power, these groups being arranged in the mentioned order from the object side. With this arrangement, during moving of lens groups from the wide-angle end to the telephoto end, at least the first lens group and the fifth lens group are displaced toward the object side so that the air spacial distance between the first lens group and the second lens group along the optical axis, and the air spacial distance between the third lens group and the fourth lens group along the optical axis are respectively increased while the air spacial distance between the second lens group and the third lens group along the optical axis and the air spacial distance between the fourth lens group and the fifth lens group along the optical axis are respectively decreased. Further, during focusing from a far distance object to a near distance object, the second lens group, the third lens group and the fourth lens group are displaced toward the object side.

Further, the following conditions are satisfied:

$$0.8 < f1/(fw \cdot ft)^{1/2} < 1.6 \qquad (18)$$

$$0.6 < f5/f2 < 1.6 \qquad (19)$$

where f1 is the effective focal length of the first lens group, f2 is the effective focal length of the second lens group, f5 is the effective focal length of the fifth lens group, fw is the effective focal length of the entire lens system at the wide-angle end, and ft is the effective focal length of the entire lens system at the telephoto end.

The conditional expression (18) determines a suitable range for the effective focal length of the first lens group G1 with respect to the effective focal length fw at the wide-angle end and the effective focal length ft at the telephoto end.

In the case of exceeding the upper limit Value of the conditional expression (18), the effective focal length f1 of the first lens group G1 becomes large in positive value. Accordingly, the convergent action becomes weak so that the overall length of the lens at the telephoto end is increased.

On the contrary, in the case of falling below the lower limit value of the conditional expression (18), the effective focal length f1 of the first lens group G1 becomes small in positive value. Accordingly, negative spherical aberration which occurs at the telephoto end cannot be completely corrected. Further, it is difficult to satisfactorily correct variation in distortion of the image plane which occurs at the first lens group G1 during moving of lens groups from the wide-angle end to the telephoto end.

The conditional expression (19) determines a suitable range for the ratio between the effective focal length f2 of the second lens group G2 and the effective focal length f5 of the fifth lens group G5.

In the case of exceeding the upper limit value of the conditional expression (19), the effective focal length of the lens group G2 becomes small in negative value with respect to the effective focal length f5 of the fifth lens group G5. As a result, the height of the off-axis light beam passing through the second lens group G2 does not largely vary during moving of lens groups from the wide-angle end to the telephoto end, but the angle of incidence largely varies. Thus, it is difficult to satisfactorily restrain variation in off-axis aberration which occurs during moving of lens groups.

Further, the height of the main light beam passing through the second lens group G2 is set to be near to the optical axis, it is difficult to satisfactorily restrain variation in coma aberration by the angle of field at the wide-angle end.

On the contrary, in the case of falling below the conditional expression (19), the effective focal length f5 of the fifth lens group G5 becomes small in negative value with respect to the effective focal length f2 of the second lens group G2. As a result, it is impossible to satisfactorily restrain variation in off-axis aberration which occurs at the fifth lens group G5 during moving of lens groups from the wide-angle end to the telephoto end. Further, positive distortion aberration occurs at the wide-angle end.

In view of the above-mentioned preferred embodiment, the second lens group G2, the third lens group G3 and the fourth lens group G4 are displaced toward the object side with an air gap therebetween maintained to be unchanged, and thereby it is possible Go aim at simplifying the structure of the lens barrel.

According to the present invention, in order that the lens system is constituted by a less number of lenses while aiming at enhancing the miniaturization and the wide angle, it is desired to satisfy the following condition:

$$0.4 < (Bft - Bfw)/(ft - fw) < 0.8 \qquad (20)$$

where fw is the effective focal length of the entire lens system at the wide-angle end, ft is the effective focal length of the entire lens system at the telephoto end, Bfw is the back focus of the entire lens system at the wide-angle end, and Bft is the back focus of the entire lens system at the telephoto end.

This conditional expression (20) is identical with the above-mentioned conditional expression (1), and accordingly, the explanation thereof is abbreviated.

In addition to the above-mentioned various conditions, in order to obtain a more satisfactory image forming function, it is desirable to satisfy the following conditions:

$$0.2 < f2/f1 < 0.6 \qquad (21)$$

$$-0.3 < (f3 - f4)/(f3 + f4) < 0.5 \qquad (22)$$

where f1 is the effective focal length of the first lens group G1, f2 is the effective focal length of the second lens group G2, f3 is the effective focal length of the third lens group G3, and f4 is the effective focal length of the fourth lens group G4.

The conditional expression (21) specifies a suitable range for the ratio of the effective focal length of the first lens group G1 and the effective focal length f2 of the second lens group G2.

In the case of exceeding the upper limit value of the conditional expression (21), the effective focal length f1 of the first lens group G1 becomes small in positive value. Accordingly, the convergent action becomes strong so that the overall length of the lens at the telephoto end can be shortened, but the effective diameter of the front lens becomes large since the off-axis light beam passing through the first lens group G1 goes away from the optical axis.

Further, the allocation of refractive power is asymmetric at the telephoto end, and accordingly, it is impossible to satisfactorily restrain positive distortion aberration. Further, the convergent action becomes strong, no sufficient back focus can be obtained at the wide-angle end, and accordingly, the effective diameter of a rear lens becomes large.

On the contrary, in the case of falling below the lower limit value of the conditional expression (21), a sufficient back focus can be obtained at the wide-angle end, and accordingly, the height of the off-axial light beam passing through the fifth lens group G5 is set to be near to the optical axis, and thereby it is possible to aim at decreasing the effective diameter of the rear lens. However, the overall length of the lens at the telephoto end becomes large.

The conditional expression (22) specifies the balance between the effective focal length f3 of the third lens group G3 and the effective focal length f4 of the fourth lens group In the case of exceeding the upper limit value of the conditional expression (22), the effective focal length f4 of the fourth lens group G4 becomes small in comparison with the effective focal length f3 of the third lens group G3. As a result, the position of the synthetic principal point of the third lens group G3 and the fourth lens group G4 is moved toward the image side, and accordingly, the overall length of the lens at the telephoto end becomes large.

Further, at the telephoto end, the position of the synthetic principal point of the first lens group G1 to the fifth lens group G5 is moved to the image side. Thus, the magnification of image formation by the fifth lens group G5 becomes large in positive value. As a result, during moving of lens groups from the wide-angle end to the telephoto, the proportion of contribution to the variation of the refractive power by the fifth lens group G5 becomes large, and accordingly, it is difficult to satisfactorily correct variation in off-axis aberration which occurs at the fifth lens group G5 during moving of lens groups.

On the contrary, in the case of falling below the lower limit value of the conditional expression (22), the effective focal length f3 of the third lens group G3 becomes small in positive value in comparison with the effective focal length f4 of the fourth lens group G4. As a result, the position of the synthetic principal point of the first lens group G1 to the fourth lens group G4 is moved toward the object side, and accordingly, the magnification of the fifth lens group G5 becomes small in positive value, and thereby the proportion of contribution to the variation of refractive power by the fifth lens group G5 is decreased.

However, the proportion of contribution to the variation of refractive power by the each of the first lens group G1 to the fourth lens group G4 becomes large, and in particular, the proportion of contribution to the variation of refractive power by the second lens group G2 becomes large during moving of lens groups from the wide-angle end to the telephoto end. As a result, it is difficult to satisfactory restrain variation in off-axis aberration which occurs at the second lens group G2 during moving of lens groups.

Further, in the variable focal length optical system in the above-mentioned embodiment, the first lens group G1 and the fifth lens group G5 are moved toward the object side with an air gap therebetween maintained to be unchanged during moving of lens groups from the wide-angle end to the telephoto end, or the second lens group G2 and the fourth lens group G4 are displaced with an air gap therebetween maintained to be unchanged during moving of lens groups from the wide-angle end to the telephoto end, and thereby it is possible to aim at simplifying the structure of the lens barrel.

Further, during moving of lens groups from the wide-angle end to the telephoto end, the first lens group G1 and the fifth lens group G5 are displaced toward the object side with an air gap therebetween maintained to be unchanged, and further the second lens group G2 and the fourth lens group G4 are displaced with an air gap therebetween maintained to be and unchanged, thereby it is possible to aim at simplifying the structure of lens barrel.

Finally, explanation will be hereinbelow made of a variable focal length optical system, according to the present invention, in which the fourth lens group G4 is displaced toward the object side during moving of lens groups from the wide-angle end to the telephoto end.

The variable focal length optical system as mentioned above, as shown in FIG. 7 (similar to FIG. 1A), is composed of a first lens group having a positive refractive power, a second lens group having a negative refractive power, a third lens group having a positive refractive power, a fourth lens group having a positive refractive power and a fifth lens group having a negative refractive power, these groups being arranged in the mentioned order from the object side.

With this arrangement, during moving of lens groups from the wide-angle end to the telephoto end, at least the first lens group and the fifth lens group are displaced toward the object side so that the air spacial distance between the first lens group and the second lens group along the optical axis, and the air spacial distance between the third lens group and the fourth lens group along the optical axis are respectively increased while the air spacial distance between the second lens group and the third lens group along the optical axis, and the air spacial distance between the fourth lens group and the fifth lens group along the optical axis are respectively decreased. Further, during focusing from a far distance object to a near distance object, the fourth lens group is displaced toward the object side.

Further, the following conditions are satisfied:

$$0.15 < f3/f1 < 0.7 \tag{23}$$

$$0.1 < (d2w-w2t)/(d1t-d1w) < 0.85 \tag{24}$$

where f1 is the effective focal length of the first lens group, f3 is the effective focal length of the third lens group, d1w is the air spacial distance between the first lens group G1 and the second lens group G2 along the optical axis at the wide-angle end, d1t is the air spacial distance between the first lens group G1 and the second lens group G2 along the optical axis at the telephoto end, d2w is the air spacial distance between the second lens group G2 and the third lens group G3 along the optical axis at the wide-angle end, and d2t is the air spacial distance between the second lens group G2 and the third lens group G3 along the optical axis at the telephoto end.

According to a preferred embodiment of the above-mentioned variable focal length optical system, the following condition is satisfied:

$$0.8 < \beta 4t/\beta 4w < 2.5 \tag{25}$$

where $\beta 4w$ is the magnification of image formation by the fourth lens group at the wide-angle end, and $\beta 4t$ is the magnification of image formation by the fourth lens group at the telephoto end.

According to the present invention, the following condition is satisfied:

$$0.4 < (Bft-Bfw)/(ft-fw) < 0.8 \tag{26}$$

where fw is the effective focal length of the entire lens system at the wide-angle end, ft is the effective focal length of the entire lens system at the telephoto end, Bfw is the back focus at the wide-angle end, Bft is the back focus at the telephoto end.

Explanation will be made of conditions with which the fourth lens group G4 carries out focusing.

When the object is moved from a far distance point to a near distance point, the focusing can be made in such a way that the fourth lens group G4 is displaced so as to maintain the image position by the first lens group G1 to the fourth lens group G4 with respect to the fifth lens group G5. In this case, conditions with which the displacement A of the fourth lens group G4 is decreased will be explained using a thin lens system.

At first as shown in FIG. 8, when the position of the object with respect to the fourth lens group G4 is moved by $\delta$, the displacement $\Delta$ of the fourth lens group G4 is exhibited by the following expression (i):

$$\Delta = [\beta 4^2/(\beta 4^2-1)]\sqrt{\delta} \tag{i}$$

by substituting $k=\beta 4^2/(\beta 4^2-1)$ into the expression (i), the value of k is given by the following expressions (j) and (k), depending upon $\beta 4^2$:

$$1 \leq k(\beta 4^2 > 1) \tag{j}$$

$$0 > k(\beta 4^2 < 1) \tag{k}$$

Accordingly, in order to reduce the displacement Δ of the fourth lens group G4, it is necessary to allow the 1/β4 to approach zero in the case of the expression (j). Meanwhile in the case of the expression (k), it is necessary to allow k to approach zero, or to allow β4 to approach zero. According to the present invention, by allowing β4 to approach zero, the displacement Δ of the fourth lens group G4 during focusing is made to be small.

With this arrangement in which D approaches zero as near as possible, it is desirable to allow the synthetic refractive power of the first lens group G1 to the fourth lens group G4 to approach zero as near as possible. That is, it is preferable to allow 1/β3 to approach zero, where β3 is the available magnification of the third lens group G3.

Thus, in the case of focusing by the fourth lens group G4, it is required to set the magnification of image formation of the third lens group G3 and the fourth lens group G4 at a suitable value.

Next, explanation will be hereinbelow made of the above-mentioned conditional expressions (23) to (26).

The conditional expression (23) specifies the ratio between the effective focal length f1 of the first lens group G1 and the effective focal length f3 of the third lens group G3. With the use of this expression, it is possible to aim at balancing between enhancement of the wide angle and shortening of the overall length of the lens at the telephoto end.

In the case of exceeding the upper limit value of the conditional expression (23), the convergent action of the first lens group G1 becomes strong, and accordingly, it is possible to aim at shortening the overall length of the lens at the telephoto end. However, the height of the off-axis optical beam passing through the first lens group G1 is set to be excessively separated away from the optical axis, it causes the diameter of the first lens group G1 to be increased, and further it is difficult to restrain positive distortion aberration.

On the contrary, in the case of falling below the lower limit value of the conditional expression (23), the convergent action of the first lens group G1 becomes weak, and accordingly, the overall length of the lens at the telephoto end is increased. Further, the convergent action of the third lens group G3 becomes strong, and accordingly, the height of the off-axis light beam passing through the third lens group G3 does not appreciably vary during moving of lens groups, thereby the angle of incidence tends to be large. As a result, should the variable focal length optical system be constituted with a less number of lenses, it would be impossible to correct change in off-axis aberration which occurs at the third lens group G3 during moving of lens groups.

The conditional expression (24) specifies the ratio between a variation of the air spacial distance between the first lens group G1 and the second lens group G2 along the optical axis during moving of lens groups along the optical axis, and a variation in the air spacial distance between the second lens group G2 and the third lens group G3 along the optical axis.

In the case of exceeding the upper limit value of the conditional expression (24), the variation of the on-axis air spacial distance between the second lens group G2 and the third lens group G3 increases, and accordingly, the height of the off-axis light beam passing each of the first lens group G1 to the third lens group G3 is set to be largely distant away from the optical axis, thereby it is impossible to restrain variation in coma aberration caused by the angle of field.

On the contrary, in the case of falling below the lower limit value of the conditional expression (24), the variation of the on-axis air spacial distance between the second lens group G2 and the third lens group G3 becomes excessively small during moving of lens groups, and accordingly, no sufficient back focus can be obtained at the wide-angle end, and thereby the diameter of the fifth lens group G5 becomes large. Further, the variation of the on-axis air spacial distance between the first lens group G1 and the second lens group G2 increases during moving of lens groups, the height of the off-axis beam passing through the first lens group G1 is set to be separated away from the optical axis at the telephoto end, and it is impossible to restrain positive distortion aberration.

Further, in the variable focal length optical system in the above-mentioned embodiment, in order to aim at shortening the overall length of the lens at the telephoto end, the upper limit value of the conditional expression (23) is preferably set to 0.65. Further, in order to aim at enhancing the variation of refractive power, the lower limit value of the conditional expression (23) is preferably set to 0.2, or the upper limit value of the conditional expression (24) is preferably set to 0.75.

The conditional expression (25) gives a condition with which variations in various aberrations which occur during focusing from a far distance point to a near distance point by displacing the fourth lens group G4 are satisfactorily corrected.

In the case of exceeding the conditional expression (25), variation in the magnification of image formation by the fourth lens group G4 increases during moving of lens groups. That is, the position of the object point with respect to the fourth lens group G4 largely varies during moving of lens groups. Accordingly, variations in various aberration occur, being accompanied with a change of the position of the object point, and in particular, variation in on-axis aberration at the telephoto end is increased. Further, the displacement of the fourth lens group G4 increases excessively at the telephoto end.

In the case of falling below the lower limit value of the conditional expression (25), the magnification of image formation by the fourth lens group G4 does not vary appreciably. That is, the proportion of contribution to the variation of refractive power by the first lens group G1 to the fourth lens group G4 is decreased, with respect to the variation of refractive power by the entire lens system. As a result, the proportion of contribution to the variation of refractive power by the fifth lens group G5 is excessively increased, and accordingly, it is impossible to satisfactorily restrain variation in off-axis aberration which occurs at the fifth lens group G5 during moving of lens groups.

It is noted that the upper limit value of the conditional expression (25) is preferably set to 1.8 in order to restrain on-axis aberration accompanied with the focusing at the telephoto end.

The conditional expression (26) is identical with the conditional expression (1) as mentioned above, and accordingly, explanation thereof is abbreviated.

Further, the variable focal length optical system, according to the present invention, is composed of a first lens group G1 having a positive refractive power, a second lens group G2 having a negative refractive power, a third lens group G3 having a positive refractive power, a fourth lens group G4 having a positive refractive power and a fifth lens group G5 having a negative refractive power, these groups being arranged in the mentioned order from the object side. With this arrangement, during moving of lens groups from the wide-angle end to the telephoto end, at least the first lens group G1 and the fifth lens group G5 are displaced so that the air spacial distance between the first lens group G1 and the second lens group G2 is increased, but the air spacial distance between the second lens group G2 and the third lens group G3 is decreased, and the air spacial distance between the third lens group G3 and the fourth lens group G4 is increased but the air spacial distance between the fourth lens group G4 and the fifth lens group G5 is decreased. Further, the above-mentioned variable focal length optical system is characterized by satisfying the following conditions:

$$0.05<(f1-f3)/(f1+f3)<0.6 \tag{27}$$

$$0.18<Bfw/fw<0.35 \tag{28}$$

where f1 is the effective focal length of the first lens group, f3 is the effective focal length of the third lens group, fw is the effective focal length of the entire lens system, and Bfw is the back focus at the wide-angle end.

According to a preferred embodiment of the above-mentioned variable focal length optical system, the following conditions are satisfied:

$$-0.4<(f3-f4)/(f3+f4)<0.3 \tag{29}$$

$$0.6<(\beta 5t/\beta 5w)\cdot(fw/ft)<0.9 \tag{30}$$

where f3 is the effective focal length of third lens group G3, F4 is the effective focal length of the fourth lens group G4, $\beta 5w$ is the available magnification of the fifth lens group G5 at the wide-angle end, $\beta 5t$ is the magnification of the fifth lens group at the telephoto end, fw is the effective focal length of the entire lens system at the wide-angle end, and ft is the effective focal length of the entire lens system at the telephoto end.

In the above-mentioned variable focal length optical system, negative lenses are located, nearest to the image side, similar to a conventional variable focal length optical system having a back focus which is not limited. Further, in order to aim at enhancing the wide angle, the back focus at the wide-angle end is suitably shortened so as to set the off-axis light beam passing through the fifth lens group G5 to be off from the optical axis in order to restrain coma aberration due to the image plane. Further, variation in the back focus is made to increase during moving of lens groups so as to change the height of the off-axis light beam passing through the fifth lens group G5 in response to the variation of refractive power so as to restrain coma aberration due to the variation of refractive power.

Further, the overall length of the lens at the wide-angle end is shorter than that at the telephoto end so as to allow variation in the overall length (which is the distance between the lens surface nearest to the image plane and the image surface) of the lens during moving of lens groups to increase, and accordingly, the height of the off-axis light beam passing through the first lens group G1 is set to be near to the optical axis at the wide-angle end, thereby it is possible to aim at decreasing the effective diameter of the front lens.

In the above-mentioned variable focal length optical system, in order to compromise the simplification of the arrangement of the variable focal length optical system with the enhancement of the variation of refractive power, the proportion of contribution to the variation of refractive power by the fifth lens group G5 which is located nearest to the image plane, is reduced while the variation of refractive power is mainly carried out by the first lens group G1 to the fourth lens group G4. In particular, variation in the available magnification of the second lens group G2 is made to increase during moving of lens groups from the wide-angle end to the telephoto end so as to allow the second lens group G2 to contribute to the variation of refractive power.

At the wide-angle end, the first lens group G1 and the second lens group G2 are made to approach together as near as possible, so that the synthetic negative refractive power of the first lens group G1 and the second lens group G2 becomes strong, and further, the first lens group G1 and the second lens group G2 are arranged far away from the image plane so as to ensure a sufficient back focus. Further, the third lens group G3 having a positive refractive power and the fourth lens group G4 having a positive refractive power are made to approach together so as to obtain a positive strong synthetic refractive power.

On the contrary, at the telephoto end, the first lens group G1 having a positive refractive power is displaced toward the object side so as to increase the spacial distance between the first lens group G1 and the second lens group G2 in order to enhance the convergent action, and thereby it is possible to aim at shortening the overall length of the lens. Further, the third lens group G3 having a positive refractive power is displaced toward the object side so as to decrease the spacial distance between the second lens group G2 and the third lens group G3 in order to shorten the overall length of the lens.

In the above-mentioned variable focal length optical system, the synthetic refractive power of the first lens group G1 and the second lens group G2 is always maintained to be negative during moving of lens groups, the air spacial distance between the first lens group G1 and the second lens group G2 is increased during moving of lens groups from the wide-angle end to the telephoto end. Thus, since the second lens group G2 is used for magnification, the synthetic refractive power of the first lens group G1 and the second lens group G2 at the telephoto end is weaker in negative value than at the wide-angle end.

Further, by setting the available magnification $\beta 2w$ at the wide-angle end in such a range as $-1<\beta 2w<0$, a sufficient back focus at the wide-angle end can be obtained, and further, the height of the off-axis light beam passing through the first lens group is set to be near to the optical axis, and thereby it is possible to decrease the effective diameter of the front lens.

Explanation will be made of the conditional expressions (27) to (30).

The conditional expression (27) specifies the ratio between the effective focal lengths of the first lens group G1 and the third lens group G3 so as to aim at balancing between the shortening of the overall length of the lens and the decreasing of the front lens at the telephoto end.

In the case of exceeding the upper limit value of the conditional expression (27), the effective focal length of the first lens group G1 becomes excessively large in comparison with that of the third lens group G3, and accordingly the convergent action by the first lens group G1 becomes excessively weak. Accordingly, it is difficult to aim at shortening the overall length of the lens at the telephoto end.

On the contrary, in the case of falling below the lower limit value of the conditional expression (27), the effective focal length of the third lens group G3 becomes excessively large in comparison with that of the first lens group G1 so that the convergent action by the first lens group G1 becomes strong. Accordingly, although it is advantageous in order to aim at shortening the overall length of the lens, the height of an off-axis light beam passing through the first lens group G1 is set to be off from the optical axis, and accordingly, the effective diameter of the front lens becomes large.

The conditional expression (28) specifies a suitable range for the back focus at the wide-angle end.

In the case of exceeding the upper limit value of the conditional expression (28), a sufficient back focus can be obtained at the wide-angle end, and accordingly, it is possible to aim at decreasing the effective diameter of the rear lens. However, the difference in height between the off-axis light beam and the off-axis light beam passing through the fifth lens group G5 becomes excessively small, and accordingly, it is difficult to correct on-axis aberration and off-axis aberration, independent from each other.

On the contrary, in the case of falling below the lower limit value of the conditional expression (28), no sufficient back focus can be obtained at the wide-angle end. Further, since the height of the off-axis light beam passing through the fifth lens group G5 at the wide-angle end is set to be excessively off from the optical axis, the effective diameter of the rear lens becomes large, and further, it is impossible to satisfactorily restrain positive distortion aberration.

In the above-mentioned variable focal length optical system, it is desirable to satisfy the conditional expressions (29) and (30), simultaneously with the satisfaction of the above-mentioned expressions (27) and (28) in order to satisfactorily restrain variations in various aberration which occur during moving of lens groups while aim at enhancing the variation of refractive power and simplifying the structure.

The conditional expression (29) is adapted to aim at balancing the effective focal lengths Of the third lens group G3 and the fourth lens group G4.

In the case of exceeding the upper limit value of the conditional expression (29), the effective focal length of the fourth lens group G4 becomes large in value in comparison with that of the third lens group G3. As a result, the position of the synthetic principal point of the third lens group G3 and the fourth lens group G4 at the telephoto end is moved toward the object side so as to enhance the convergent action, and accordingly, the overall length of the lens at the telephoto end can be shortened. However, in the case of aiming at enhancing the variation of refractive power, it is difficult to restrain variation in off-axis aberration which occurs at the third lens group G3 during moving of lens groups from the wide-angle end to the telephoto end.

On the contrary, in the case of falling below the lower limit value of the conditional expression (29), the effective focal length of the third lens group G3 becomes large in positive value in comparison with that of the fourth lens group G4. As a result, the position of the synthetic principal point of the third lens group G3 and the fourth lens group G4 is moved toward the image side, and accordingly, it is impossible to aim at shortening the overall length of the lens at the telephoto end. Further, negative spherical aberration which occurs solely at the fourth lens group G4, cannot be corrected, and thereby it is impossible to aim at simplifying the arrangement.

It is noted that the upper limit value and lower limit value of the conditional expression (29) are preferably set to 0.2 and −0.3, respectively, in order to obtain a further satisfactory image forming function.

The conditional expression (30) specifies a suitable range for the proportion of contribution to the variation of refractive power by the fifth lens group G5.

In the case of exceeding the upper limit value of the conditional expression (30), the proportion of contribution to the variation of refractive power by the fifth lens group G5 becomes excessively large, and it is impossible to satisfactorily restrain variation in off-axis aberration which occurs at the fifth lens group G5 during moving of lens groups.

On the contrary, in the case of falling below the lower limit value of the conditional expression (30), the proportion of contribution to the variation of refractive power by the first lens group G1 to the fourth lens group G4 becomes excessively large, and in particular, variation in off-axis aberration which occurs at the second lens group G2 and the third lens group G3 increases. In order to restrain the variation in off-axis aberration, it is required to increase the number of lenses constituting each of the lens groups, which is contrary to the simplification of the arrangement which is one of the objects of the present invention.

In order to further enhance the function of the variable focal length optical system, the effective focal length f1 of the first lens group G1 is set to be larger than the effective focal length fw of the entire lens system at the wide-angle end, and further, it is desirable to satisfy the following conditional expression (31):

$$0.1 < (ft-f1)/(f1-fw) < 1.2 \qquad (31)$$

The conditional expression (31) specifies a suitable value for the effective focal length of the first lens group G1 at each of the wide-angle end and the telephoto end so as to aim at balancing between the shortening of the overall length of the lens and the decreasing of the diameter of each of the lenses at the telephoto end.

In the case of exceeding the upper limit value of the conditional expression (31), the allocation of refractive power at the telephoto end becomes of a telephoto type, and accordingly, it is advantageous in order to aim at shortening the overall length of the lens. However, since the height of the off-axis light beam passing through the first lens group G1 is set to be off from the optical axis, to ensure a predetermined peripheral light quantity be ensured, the diameter of the first lens group G1 becomes large, and accordingly, it is difficult to satisfactorily correct positive off-axis aberration.

On the contrary, in the case of falling below the lower limit value of the conditional expression (31), a sufficient back focus can be obtained at the wide-angle end, and the height of the off-axis light beam passing through the fifth lens group G5 is set to be near to the optical axis, and thereby it is possible to aim at decreasing the effective diameter of the rear lens. However, the overall length of the lens at the telephoto end becomes large, and accordingly, it is unpreferable.

In order to obtain a further satisfactory image forming function, the upper limit value and lower limit value of the conditional expression (31) are preferably set to 1.0 and 0.15, respectively.

In order to aim at miniaturizing the above-mentioned variable focal length optical system and at enhancing the variation of refractive power, in addition to the satisfaction of a part or all of the above-mentioned conditional expressions (27) to (31), it is desirable to displace all lens groups toward the object side during moving of lens groups from the wide-angle end to the telephoto end.

Further, according to the present invention, it is possible to displace the first lens group G1 and the fifth lens group G5 with an air gap therebetween maintained to be unchanged, or the second lens group G2 and the fourth lens group G4 with an air gap therebetween maintained to be unchanged during moving of lens groups in order to simplify the structure of the lens barrel. Further, it is possible to displace the second lens group G2 and the fourth lens group G4 with an air gap therebetween maintained to be unchanged, simultaneously with the displacement of the first lens group G1 and the fifth lens group G5 with an air gap therebetween maintained to be unchanged.

Further, it is possible to displace the first lens group G1 and the third lens group G3, the third lens group G3 and the fifth lens group G5, the second lens group G2 and the fifth lens group G5, or the first lens group G1, the third lens group G3 and the fifth lens group G5, with an air gap therebetween maintained to be unchanged.

Further, the second lens group G2, the third lens group G3, or the fourth lens group G4 is set to be stationary during moving of lens groups, and alternatively, both the second lens group G2 and fourth lens group G4 are set to be stationary in order to simplify the structure of the barrel.

Further, according to the present invention, during focusing from a far distance point to a near distance point, variation in various aberrations which occurs during near distance focusing, is restrained with the use of one of the second lens group G2 to the fifth lens group G5, and thereby it is possible to obtain a satisfactory image forming function. Further, a plurality of lens groups are displaced, independent from one another, or with an air gap therebetween maintained to be unchanged, for near distance focusing, and variation in various aberrations which occur during near distance focusing, can be satisfactorily corrected, in comparison with such a case that only one lens group is displaced for near distance focusing.

Further, according to the present invention, by dividing the second lens group G2 into several subgroups which are then respectively displaced during moving of lens groups from the wide-angle end to the telephoto end, variation in various aberrations which occur during moving of lens groups can be satisfactorily restrained, and further, the variation of refractive power can be enhanced.

Further, according to the present invention, it is preferable to constitute the third lens group G3 with a single positive lens component in order to aim at simplifying the structure of the lens system. Further, by displacing at least the third lens group G3 during the so-called focusing from a far distance object to a near distance object, it is possible to aim at making the focusing lens group lightweight.

Further, according to the present invention, in order to obtain a sufficient back focus at the wide-angle end so as to satisfactorily correct positive distortion aberration, the second lens group G2 preferably incorporates a negative joint lens component having a concave surface facing the object side, and a negative lens component having a concave surface facing the object side, in the mentioned order from the object side.

Further, a variable focal length optical system according to the present invention has, in order from an object side, a first lens group G1 having a positive refractive power, a second lens group G2 having a negative refractive power, a third lens group G3 having a positive refractive power, a fourth lens group G4 having a positive refractive power, and a fifth lens group G5 having a negative refractive power, wherein when the lens groups are moved from a wide-angle end to a telephoto end, at least the first lens group G1 and the fifth lens group G5 are moved toward the object side such that an air gap between the first lens group G1 and the second lens group G2 is increased, an air gap between the third lens group G3 and the fourth lens group G4 is increased, and an air gap between the fourth lens group G4 and the fifth lens group G5 is decreased, and when the lens groups are moved from the wide-angle end to the telephoto end, the third lens group G3 and the fifth lens group G5 are moved with an air gap therebetween maintained to be unchanged.

In a preferred embodiment, if an effective focal length of the third lens group G3 is f3; an effective focal length of the fourth lens group G4 is f4; an air gap along an optical axis between the second lens, group G2 and the third lens group G3 at the wide-angle end is d2w; an air gap along the optical axis between the second lens group G2 and the third lens group G3 at the telephoto end is d2t; an air gap along the optical axis between the third lens group G3 and the fourth lens group G4 is d3w; and an air gap along the optical axis between the third lens group G3 and the fourth lens group G4 is d3t, the following expressions are satisfied:

$$0.2<(f4-f3)/(f4+f3)<0.8 \quad (32)$$

$$1<(d2t-d2w)/(d3t-d3w)<3. \quad (33)$$

Further, in the above variable focal length optical system, the following expressions (34) and (35) are desirably satisfied:

$$0.4<(Bft-Bfw)/(ft-fw)<0.8 \quad (34)$$

$$0.3<(\beta 5t/p5w)/(ft/fw)<0.8. \quad (35)$$

Also, a variable focal length optical system according to another aspect of the present invention has, in order from an object side, a first lens group G1 having a positive refractive power, a second lens group G2 having a negative refractive power, a third lens group G3 having a positive refractive power, a fourth lens group G4 having a positive refractive power, and a fifth lens group G5 having a negative refractive power, wherein, when the lens groups are moved from a wide-angle end to a telephoto end, at least the first lens group G1 and the fifth lens group G5 are moved toward the object side such that an air gap between the first lens group G1 and the second lens group G2 is increased, an air gap between the third lens group G3 and the fourth lens group G4 is increased, and an air gap between the fourth lens group G4 and the fifth lens group G5 is decreased, and, if an available magnification of the third lens group G3 at the telephoto end is $\beta 3t$, the following expression is satisfied:

$$-3<\beta 3t<-1. \quad (36)$$

As a basic structure, the above variable focal length optical system has, in order from the object side, the first lens group G1 having the positive refractive power, the second lens group G2 having the negative refractive power, the third lens group G3 having the positive refractive power, the fourth lens group G4 having the positive refractive power and the fifth lens group G5 having the negative refractive power and when the lens groups are moved from the wide-angle end to the telephoto end, at least the first lens group G1 and the fifth lens group G5 are moved toward the object side such that the distance between the first lens group G1 and the second lens group G2 is increased, the distance between the third lens group G3 and the fourth lens group G4 is increased, and the distance between the fourth lens group G4 and the fifth lens group G5 is decreased.

In addition to the above basic structure, in moving the lens groups from the wide-angle end to the telephoto end, the third lens group G3 and the fifth lens group G5 are moved with an air gap therebetween maintained to be unchanged, or if the available magnification of the third lens group G3 at the telephoto end is $\beta 3t$, the expression $-3<\beta 3t<-1$ is satisfied. Thereby, in the variable focal length optical system, compactness in size, simplicity in structure and high variable refractive power are achieved simultaneously.

As mentioned above, in variable focal length optical systems used for lens shutter-type cameras, a negative lens group is disposed nearest to an image surface. Therefore, in the above variable focal length optical system, in a similar manner to conventional variable focal length optical systems with no limitation in back focus, the fifth lens group G5 disposed nearest to the image side has a negative refractive power. Also, in order to achieve a wider angle, a back focus at the wide-angle end is shortened to a certain degree and the height of an off-axis light beam passing through the fifth lens group G5 is set to be separated away from the optical axis, thereby restraining variation in coma aberration caused by an angle of field.

However, when the back focus at the wide-angle end becomes too short, the height of the off-axis beam passing through the fifth lens group G5 is off away from the optical axis to cause the lens diameter to become large. Therefore, it is desirable to set the back focus at the wide-angle end to a proper value.

Then, during moving the lens groups from the wide-angle end to the telephoto end, variation of back focus is made large and the height of the off-axis light beam passing through the fifth lens group G5 is varied in the refractive power varying operation, whereby variation in coma aberration due to the refractive power varying operation is corrected preferably.

Also, the variation in entire lens length (the distance between the lens surface nearest to the object side and the image surface) is enlarged by shortening the entire lens length at the wide-angle end in comparison with the telephoto end and the height of the off-axis light beam passing through the first lens group G1 at the wide-angle end is set to be near to the optical axis, thereby aiming at reducing the effective diameter of the front lens (the diameter of the first lens group G1).

In the above variable focal length optical system, in order to achieve both high performance and high variable refractive power, the proportion of the contribution to the refractive power varying operation by the fifth lens group G5 disposed nearest to the image surface is reduced, and the first lens group G1 to fourth lens group G4 are burdened with the refractive power varying operation. In particular, the second lens group G2 and the third lens group G3 are burdened with the refractive power varying operation largely.

At the wide-angle end, the first lens group G1 and the second lens group G2 are disposed as near to each other as possible to thereby cause the composite refractive power of the first lens group G1 and the second lens group G2 to become negative and strong, and the first lens group G1 and the second lens group G2 are disposed off away from the image surface to secure a sufficient back focus. Also, the third lens group G3 having the positive refractive power and the fourth lens group G4 having the positive refractive power are disposed near to each other so that the composite refractive power of the third lens group G3 and the fourth lens group G4 becomes positive and strong.

On the other hand, at the telephoto end, the convergent action is enhanced to aim at shortening the overall lens length by moving the first lens group G1 having the positive refractive power toward the object side to widen the distance between the first lens group G1 and the second lens group G2. Also, the overall lens length is further shortened by moving the third lens group G3 having the positive refractive power toward the object side to narrow the distance between the second lens group G2 and the third lens group G3.

In the above variable focal length optical system, the composite refractive power of the first lens group G1 and the second lens group G2 is always negative during moving the lens groups, and the air spatial distance between the first lens group G1 and the second lens group G2 is increased in the refractive power varying operation ranging from the wide-angle end to the telephoto end. Thus, the second lens group G2 is utilized to increase the refractive power, so that the composite refractive power of the first lens group G1 and the second lens group G2 becomes less in negative value at the telephoto end, in comparison with the wide-angle end.

Also, the available magnification β2w of the second lens group G2 at the wide-angle end is set to $-1<\beta 2w<0$. Therefore, at the wide-angle end, a sufficient back focus can be obtained and the height of the off-axis light beam passing through the first lens group G1 is set to be near to the optical axis, leading to reduction of the effective diameter of the front lens (the effective diameter of the first lens group G1).

As mentioned above, due to the advance of a technology on lens barrels, it is possible to move a plurality of lens groups independently of each other during moving the lens groups. However, too complicated a structure of a lens barrel is contrary to demands for low manufacturing cost. Hence, in the present invention, during moving the lens groups, the third lens group G3 and the fifth lens group G5 are moved with an air gap therebetween maintained to be unchanged to aim at simplifying the structure of the lens barrel thereby to prevent the lens barrel from becoming complicated.

Hereinafter, explanation will be made of conditional expressions (32) to (36).

The conditional expression (32) specifies the balance between the effective focal length of the third lens group G3 and the effective focal length of the fourth lens group G4, and aims at equalizing the proportion of the contribution to the variation of refractive power by each lens group.

In the case of exceeding the upper limit value of the conditional expression (32), the effective focal length of the fourth lens group G4 becomes larger in positive value than the effective focal length of the third lens group G3. As a result, the available magnifications of the second lens group G2 and the third lens group G3 are varied largely, and the proportion of the contribution to the variation of refractive power by the second lens group G2 and the third lens group G3 is increased. Hence, it is impossible to restrain variations in various aberrations occurring in the second lens group G2 and the third lens group G3 during the refractive power varying operation, so that high variable refractive power cannot be achieved.

On the other hand, in the case of falling below the lower limit value of the conditional expression (32), the effective focal length of the fourth lens group G4 becomes smaller in positive value than the effective focal length of the third lens group G3, and the proportion of the contribution to the variation of refractive power by the fifth lens group G5 is increased. Consequently, it is impossible to restrain variation in off-axis aberration occurring at the fifth lens group G5 in the refractive power varying operation.

The conditional expression (33) specifies a proper range of the ratio between the amount D2 (d2t–d2w) of change in distance between the second lens group G2 and the third lens group G3 along the optical axis in the refractive power varying operation and the amount D3 (d3t–d3w) of change in distance between the third lens group G3 and the fourth lens group G4 along the optical axis in the refractive power varying operation, and is for achieving high performance in obtaining a predetermined zoom ratio.

In the case of exceeding the upper limit value of the conditional expression (33), the amount D2 of change in distance between the second lens group G2 and the third lens group G3 along the optical axis in the refractive power varying operation becomes too large as compared with the amount D3 of change in distance between the third lens group G3 and the fourth lens group G4 along the optical axis in the refractive power varying operation. As a result, the height of an off-axis light beam passing through the second lens group G2 at the wide-angle end is set to be off away from the optical axis, making it impossible to restrain variation in coma aberration caused by an angle of field.

On the other hand, in the case of falling below the lower limit value of the conditional expression (33), the amount D2 of change in distance between the second lens group G2 and the third lens group G3 along the optical axis in the refractive power varying operation becomes too small as compared with the amount D3 of change in distance between the third lens group G3 and the fourth lens group G4 along the optical axis in the refractive power varying operation. As a result, variation in off-axis aberration occurring at the fourth lens group G4 in the refractive power varying operation becomes large.

It is to be noted that explanation of the conditional expression (34) is omitted since the conditional expression (34) is identical with the aforementioned conditional expression (1).

In the above variable focal length optical system, in order to achieve much higher variable refractive power, it is preferable to set the upper limit value of the conditional expression (34) to 0.7.

As mentioned above, in conventional variable focal length optical systems with no limitation in back focus, the proportion of the contribution to the refractive power varying operation by the negative lens group disposed nearest to the image surface is made large to perform the refractive power varying operation efficiently. However, in order to achieve high variable refractive power and high performance, it is important to reduce a burden of the fifth lens group G5 nearest to the image surface in the refractive power varying operation and to burden the other lens groups with the refractive power varying operation.

Also, if the available magnification of the negative lens group (the fifth lens group G5) nearest to the image surface is β, when the negative lens group is shifted a minute amount δ in the optical axis direction, the amount Δ of shift of the paraxial image surface in the optical axis direction is expressed by:

$$\Delta = \delta \cdot \beta^2. \quad (1)$$

The conditional expression (35) specifies the ratio between the available magnification of the fifth lens group G5 at the wide-angle end and the available magnification of the fifth lens group G5 at the telephoto end, and is for specifying the proportion of the contribution to the refractive power varying operation by the fifth lens group G5 with respect to the refractive power varying operation for the overall lens system.

In the case of exceeding the upper limit value of the conditional expression (36), the proportion of the contribution to the refractive power varying operation by the fifth lens group G5 becomes too large with respect to the refractive power varying operation for the overall lens system, whereby it becomes impossible to restrain variation in off-axis aberration occurring at the fifth lens group G5 in the refractive power varying operation.

Also, as mentioned above, the amount Δ of shift of the paraxial image surface position when the fifth lens group G5 is shifted the minute amount δ in the optical axis direction is proportional to the square of the available magnification β. Therefore, if the available magnification β5t of the fifth lens group G5 at the telephoto end becomes too large in positive value, the image surface position varies largely with respect to the film surface position in manufacture, so that performance in manufacture is promptly deteriorated with respect to performance in designing.

On the other hand, in the case of falling below the lower limit value of the conditional expression (35), the proportion of the contribution to the refractive power varying operation by the fifth lens group G5 becomes too small with respect to the refractive power varying operation for the entire lens system, so that it is impossible to aim at equalizing the proportion of the contribution to the refractive power varying operation by each lens group. In particular, since the proportion of the contribution to the refractive power varying operation by the second lens group G2 and the third lens group G3 is increased, it becomes difficult to restrain variation in off-axis aberration occurring at the second lens group G2 and the third lens group G3.

It is preferable to set the lower limit value of the conditional expression (35) to 0.4 so as to achieve simplicity in structure of each lens group. Also, it is desirable to set the upper limit value of the conditional expression (35) to 0.7 so as to achieve high performance.

Further, in the above variable focal length optical system, both high performance and high variable refractive power can be achieved by satisfying the conditional expression (36).

The conditional expression (36) specifies the available magnification of the third lens group G3 at the telephoto end, and is for aiming at shortening the overall lens length at the telephoto end.

In the case of exceeding the upper limit value of the conditional expression (36), the composite refractive power of the first lens group G1 to the third lens group G3 becomes small in positive value. Therefore, it is impossible to shorten the overall lens length at the telephoto end, which is contrary to the demands for miniaturization.

On the other hand, in the case of falling below the lower limit value of the conditional expression (36), the composite refractive power of the first lens group G1 to the third lens group G3 becomes too large in positive value, so that the symmetry of the distribution of refractive power in the entire lens system is lost greatly. Therefore, positive distortion aberration cannot be restrained.

It is noted that, according to the present invention, in every embodiment, a stop S is preferably located in the vicinity of the center of the lens system (from the surface nearest to the object side to the surface nearest to the image side), and in particular, it is preferably located between the second lens group G2 and the third lens group G3, or between the third lens group G3 and the fourth lens group G4, or between the fourth lens group G4 and the fifth lens group G5.

Further, according to the present invention, by introducing an aspheric surface as at least one of the surfaces, it is possible to obtain a higher image forming function and to aim at simplifying the structure. Further, by setting one or a plurality of lens groups to be eccentric, it is possible to obtain a vibration resistant function. In addition, by displacing the third lens group G3 and the other lens groups with different displacements during focusing, it is possible to obtain a more satisfactory image forming function in the case of moving the object from a far distance point to a near distance point.

The above and other objects, features and advantages of the present invention will be more apparent in view of detailed description of the invention which will be explained hereinbelow with reference to the accompanying drawings.

BRIEF DESCRIPTION OF THE DRAWINGS

FIG. 5 is a view similar to FIG. 1A, showing displacement of the second lens group G2 and the fourth lens group G4 toward the object side during focusing from a far distance object to a near distance object;

DETAILED DESCRIPTION OF THE PREFERRED EMBODIMENTS

Explanation will be hereinbelow made of first to 31st preferred embodiments.

A variable focal length optical system in every embodiment is composed of a first lens group G1 having a positive refractive power, a second lens group G2 of a negative refractive power, a third lens group G3 of a positive refractive power, a fourth lens group G4 of a positive refractive power and a fifth lens group G5 having a negative refractive power, which are arranged in the mentioned order from the object side. During moving of lens groups from a wide-angle end to a telephoto end, at least the first lens group and the fifth lens group G5 are displaced toward the object side so that the spacial distance between the first lens group G1 and the second lens group G2 is increased while the air spacial distance between the second lens group G2 and the third lens group G3 is decreased, and the spacial distance between the third lens group G3 and the fourth lens group G4 is increased while the air spacial distance between the fourth lens group G4 and the fifth lens group G5 are decreased.

Further, in data tables in these embodiments, f is a focal length, FN is an F number, 2ω is a field angle, and Bf is a back focus. Further the numbers at the left end of the table are order numbers. Further, refraction indices and Abbe's numbers are given with respect to d-line (λ=587.6 nm). Further, the diagonal length of an effective image plane is 43.2 which is common to all embodiments.

[First Embodiment]

Figure 9:
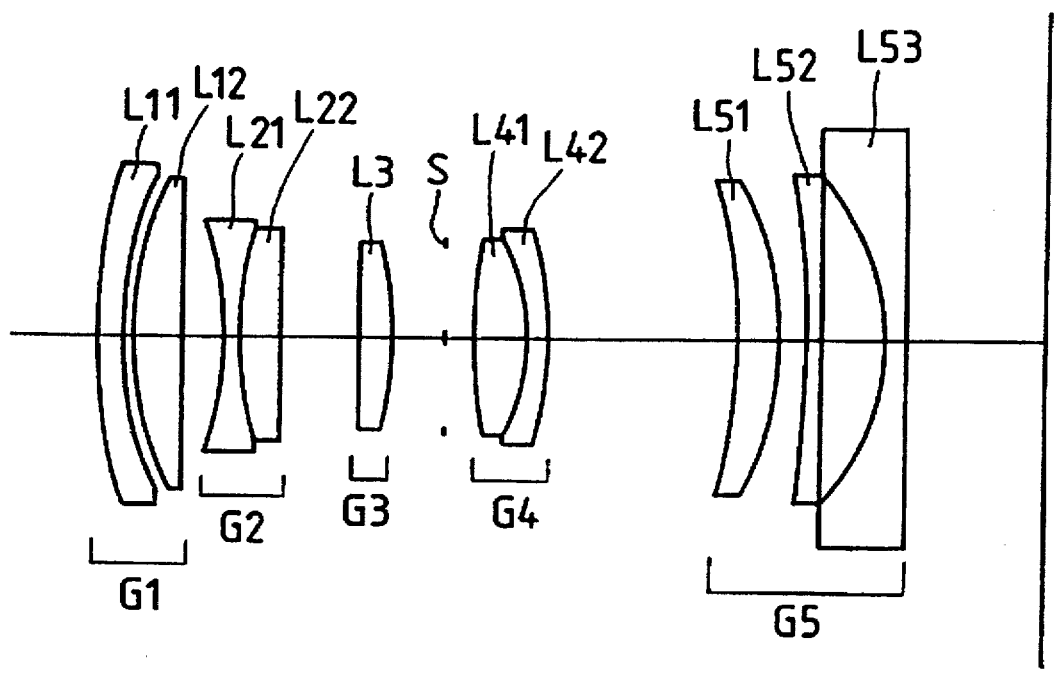
FIG. 9 is a view illustrating a configuration of a variable focal length optical system in a first embodiment of the present invention.

FIG. 9 is a view which shows the configuration of a variable focal length optical system in a first embodiment of the present invention. Viewing from the object side, the first lens group G1 is composed of a negative meniscus lens component L11 having a convex surface facing the object side and a positive meniscus lens component L12 having a convex surface facing the object side. The second lens group G2 is composed of a joint lens consisting of a double concave lens component L21 and a double convex lens component L22. The third lens group G3 is composed of a positive lens component L3, and the fourth lens group G4 is a double convex lens component L41 and a negative meniscus lens component L42 having a convex surface facing the image side, which are joined together. Further, the fifth lens group G5 is composed of a positive meniscus lens component L51 having a convex surface facing the image side, a negative lens component L52 having a concave surface facing the object side, and a negative meniscus lens component L53 having a convex surface facing the image side.

Further, a stop S is located between the third lens group G3 and the fourth lens group G4, and is displaced with the fourth lens group G4 with an air gap therebetween maintained to be unchanged during moving of lens groups from the wide-angle end to the telephoto end.

Table 1 shows data as to the first embodiment.

TABLE 1 f = 39.0 - 63.0 - 110.1 mm
FN = 3.8 - 5.3 - 8.2
2ω = 60.7 - 37.2 - 21.8°

| Surface Number | Radius of Curvature | Intersurface Distance | Refractive Index | Abbe's Number |
|---|---|---|---|---|
| 1 | 40.7433 | 1.625 | 1.80518 | 25.35 |
| 2 | 25.6137 | 0.625 | 1.0 | |
| 3 | 22.6914 | 3.500 | 1.51680 | 64.10 |
| 4 | −308.3136 | (d4) | 1.0 | |
| 5 | −22.3683 | 1.250 | 1.77279 | 49.45 |
| 6 | 25.0827 | 2.875 | 1.71736 | 29.46 |
| 7 | −262.0983 | (d7) | 1.0 | |
| 8 | −118.9653 | 2.000 | 1.69350 | 53.72 |
| 9 | −28.3310 | (d9) | 1.0 | |
| 10 | ∞ | 1.875 | 1.0 | (Stop) |
| 11 | 29.9822 | 3.750 | 1.51860 | 69.98 |
| 12 | −12.5528 | 1.500 | 1.80384 | 33.89 |
| 13 | −21.7448 | (d13) | 1.0 | |
| 14 | −33.5961 | 2.750 | 1.75520 | 27.61 |
| 15 | −21.3898 | 1.875 | 1.0 | |
| 16 | −68.8834 | 1.500 | 1.74810 | 52.30 |
| 17 | −369.8288 | 4.125 | 1.0 | |
| 18 | −15.2111 | 1.500 | 1.71300 | 53.93 |
| 19 | −392.9018 | (Bf) | 1.0 | |

(VARIABLE SPACIAL DISTANCE)

| f | 38.6798 | 63.0106 | 110.0589 |
|---|---|---|---|
| d4 | 2.7116 | 8.7329 | 13.8183 |
| d7 | 5.3867 | 3.5117 | 1.6367 |
| d9 | 3.9091 | 5.7841 | 7.6591 |
| d13 | 12.9295 | 6.9082 | 1.8229 |
| Bf | 9.5748 | 25.2882 | 55.6870 |

(VALUES CORRESPONDING TO CONDITION)

(1) (Bft − Bfw)/(ft − fw) = 0.624
(2) |f2|/f1 = 0.385
(3) (d3t − d3w)/(d4w − d4t) = 0.338
(4) f1/(fw · ft)$^{1/2}$ = 1.176
(5) f3/f4 = 1.651
(6) f5/f2 = 0.864

[Second Embodiment]

Figure 10:
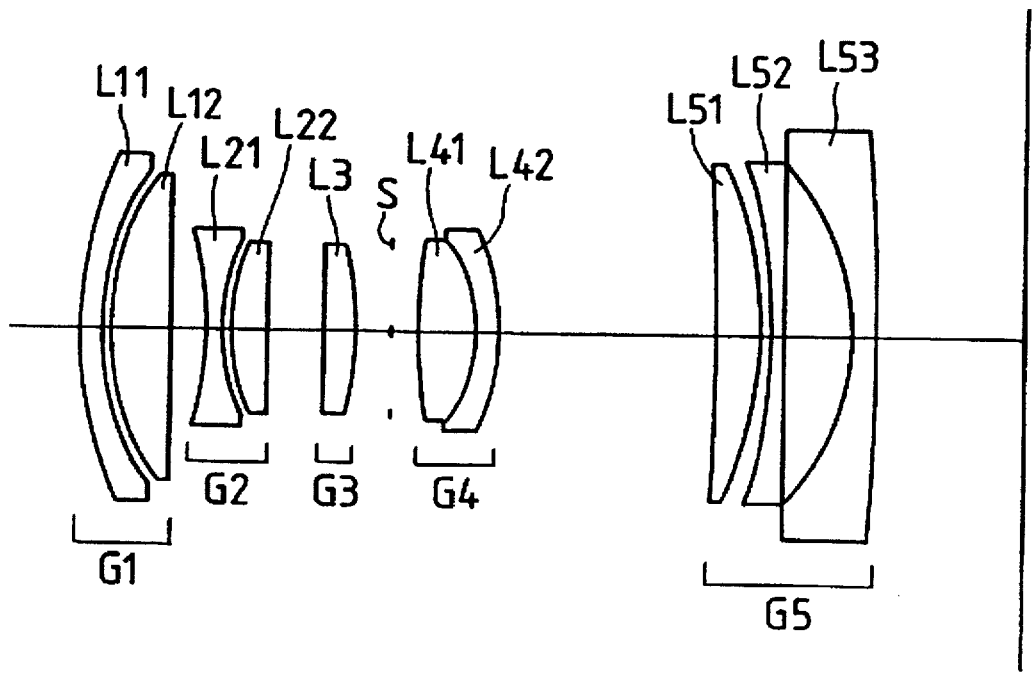
FIG. 10 is a view illustrating a configuration of a variable focal length optical system in a second embodiment of the present invention.

FIG. 10 is a view which shows the configuration of a variable focal length optical system in a second embodiment of the present invention. Viewing from the object side, the first lens group G1 is composed of a negative meniscus lens component L11 having a convex surface facing the object side and a negative meniscus lens component L12 having a convex surface facing the object side. The second lens group G2 is composed of a double concave lens component L21 and a positive lens component L22. The third lens group G3 is composed of a positive lens component L3 having a convex surface facing the image side, and the fourth lens group G4 is a double convex lens component L41 and a negative meniscus lens component L42 having a convex surface facing the image side, which are joined together. Further, the fifth lens group G5 is composed of a positive meniscus lens component L51 having a convex surface facing the image side, a negative lens component L52 having a concave surface facing the object side, and a negative meniscus lens component L53 having a convex surface facing the image side.

Further, a stop S is located between the third lens group G3 and the fourth lens group G4, and is displaced with the fourth lens group G4 with an air gap therebetween maintained to be unchanged during moving of lens groups from the wide-angle end to the telephoto end.

Table 2 shows data as to the second embodiment.

TABLE 2 f = 38.6 - 62.6 - 110.0 mm
FN = 4.2 - 5.6 - 8.2
2ω = 59.2 - 37.2 - 21.8°

| Surface Number | Radius of Curvature | Intersurface Distance | Refractive Index | Abbe's Number |
|---|---|---|---|---|
| 1 | 27.4519 | 1.500 | 1.80518 | 25.35 |
| 2 | 18.3645 | 0.625 | 1.0 | |
| 3 | 17.8638 | 4.125 | 1.51680 | 64.10 |
| 4 | −353.3817 | (d4) | 1.0 | |
| 5 | −24.7098 | 1.250 | 1.79668 | 45.37 |
| 6 | 12.8098 | 0.625 | 1.0 | |
| 7 | 13.8214 | 2.375 | 1.80518 | 25.35 |
| 8 | 80.4735 | (d8) | 1.0 | |
| 9 | −156.8709 | 1.875 | 1.72000 | 50.19 |
| 10 | −29.8857 | (d10) | 1.0 | |
| 11 | ∞ | 1.875 | 1.0 | (Stop) |
| 12 | 40.3162 | 3.875 | 1.51860 | 69.98 |
| 13 | −9.4139 | 1.500 | 1.80518 | 25.35 |
| 14 | −15.6702 | (d14) | 1.0 | |
| 15 | −185.0224 | 3.125 | 1.80518 | 25.35 |
| 16 | −25.8914 | 0.625 | 1.0 | |
| 17 | −41.5681 | 1.375 | 1.84042 | 43.35 |
| 18 | 383.4941 | 4.375 | 1.0 | |
| 19 | −15.7164 | 1.500 | 1.77279 | 49.45 |
| 20 | −154.3462 | (Bf) | 1.0 | |

(VARIABLE SPACIAL DISTANCE)

| f | 38.5878 | 62.5538 | 110.0344 |
|---|---|---|---|
| d4 | 2.1268 | 9.2518 | 15.2518 |
| d8 | 3.8183 | 3.0683 | 1.3183 |
| d10 | 2.4853 | 3.2353 | 4.9853 |
| d14 | 14.9351 | 7.8101 | 1.8101 |
| Bf | 9.9656 | 25.2565 | 51.9257 |

(VALUES CORRESPONDING TO CONDITION)

(1) (Bft − Bfw)/(ft − fw) = 0.587
(2) |f2|/f1 = 0.372
(3) (d3t − d3w)/(d4w − d4t) = 0.190
(4) f1/(fw · ft)$^{1/2}$ = 0.936
(5) f3/f4 = 1.724
(6) f5/f2 = 1.170

[Third Embodiment]

Figure 11:
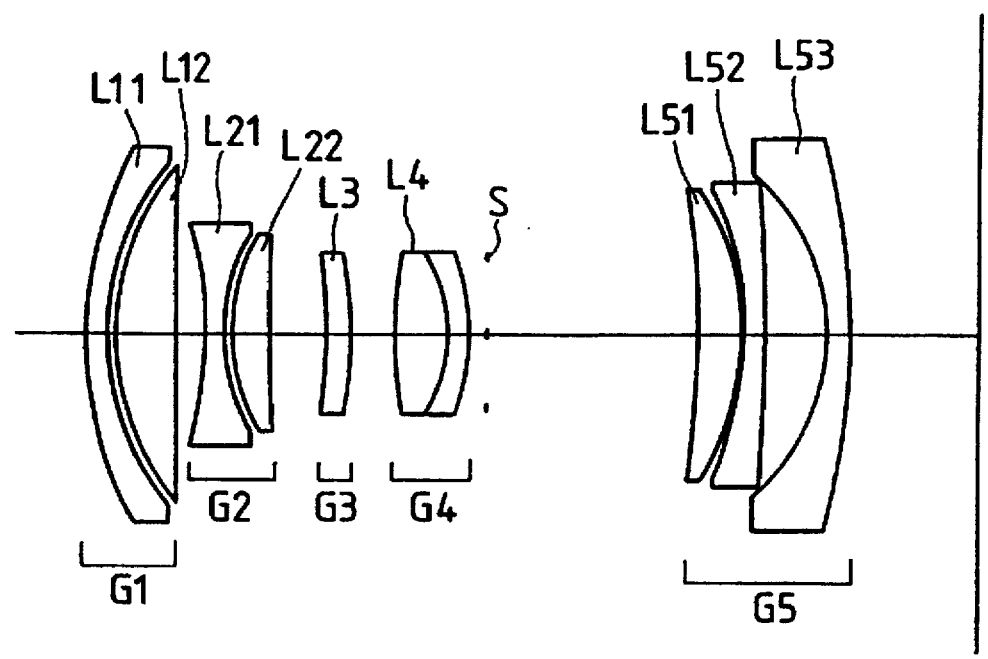
FIG. 11 is a view illustrating a configuration of a variable focal length optical system in a third embodiment of the present invention.

FIG. 11 is a view which shows the configuration of a variable focal length optical system in a third embodiment of the present invention. Viewing from the object side, the first lens group G1 is composed of a negative meniscus lens component L11 having a convex surface facing the object side and a positive meniscus lens component L12 having a convex surface facing the object side. The second lens group G2 is composed of a double concave lens component L21 and a positive lens component L22. The third lens group G3 is composed of a positive lens component L3 having a convex surface facing the image side, and the fourth lens group G4 is a double convex lens component L41 and a negative meniscus lens component L42 having a convex surface facing the image side, which are joined together. Further, the fifth lens group G5 is composed of a positive meniscus lens component L51 having a convex surface facing the image side, a negative lens component L52 having a concave surface facing the object side, and a negative meniscus lens component L53 having a convex surface facing the image side.

Further, a stop S is located between the fourth lens group G4 and the fifth lens group G5, and is displaced with the fourth lens group G4 with an air gap therebetween maintained to be unchanged during moving of lens groups from the wide-angle end to the telephoto end.

Table 3 shows data as to the third embodiment.

TABLE 3 f = 38.6 - 62.8 - 110.5 mm
FN = 4.3 - 5.7 - 8.2
2ω = 61.2 - 38.3 - 20.2°

| Surface Number | Radius of Curvature | Intersurface Distance | Refractive Index | Abbe's Number |
|---|---|---|---|---|
| 1 | 26.2307 | 1.507 | 1.80518 | 25.35 |
| 2 | 18.1619 | 0.628 | 1.0 | |
| 3 | 17.8002 | 4.144 | 1.51680 | 64.10 |
| 4 | −662.2200 | (d4) | 1.0 | |
| 5 | −24.9261 | 1.256 | 1.79668 | 45.37 |
| 6 | 12.6298 | 0.628 | 1.0 | |
| 7 | 13.1592 | 2.386 | 1.80518 | 25.35 |
| 8 | 75.4202 | (d8) | 1.0 | |
| 9 | −49.7506 | 1.884 | 1.65160 | 58.50 |
| 10 | −26.2017 | (d10) | 1.0 | |
| 11 | 30.0377 | 3.893 | 1.51860 | 69.98 |
| 12 | −8.9823 | 1.507 | 1.80518 | 25.35 |
| 13 | −15.4676 | 1.256 | 1.0 | |
| 14 | ∞ | (d14) | 1.0 | (Stop) |
| 15 | −70.3264 | 3.140 | 1.80518 | 25.35 |
| 16 | −18.2405 | 0.126 | 1.0 | |
| 17 | −23.0920 | 1.381 | 1.84042 | 43.35 |
| 18 | −168.5091 | 4.647 | 1.0 | |
| 19 | −13.8140 | 1.507 | 1.77728 | 49.45 |
| 20 | −49.0996 | (Bf) | 1.0 | |

(VARIABLE SPACIAL DISTANCE)

| f | 38.7551 | 62.8096 | 110.5334 |
|---|---|---|---|
| d4 | 2.1910 | 9.0226 | 15.4129 |
| d8 | 4.0075 | 2.8773 | 1.7358 |
| d10 | 2.9230 | 4.0532 | 5.1948 |
| d14 | 14.9662 | 8.1345 | 1.7443 |
| Bf | 7.4599 | 24.4018 | 53.4252 |

(VALUES CORRESPONDING TO CONDITION)

(1) (Bft − Bfw)/(ft − fw) = 0.604
(2) lf2l/f1 = 0.397
(3) (d3t − d3w)/(d4w − d4t) = 0.172
(4) f1/(fw · ft)$^{1/2}$ = 0.912
(5) f3/f4 = 1.104
(6) f5/f2 = 1.432

Table 4 shows data as to the fourth embodiment.

TABLE 4 f = 38.6 - 62.9 - 110.5 mm
FN = 3.9 - 5.4 - 8.2
2ω = 58.6 - 36.4 - 21.4°

| Surface Number | Radius of Curvature | Intersurface Distance | Refractive Index | Abbe's Number |
|---|---|---|---|---|
| 1 | 30.9859 | 1.507 | 1.80518 | 25.35 |
| 2 | 20.1446 | 0.628 | 1.0 | |
| 3 | 19.4694 | 4.144 | 1.51680 | 64.10 |
| 4 | −164.8769 | (d4) | 1.0 | |
| 5 | −24.9301 | 1.256 | 1.79668 | 45.37 |
| 6 | 14.1751 | 0.628 | 1.0 | |
| 7 | 15.1480 | 2.386 | 1.80518 | 25.35 |
| 8 | 87.3709 | 1.256 | 1.0 | |
| 9 | ∞ | (d9) | 1.0 | |
| 10 | 217.2342 | 2.512 | 1.77279 | 49.45 |
| 11 | −36.1502 | (d11) | 1.0 | |
| 12 | 59.3532 | 4.395 | 1.51860 | 69.98 |
| 13 | −10.1461 | 1.507 | 1.80518 | 25.35 |
| 14 | −17.1456 | (d14) | 1.0 | |
| 15 | −46.1922 | 3.140 | 1.80518 | 25.35 |
| 16 | −20.0451 | 0.251 | 1.0 | |
| 17 | −29.9220 | 1.381 | 1.84042 | 43.35 |
| 18 | −59.5239 | 3.893 | 1.0 | |
| 19 | −16.1770 | 1.507 | 1.00000 | 49.45 |
| 20 | −12191.7519 | (Bf) | 1.0 | |

(VARIABLE SPACIAL DISTANCE)

| f | 38.7551 | 62.8096 | 110.5334 |
|---|---|---|---|
| d4 | 2.2205 | 9.1257 | 15.4425 |
| d8 | 4.1854 | 3.1234 | 1.8675 |
| d10 | 3.8371 | 4.8531 | 6.1089 |
| d14 | 16.3596 | 9.4545 | 3.1378 |
| Bf | 7.4599 | 24.4018 | 53.4252 |

(VALUES CORRESPONDING TO CONDITION)

(1) (Bft − Bfw)/(ft − fw) = 0.640
(2) lf2l/f1 = 0.378
(3) (d3t − d3w)/(d4w − d4t) = 0.172
(4) f1/(fw · ft)$^{1/2}$ = 0.952
(5) f3/f4 = 1.129
(6) f5/f2 = 1.130

[Fourth Embodiment]

Figure 12:
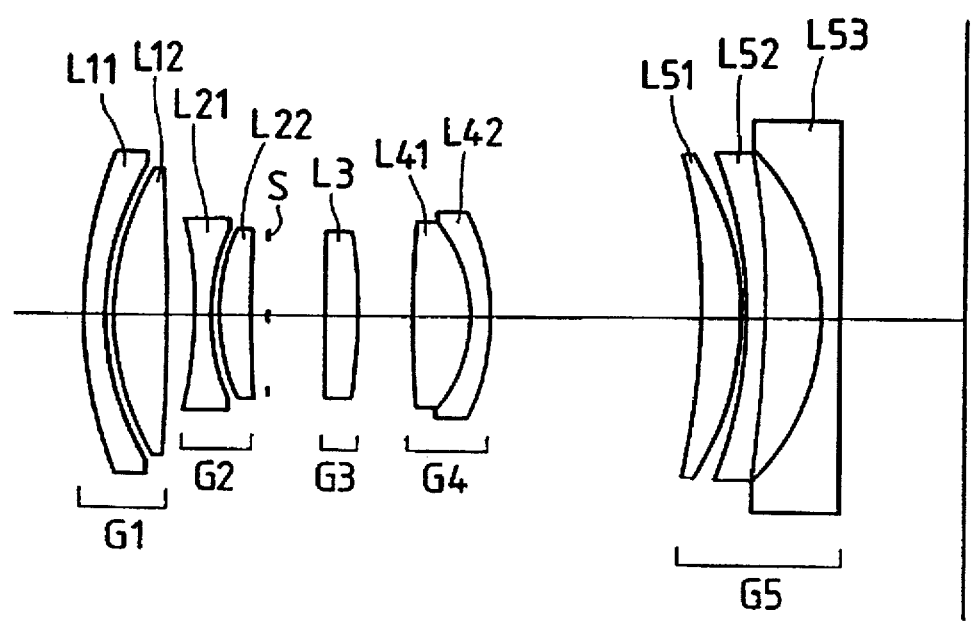
FIG. 12 is a view illustrating a configuration of a variable focal length optical system in a fourth embodiment of the present invention.

FIG. 12 is a view which shows the configuration of a variable focal length optical system in a fourth embodiment of the present invention. Viewing from the object side, the first lens group G1 is composed of a negative meniscus lens component L11 having a convex surface facing the object side and a positive meniscus lens component L12 having a convex surface facing the object side. The second lens group G2 is composed of a double concave lens component L21 and a positive lens component L22. The third lens group G3 is composed of a positive lens component L3 having a convex surface facing the image side, and the fourth lens group G4 is a double convex lens component L41 and a negative meniscus lens component L42 having a convex surface facing the image side, which are joined together. Further, the fifth lens group G5 is composed of a positive meniscus lens component L51 having a convex surface facing the image side, a negative lens component L52 having a concave surface facing the object side, and a negative meniscus lens component L53 having a convex surface facing the image side.

Further, a stop S is located between the fourth lens group G4 and the fifth lens group G5, and is displaced with the fourth lens group G4 with an air gap therebetween maintained to be unchanged during moving of lens groups from the wide-angle end to the telephoto end.

[Fifth Embodiment]

Figure 13:
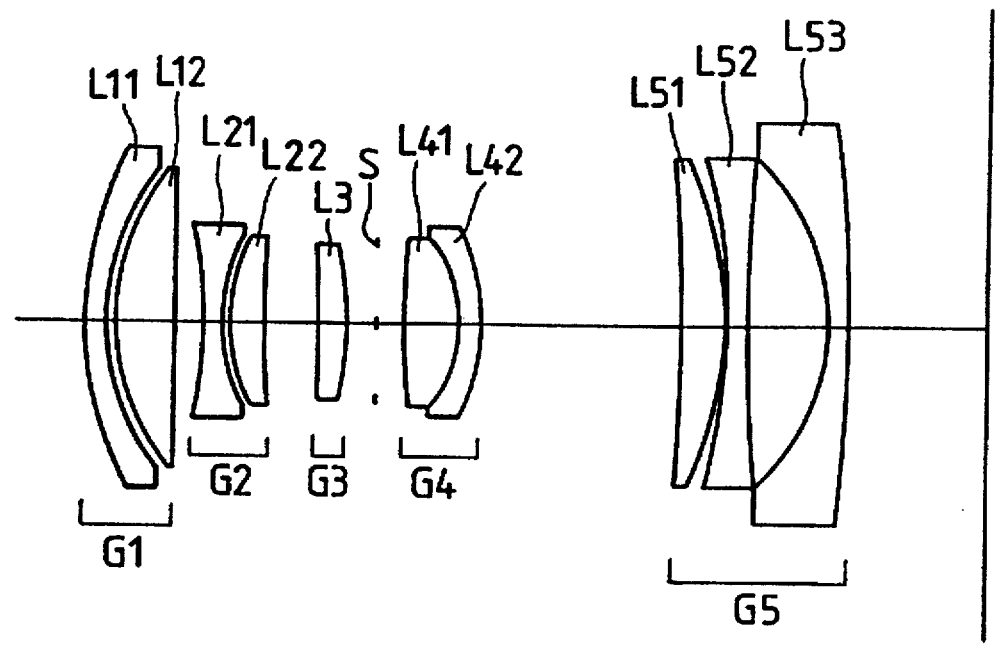
FIG. 13 is a view illustrating a configuration of a variable focal length optical system in a fifth embodiment of the present invention.

FIG. 13 is a view which shows the configuration of a variable focal length optical system in a fifth embodiment of the present invention. Viewing from the object side, the first lens group G1 is composed of a negative meniscus lens component L11 having a convex surface facing the object side and a positive lens component L12 having a convex surface facing the object side. The second lens group G2 is composed of a double concave lens component L21 and a double convex lens component L22. The third lens group G3 is composed of a positive lens component L3, and the fourth lens group G4 is a positive lens component L41 and a negative meniscus lens component L42 having a convex surface facing the image side, which are joined together. Further, the fifth lens group G5 is composed of a positive meniscus lens component L51 having a convex surface facing the image side, a negative lens component L52 having a concave surface facing the object side, and a negative meniscus lens component L53 having a convex surface facing the image side.

Further, a stop S is located between the third lens group G3 and the fourth lens group G4, and is displaced with the fourth lens group G4 with an air gap therebetween maintained to be unchanged during moving of lens groups from the wide-angle end to the telephoto end.

Table 5 shows data as to the fifth embodiment.

TABLE 5 f = 39.1 - 63.6 - 111.5 mm
FN = 4.3 - 5.8 - 8.2
2ω = 58.8 - 36.8 - 21.4°

| Surface Number | Radius of Curvature | Intersurface Distance | Refractive Index | Abbe's Number |
|---|---|---|---|---|
| 1  | 25.0989    | 1.520  | 1.80518 | 25.35 |
| 2  | 17.1367    | 0.633  | 1.0     |       |
| 3  | 16.6810    | 4.180  | 1.51680 | 64.10 |
| 4  | −1168.1795 | (d4)   | 1.0     |       |
| 5  | −26.4996   | 1.267  | 1.79688 | 45.37 |
| 6  | 12.0983    | 0.633  | 1.0     |       |
| 7  | 13.1901    | 2.407  | 1.80518 | 25.35 |
| 8  | 71.0524    | (d8)   | 1.0     |       |
| 9  | −132.9741  | 1.900  | 1.77279 | 49.45 |
| 10 | −30.5999   | (d10)  | 1.0     |       |
| 11 | ∞          | 1.900  | 1.0     |       |
| 12 | 46.2375    | 3.926  | 1.51860 | 69.98 |
| 13 | −8.9901    | 1.520  | 1.80518 | 25.35 |
| 14 | −14.7818   | (d14)  | 1.0     |       |
| 15 | −181.2302  | 3.167  | 1.80518 | 25.35 |
| 16 | −25.2922   | 0.127  | 1.0     |       |
| 17 | −41.3488   | 1.392  | 1.84042 | 43.35 |
| 18 | 137.0659   | 4.813  | 1.0     |       |
| 19 | −15.2520   | 1.520  | 1.71300 | 53.93 |
| 20 | −103.1714  | (Bf)   | 1.0     |       |

(VARIABLE SPACIAL DISTANCE)

| f   | 39.1162 | 63.6382 | 111.4891 |
|-----|---------|---------|----------|
| d4  | 2.0592  | 9.0674  | 15.3955  |
| d8  | 3.7321  | 2.8340  | 1.4407   |
| d10 | 2.3167  | 3.2148  | 4.6081   |
| d14 | 15.0631 | 8.0602  | 1.7269   |
| Bf  | 9.6502  | 24.8256 | 51.1683  |

(VALUES CORRESPONDING TO CONDITION)

(1) (Bft − Bfw)/(ft − fw) = 0.574
(2) lf2l/f1 = 0.391
(3) (d3t − d3w)/(d4w − d4t) = 0.172
(4) f1/(fw · ft)$^{1/2}$ = 0.881
(5) f3/f4 = 1.738
(6) f5/f2 = 1.150

Table 6 shows data as to the sixth embodiment.

TABLE 6 f = 39.0 - 63.0 - 111.0 mm
FN = 4.1 - 6.3 - 8.2
2ω = 58.4 - 30.8 - 21.4°

| Surface Number | Radius of Curvature | Intersurface Distance | Refractive Index | Abbe's Number |
|---|---|---|---|---|
| 1  | 45.2461    | 3.910  | 1.51860 | 69.98 |
| 2  | −38.4631   | 1.387  | 1.86074 | 23.01 |
| 3  | −68.0311   | (D3)   |         |       |
| 4  | −21.2029   | 1.261  | 1.74810 | 52.30 |
| 5  | 18.8737    | 0.883  | 1.0     |       |
| 6  | 18.5809    | 1.892  | 1.86074 | 23.01 |
| 7  | 58.0757    | (D7)   |         |       |
| 8  | 108.4144   | 1.766  | 1.51860 | 69.98 |
| 9  | −25.9721   | (D9)   |         |       |
| 10 | 0.0000     | 1.892  | (Stop)  |       |
| 11 | 40.2646    | 3.279  | 1.51860 | 69.98 |
| 12 | −10.7701   | 1.514  | 1.80518 | 25.35 |
| 13 | −19.6085   | (D13)  |         |       |
| 14 | −150.0761  | 2.900  | 1.80518 | 25.35 |
| 15 | −26.1819   | 1.640  | 1.0     |       |
| 16 | −33.1288   | 1.388  | 1.84042 | 43.35 |
| 17 | −170.7021  | 3.784  | 1.0     |       |
| 18 | −16.6988   | 1.514  | 1.77279 | 49.45 |
| 19 | −296.2525  | (Bf)   |         |       |

(VARIABLE SPACIAL DISTANCE)

| f   | 38.9762 | 75.7195 | 110.9910 |
|-----|---------|---------|----------|
| d3  | 2.0984  | 11.7088 | 16.3425  |
| d7  | 4.0412  | 2.2755  | 1.5188   |
| d9  | 2.7660  | 4.5316  | 5.2884   |
| d13 | 15.4012 | 5.7655  | 1.1570   |
| Bf  | 9.6410  | 32.1316 | 52.2976  |

(VALUES CORRESPONDING TO CONDITION)

(1) (Bft − Bfw)/(ft − fw) = 0.592
(2) lf2l/f1 = 0.360
(3) (d3t − d3w)/(d4w − d4t) = 0.177
(4) f1/(fw · ft)$^{½}$ = 1.008
(5) f3/f4 = 1.111
(6) f5/f2 = 1.189

[Sixth Embodiment]

Figure 14:
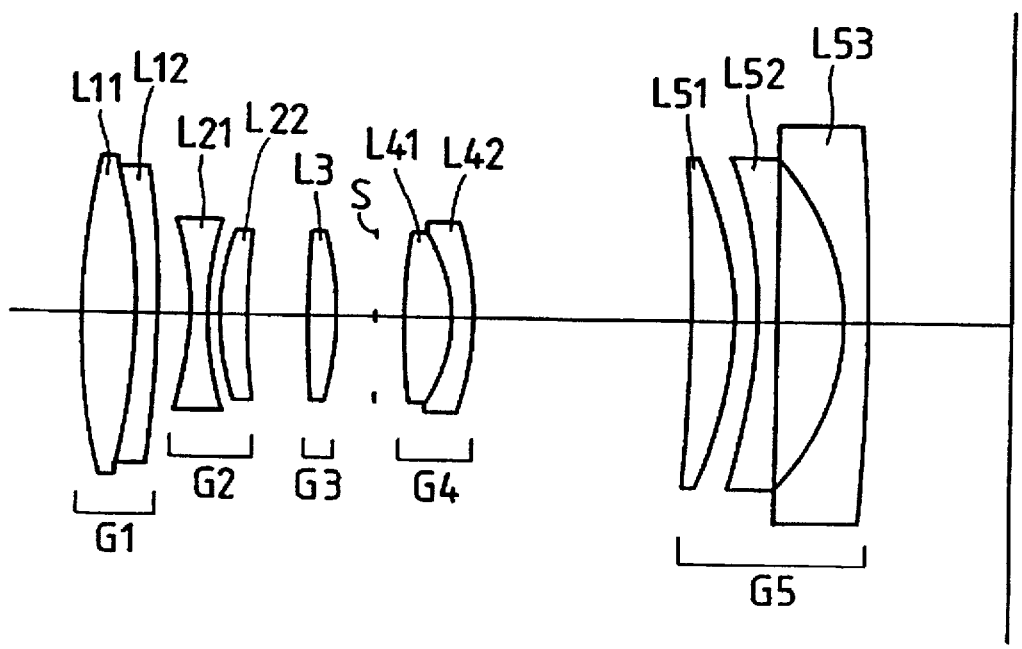
FIG. 14 is a view illustrating a configuration of a variable focal length optical system in a sixth embodiment of the present invention.

FIG. 14 is a view which shows the configuration of a variable focal length optical system in a sixth embodiment of the present invention. Viewing from the object side, the first lens group G1 is composed of a double convex lens component L11, and a negative meniscus lens component L12 having a convex surface facing the image side, which are joined together. The second lens group G2 is composed of a double concave lens component L21 and a double convex lens component L22. The third lens group G8 is composed of a positive lens component L3, and the fourth lens group G4 is a double convex lens component L41 and a negative meniscus lens component L42 having a convex surface facing the image side, which are joined together. Further, the fifth lens group G5 is composed of a positive meniscus lens component L51 having a convex surface facing the image side, a negative lens component L52 having a concave surface facing the object side, and a negative meniscus lens component L53 having a concave surface facing the object side.

Further, a stop S is located between the third lens group G3 and the fourth lens group G4, and is displaced with the fourth lens group G4 with an air gap therebetween maintained to be unchanged during moving of lens groups from the wide-angle end to the telephoto end.

In the following seventh to eleventh embodiments, the third lens group is displaced toward the image side during focusing from a far distance point to a near distance point.

[Seventh Embodiment]

Figure 15:
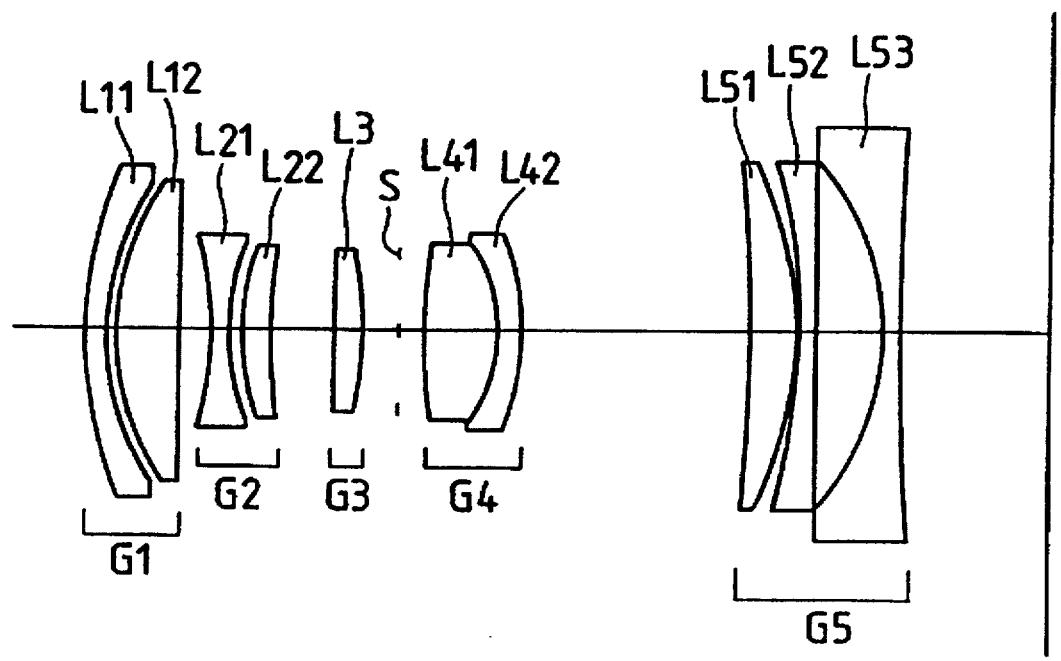
FIG. 15 is a view illustrating a configuration of a variable focal length optical system in a seventh embodiment of the present invention.

FIG. 15 is a view which shows the configuration of a variable focal length optical system in a seventh embodiment of the present invention. Viewing from the object side, the first lens group G1 is composed of a negative meniscus lens component L11 having a convex surface facing the object side and a convex lens component L12. The second lens group G2 is composed of a double concave lens component L21 and a positive lens L22 having a convex surface facing the object side. The third lens group G3 is composed of a positive lens component L3, and the fourth lens group G4 is a double convex lens component L41 and a negative meniscus lens component L42 having a convex surface facing the image side, which are joined together. Further, the fifth lens group G5 is composed of a positive meniscus lens component L51 having a convex surface facing the image side, a negative lens component L52 having a concave surface facing the object side, and a negative lens component L53 having a concave surface facing the object side. Further, the third lens group G3 is displaced toward the image side for focusing.

Further, a stop S is located between the third lens group G3 and the fourth lens group G4, and is displaced with the fourth lens group G4 with an air gap therebetween maintained to be unchanged during moving of lens groups from the wide-angle end to the telephoto end.

Table 7 shows data as to the seventh embodiment.

TABLE 7 f = 38.6 - 110.0 mm
FN = 3.8 - 8.2
2ω = 59.2 - 21.6°

| Surface Number | Radius of Curvature | Intersurface Distance | Refractive Index | Abbe's Number |
|---|---|---|---|---|
| 1 | 29.1906 | 1.500 | 1.80518 | 25.35 |
| 2 | 19.8695 | 0.625 | 1.0 | |
| 3 | 19.0287 | 4.125 | 1.51680 | 64.10 |
| 4 | −469.2893 | (d4) | 1.0 | |
| 5 | −22.3572 | 1.250 | 1.79668 | 45.37 |
| 6 | 16.2500 | 0.875 | 1.0 | |
| 7 | 17.1715 | 2.125 | 1.80518 | 25.35 |
| 8 | 79.1521 | (d8) | 1.0 | |
| 9 | 162.6674 | 1.875 | 1.71300 | 48.04 |
| 10 | −29.1933 | (d10) | 1.0 | |
| 11 | 0.0000 | 1.875 | 1.0 | (stop) |
| 12 | 57.5046 | 4.830 | 1.51860 | 69.98 |
| 13 | −10.2840 | 1.500 | 1.80518 | 25.41 |
| 14 | −17.8930 | (d14) | 1.0 | |
| 15 | −142.9014 | 3.125 | 1.80518 | 25.35 |
| 16 | −26.3479 | 0.125 | 1.0 | |
| 17 | −45.0584 | 1.375 | 1.84042 | 43.35 |
| 18 | −300.5798 | 3.715 | 1.0 | |
| 19 | −18.1606 | 1.500 | 1.77279 | 49.45 |
| 20 | 341.6306 | (Bf) | 1.0 | |

(VARIABLE SPACIAL DISTANCE)

| f | 38.6251 | 110.0014 |
|---|---|---|
| d4 | 2.1250 | 16.6571 |
| d8 | 3.8750 | 1.3750 |
| d10 | 2.5001 | 5.0001 |
| d14 | 16.0323 | 1.5000 |
| Bf | 9.7235 | 51.2989 |

(FOCUSING DISPLACEMENT OF THIRD LENS GROUP UPON PHOTOGRAPHING MAGNIFICATION OF 1/40)

| f | 38.6251 | 110.0014 |
|---|---|---|
| Displacement | 1.0000 | 1.1250 |

(The direction of advance of light is positive.)

(VALUES CORRESPONDING TO CONDITIONS)

| (7) |f2|/f1 = | 0.344 |
|---|---|
| (8) |f2|/f3 = | 0.629 |
| (9) β2w = | −0.601 |
| (10) 1/β3t = | −0.413 |
| (11) (Bft − Bfw)/(ft − fw) = | 0.582 |
| (12) ri/ro = | 0.179 |

[Eighth Embodiment]

Figure 16:
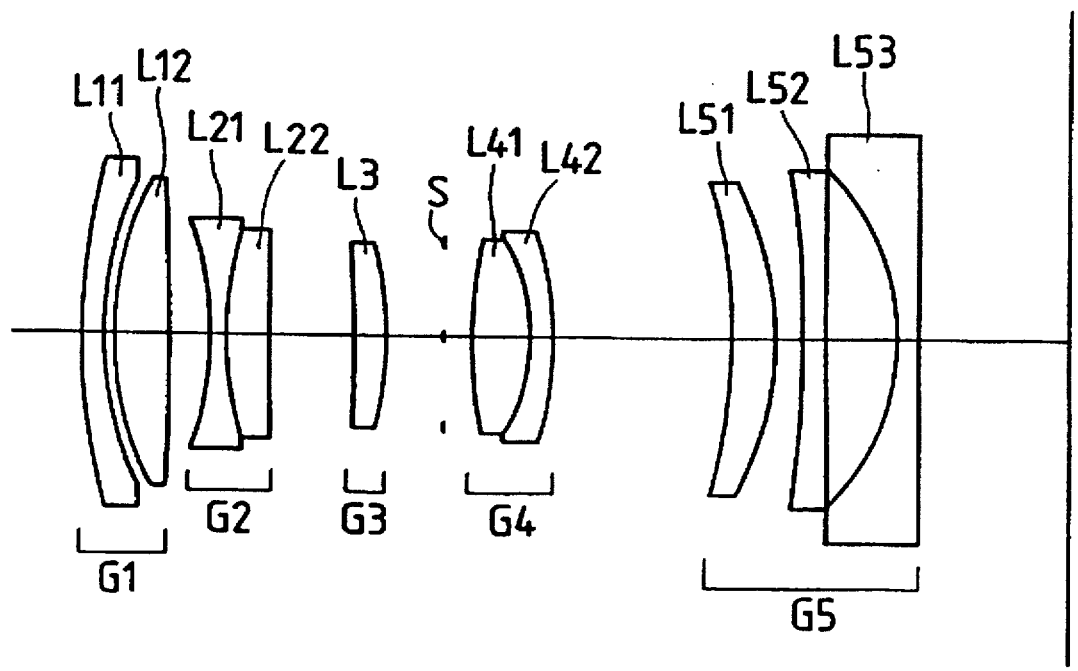
FIG. 16 is a view illustrating a configuration of a variable focal length optical system in an eighth embodiment of the present invention.

FIG. 16 is a view which shows the configuration of a variable focal length optical system in an eighth embodiment of the present invention. Viewing from the object side, the first lens group G1 is composed of a negative meniscus lens component L11 having a convex surface facing the object side and a double convex lens component L12. The second lens group G2 is composed of a double concave lens component L21 and a double convex lens L22. The third lens group G3 is composed of a positive lens component L3, and the fourth lens group G4 is a double convex lens component L41 and a negative meniscus lens component L42 having a convex surface facing the image side, which are joined together. Further, the fifth lens group G5 is composed of a positive meniscus lens component L51 having a convex surface facing the image side, a negative lens component L52 having a concave surface facing the object side, and a negative lens component L53 having a convex surface facing the image side. Further, the third lens group G3 is displaced toward the image side for focusing. Further, a stop S is located between the third lens group G3 and the fourth lens group G4, and is displaced with the fourth lens group G4 with an air gap therebetween maintained to be unchanged during moving of lens groups from the wide-angle end to the telephoto end.

Table 8 shows data as to the eighth embodiment.

TABLE 8 f = 38.8 - 110.9 mm
FN = 3.8 - 8.2
2ω = 60.0 - 21.8°

| Surface Number | Radius of Curvature | Intersurface Distance | Refractive Index | Abbe's Number |
|---|---|---|---|---|
| 1 | 40.7432 | 1.625 | 1.80518 | 25.35 |
| 2 | 25.6136 | 0.625 | 1.0 | |
| 3 | 22.6914 | 3.500 | 1.51680 | 64.10 |
| 4 | −308.3111 | (d4) | 1.0 | |
| 5 | −22.3682 | 1.250 | 1.77279 | 49.45 |
| 6 | 25.0826 | 2.875 | 1.71736 | 29.46 |
| 7 | −262.0955 | (d7) | 1.0 | |
| 8 | −118.9650 | 2.000 | 1.69350 | 53.72 |
| 9 | −28.3310 | (d9) | 1.0 | |
| 10 | 0.0000 | 1.875 | 1.0 | (stop) |
| 11 | 29.9815 | 3.750 | 1.51860 | 69.98 |
| 12 | −12.5527 | 1.500 | 1.80384 | 33.89 |
| 13 | −21.7448 | (d13) | 1.0 | |
| 14 | −33.4960 | 2.750 | 1.75520 | 27.61 |
| 15 | −21.3897 | 1.875 | 1.0 | |
| 16 | −68.8834 | 1.500 | 1.74810 | 52.30 |
| 17 | −369.8287 | 4.125 | 1.0 | |
| 18 | −15.2111 | 1.500 | 1.71300 | 53.93 |
| 19 | −392.9243 | (Bf) | 1.0 | |

(VARIABLE SPACIAL DISTANCE)

| f | 38.7576 | 110.8765 |
|---|---|---|
| d4 | 2.7116 | 13.8183 |
| d7 | 5.3867 | 1.6367 |
| d9 | 3.9091 | 7.6591 |
| d13 | 12.9295 | 1.8229 |
| Bf | 9.6082 | 54.5535 |

(FOCUSING DISPLACEMENT OF THIRD LENS GROUP UPON PHOTOGRAPHING MAGNIFICATION OF 1/40)

| f | 38.7576 | 110.8765 |
|---|---|---|
| Displacement | 1.9410 | 1.2898 |

(The direction of advance of light is positive.)

(VALUES CORRESPONDING TO CONDITIONS)

| (7) |f2|/f1 = | 0.385 |
|---|---|
| (8) |f2|/f3 = | 0.556 |
| (9) β2w = | −0.707 |
| (10) 1/β3t = | −0.199 |
| (11) (Bft − Bfw)/(ft − fw) = | 0.623 |
| (12) ri/ro = | 0.238 |

[Ninth Embodiment]

Figure 17:
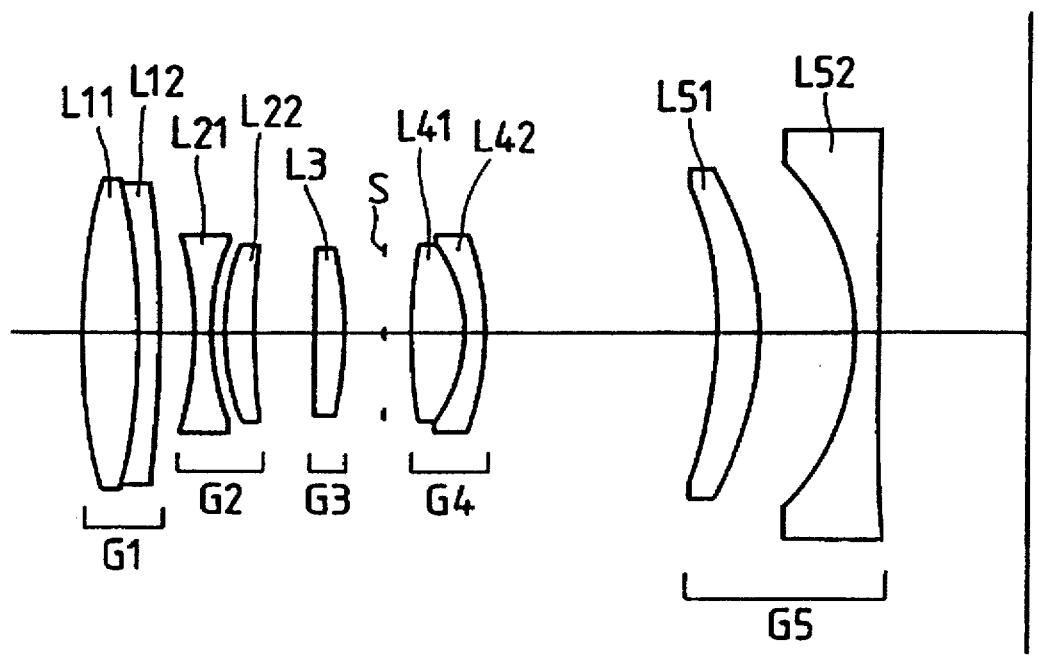
FIG. 17 is a view illustrating a configuration of a variable focal length optical system in a ninth embodiment of the present invention.

FIG. 17 is a view which shows the configuration of a variable focal length optical system in a ninth embodiment of the present invention. Viewing from the object side, the first lens group G1 is composed of a positive lens component L11 having a convex surface facing the object side and a negative lens component L12. The second lens group G2 is composed of a double concave lens component L21 and a positive meniscus lens L22 having a convex surface facing the object side. The third lens group G3 is composed of a positive lens component L3, and the fourth lens group G4 is a double convex lens component L41 and a negative meniscus lens component L42 having a convex surface facing the image side, which are joined together. Further, the fifth lens group G5 is composed of a positive meniscus lens component L51 having a convex surface facing the image side, and a negative lens component L52 having a concave surface facing the object Side. Further, the third lens group G3 is displaced toward the image side for focusing. Further, a stop S is located between the third lens group G3 and the fourth lens group G4, and is displaced with the fourth lens group G4 with an air gap therebetween maintained to be unchanged during moving of lens groups from the wide-angle end to the telephoto end.

Table 9 shows data as to the ninth embodiment.

TABLE 9 f = 38.6 - 110.0 mm
FN = 4.3 - 8.2
2ω = 57.8 - 21.4°

| Surface Number | Radius of Curvature | Intersurface Distance | Refractive Index | Abbe's Number |
|---|---|---|---|---|
| 1 | 41.6555 | 3.875 | 1.51860 | 69.98 |
| 2 | -40.9499 | 1.500 | 1.86074 | 23.01 |
| 3 | -69.3153 | (d3) | 1.0 | |
| 4 | -22.5724 | 1.250 | 1.79668 | 45.37 |
| 5 | 16.2500 | 0.875 | 1.0 | |
| 6 | 16.8559 | 2.125 | 1.80518 | 25.35 |
| 7 | 82.9412 | (d7) | 1.0 | |
| 8 | -699.6477 | 1.875 | 1.71700 | 48.04 |
| 9 | -29.9783 | (d9) | 1.0 | |
| 10 | 0.0000 | 1.875 | 1.0 | (stop) |
| 11 | 42.3084 | 3.502 | 1.51680 | 64.10 |
| 12 | -10.2134 | 1.500 | 1.80518 | 25.35 |
| 13 | -17.5701 | (d13) | 1.0 | |
| 14 | -27.5027 | 2.875 | 1.86074 | 27.61 |
| 15 | -21.0986 | 6.425 | 1.0 | |
| 16 | -16.4134 | 1.500 | 1.77279 | 49.45 |
| 17 | 683.1664 | (Bf) | 1.0 | |

(VARIABLE SPACIAL DISTANCE)

| f | 38.5666 | 109.9816 |
|---|---|---|
| d3 | 2.2306 | 16.3481 |
| d7 | 3.9630 | 1.4630 |
| d9 | 2.8092 | 5.3092 |
| d13 | 15.8838 | 1.7662 |
| Bf | 9.7695 | 52.0053 |

(FOCUSING DISPLACEMENT OF THIRD LENS GROUP UPON PHOTOGRAPHING MAGNIFICATION OF 1/40)

| f | 38.5666 | 109.9816 |
|---|---|---|
| Displacement | 1.0566 | 1.1256 |

(The direction of advance of light is positive.)

(VALUES CORRESPONDING TO CONDITIONS)

| (7) |f2|/f1 = | 0.371 |
|---|---|
| (8) |f2|/f3 = | 0.520 |
| (9) β2w = | -0.658 |
| (10) 1/β3t = | -0.232 |
| (11) (Bft - Bfw)/(ft - fw) = | 0.591 |
| (12) ri/ro = | 0.043 |

[Tenth Embodiment]

Figure 18:
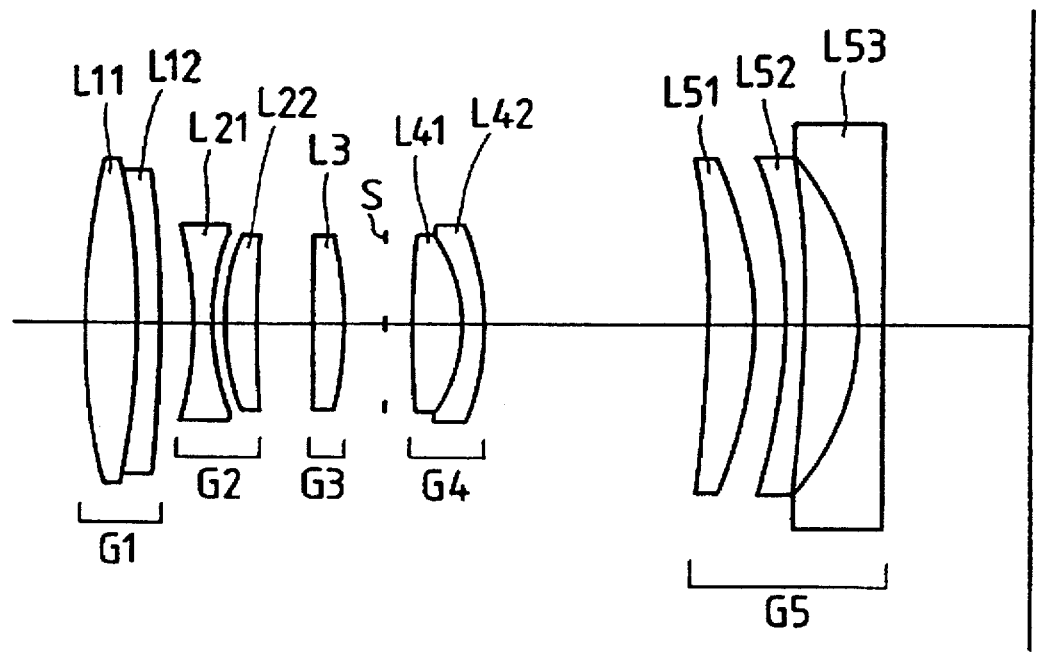
FIG. 18 is a view illustrating a configuration of a variable focal length optical system in a tenth embodiment of the present invention.

FIG. 18 is a view which shows the configuration of a variable focal length optical system in a tenth embodiment of the present invention. Viewing from the object side, the first lens group G1 is composed of a positive meniscus lens component L11 having a convex surface facing the object side and a negative lens component L12. The second lens group G2 is composed of a double concave lens component L21 and a positive meniscus lens L22 having a convex surface facing the object side. The third lens group G3 is composed of a positive lens component L3, and the fourth lens group G4 is a double convex lens component L41 and a negative meniscus lens component L42 having a convex surface facing the image side, which are joined together. Further, the fifth lens group G5 is composed of a positive meniscus lens component L51 having a convex surface facing the image side, a negative lens component L52 having a concave surface facing the object side, and a negative lens component L53 having a concave surface facing the object side. Further, the third lens group G3 is displaced toward the object side for focusing.

Further, a stop S is located between the third lens group G3 and the fourth lens group G4, and is displaced with the fourth lens group G4 with an air gap therebetween maintained to be unchanged during moving of lens groups from the wide-angle end to the telephoto end.

Table 10 shows data as to the tenth embodiment.

TABLE 10 f = 38.8 - 110.5 mm
FN = 4.3 - 8.2
2ω = 57.8 - 21.4°

| Surface Number | Radius of Curvature | Intersurface Distance | Refractive Index | Abbe's Number |
|---|---|---|---|---|
| 1 | 42.6786 | 3.893 | 1.51860 | 69.98 |
| 2 | -42.1558 | 1.507 | 1.86074 | 23.01 |
| 3 | -73.5641 | (d3) | 1.0 | |
| 4 | -22.9014 | 1.256 | 1.79668 | 45.37 |
| 5 | 16.3256 | 0.879 | 1.0 | |
| 6 | 17.0680 | 2.134 | 1.80518 | 25.35 |
| 7 | 99.5856 | (d7) | 1.0 | |
| 8 | -3716.4597 | 1.884 | 1.71700 | 48.04 |
| 9 | -30.9835 | (d9) | 1.0 | |
| 10 | 0.0000 | 1.884 | 1.0 | (stop) |
| 11 | 45.5012 | 3.518 | 1.51860 | 69.98 |
| 12 | -10.4209 | 1.507 | 1.80518 | 25.35 |
| 13 | -18.0293 | (d13) | 1.0 | |
| 14 | -73.3316 | 3.140 | 1.80518 | 35.35 |
| 15 | -26.0305 | 2.130 | 1.0 | |
| 16 | -34.1206 | 1.381 | 1.84042 | 43.35 |
| 17 | -76.7867 | 3.316 | 1.0 | |
| 18 | -17.1995 | 1.507 | 1.77279 | 49.45 |
| 19 | -4504.6071 | (Bf) | 1.0 | |

(VARIABLE SPACIAL DISTANCE)

| f | 38.8047 | 110.5120 |
|---|---|---|
| d3 | 2.1349 | 16.3181 |
| d7 | 3.8931 | 1.3814 |
| d9 | 2.7628 | 5.2744 |
| d13 | 15.6901 | 1.5069 |
| Bf | 9.7703 | 52.3283 |

(FOCUSING DISPLACEMENT OF THIRD LENS GROUP UPON PHOTOGRAPHING MAGNIFICATION OF 1/40)

| f | 38.8047 | 110.5120 |
|---|---|---|
| Displacement | 1.1302 | 1.1303 |

(The direction of advance of light is positive.)

(VALUES CORRESPONDING TO CONDITIONS)

| (7) |f2|/f1 = | 0.370 |
|---|---|
| (8) |f2|/f3 = | 0.545 |
| (9) β2w = - | -0.649 |
| (10) 1/β3t = - | -0.255 |
| (11) (Bft - Bfw)/(ft - fw) = | 0.593 |
| (12) ri/ro = | 0.008 |

[Eleventh Embodiment]

Figure 19:
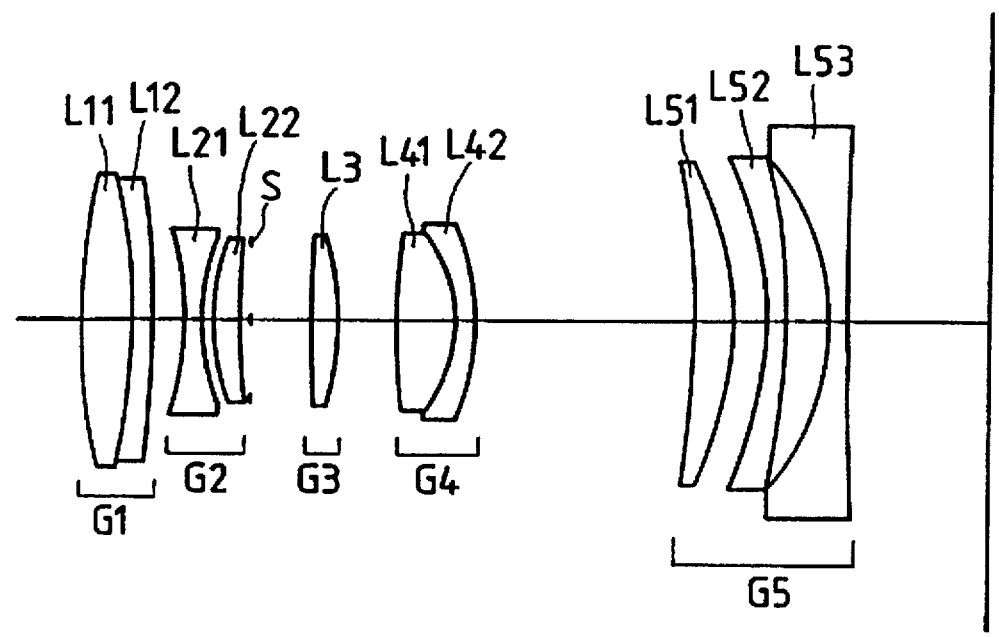
FIG. 19 is a view illustrating a configuration of a variable focal length optical system in an eleventh embodiment of the present invention.

FIG. 19 is a view which shows the configuration of a variable focal length optical system in an eleventh embodiment of the present invention. Viewing from the object side, the first lens group G1 is composed of a positive lens component L11 having a convex surface facing the object side and a negative lens component L12. The second lens group G2 is composed of a double concave lens component L21 and a positive meniscus lens L22 having a convex surface facing the object side. The third lens group G3 is composed of a positive lens component L3, and the fourth lens group G4 is a double convex lens component L41 and a negative meniscus lens component L42 having a convex surface facing the image side, which are joined together. Further, the fifth lens group G5 is composed of a positive meniscus lens component L51 having a convex surface facing the image side, a negative lens component L52 having a concave surface facing the object side, and a negative lens component L53 having a concave surface facing the object side. Further, the third lens group G3 is displaced toward the image side for focusing. Further, a stop S is located between the second lens group G2 and the third lens group G3, and is displaced with the second lens group G2 with an air gap therebetween maintained to be unchanged during moving of lens groups from the wide-angle end to the telephoto end.

Table 11 shows data as to the eleventh embodiment.

TABLE 11 f = 38.6 - 109.9 mm
FN = 4.0 - 8.2
2ω = 58.8 - 21.6°

| Surface Number | Radius of Curvature | Intersurface Distance | Refractive Index | Abbe's Number |
|---|---|---|---|---|
| 1 | 43.2237 | 3.875 | 1.51860 | 69.98 |
| 2 | -38.2584 | 1.500 | 1.86074 | 23.01 |
| 3 | -65.4191 | (d3) | 1.0 | |
| 4 | -22.0600 | 1.250 | 1.77279 | 49.45 |
| 5 | 16.2500 | 0.875 | 1.0 | |
| 6 | 17.2900 | 1.875 | 1.80518 | 25.35 |
| 7 | 78.6427 | 0.625 | 1.0 | |
| 8 | 0.0000 | (d8) | 1.0 | (stop) |
| 9 | 99.3991 | 1.750 | 1.56883 | 56.05 |
| 10 | -26.2202 | (d10) | 1.0 | |
| 11 | 56.0487 | 3.846 | 1.51860 | 69.98 |
| 12 | -10.7462 | 1.500 | 1.80518 | 25.35 |
| 13 | -18.9186 | (d13) | 1.0 | |
| 14 | -56.7251 | 2.875 | 1.80518 | 25.35 |
| 15 | -23.4677 | 2.354 | 1.0 | |
| 16 | -26.0576 | 1.375 | 1.84042 | 43.35 |
| 17 | -47.4149 | 2.675 | 1.0 | |
| 18 | -18.3407 | 1.500 | 1.77279 | 49.45 |
| 19 | 697.3458 | (Bf) | 1.0 | |

(VARIABLE SPACIAL DISTANCE)

| f | 38.6190 | 109.9455 |
|---|---|---|
| d3 | 2.1250 | 16.5725 |
| d8 | 4.3750 | 1.8750 |
| d10 | 4.1434 | 6.6434 |
| d13 | 15.9476 | 1.5000 |
| Bf | 9.9470 | 54.4660 |

(FOCUSING DISPLACEMENT OF THIRD LENS GROUP UPON PHOTOGRAPHING MAGNIFICATION OF 1/40)

| f | 38.6190 | 109.9455 |
|---|---|---|
| Displacement | 1.0740 | 1.2470 |

(The direction of advance of light is positive.)

(VALUES CORRESPONDING TO CONDITIONS)

| (7) |f2|/f1 = | 0.363 |
|---|---|
| (8) |f2|/f3 = | 0.617 |
| (9) β2ω = | -0.630 |
| (10) 1/β3t = | -0.442 |
| (11) (Bft - Bfw)/(ft - fw) = | 0.624 |
| (12) ri/ro = | -0.264 |

In the following twelfth to sixteenth embodiments, the second lens group and the fourth lens group are displaced toward the object side during focusing from a far distance object to a near distance object.

[Twelfth Embodiment]

Figure 20:
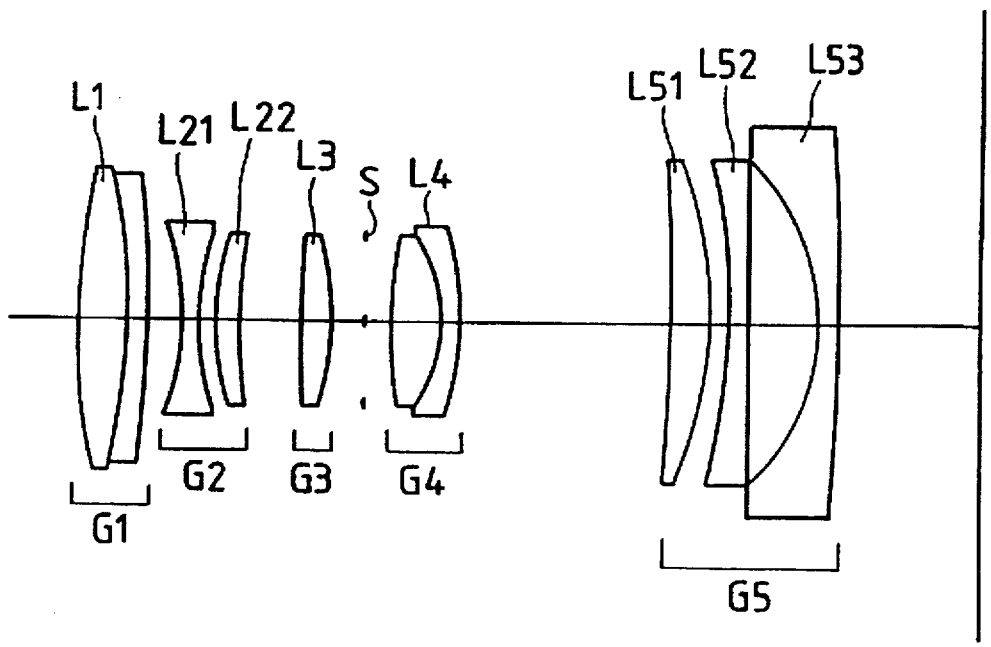
FIG. 20 is a view illustrating a configuration of a variable focal length optical system in a twelfth embodiment of the present invention.

FIG. 20 is a view which shows the configuration of a variable focal length optical system in a twelfth embodiment of the present invention. Viewing from the object side, the first lens group G1 is composed of a positive joint lens component L1 consisting of a double convex lens and a negative meniscus lens having a concave surface facing the object side. The second lens group G2 is composed of a double concave lens component L21 and a positive meniscus lens L22 having a convex surface facing the object side. The third lens group G3 is composed of a double convex lens component L3, and the fourth lens group G4 is a positive joint lens component L4 consisting of a double convex lens component L41 and a negative meniscus lens component L42 having a convex surface facing the object side. Further, the fifth lens group G5 is composed of a positive meniscus lens L51 having a concave surface facing the object side, a negative meniscus lens L52 having a concave surface facing the object side, and a negative meniscus lens L53 having a concave surface facing the object side.

FIG. 20 shows the positional relationship of the lens groups at the wide-angle end, and they are displaced on the optical axis along a zoom locus indicated by the arrow in FIG. 5 during moving of lens groups from the wide-angle end to the telephoto end.

In more detail, during moving of lens groups from the wide-angle end to the telephoto end, the first lens group G1 and the fifth lens group G5 are displaced toward the object side with an air gap therebetween maintained to be unchanged, and the second lens group G2 and the fourth lens group G4 are displaced toward the object side with an air gap therebetween maintained to be unchanged. Further, the second lens group G2 and the fourth lens group G4 are displaced toward the object side with an air gap therebetween maintained to be unchanged for focusing. Further, a stop S is located between the third lens group G3 and the fourth lens group G4, and is displaced with the fourth lens group G4 with an air gap therebetween maintained to be unchanged during moving of lens groups from the wide-angle end to the telephoto end.

Table 12 shows data as to the twelfth embodiment.

TABLE 12 f = 38.8 - 110.5 mm
FN = 4.1 - 8.2
2ω = 58.6 - 21.6°

| Surface Number | Radius of Curvature | Intersurface Distance | Refractiv Index | Abbe's Number |
|---|---|---|---|---|
| 1 | 45.6311 | 3.642 | 1.51860 | 69.98 |
| 2 | -40.2867 | 1.381 | 1.86074 | 23.01 |
| 3 | -70.8697 | (d3 = variable) | | |
| 4 | -20.1996 | 1.256 | 1.74810 | 52.30 |
| 5 | 22.4492 | 1.005 | | |
| 6 | 19.7810 | 1.758 | 1.86074 | 23.01 |
| 7 | 54.9186 | (d7 = variable) | | |
| 8 | 124.3705 | 1.884 | 1.51860 | 69.98 |
| 9 | -25.1309 | (d9 = variable) | | |
| 10 | ∞ | 1.884 | | (stop) |
| 11 | 37.8178 | 3.265 | 1.53996 | 59.60 |
| 12 | -10.9017 | 1.256 | 1.80518 | 25.35 |
| 13 | -21.5565 | (d13 = variable) | | |
| 14 | -164.4925 | 2.888 | 1.80518 | 25.35 |
| 15 | -27.4630 | 1.223 | | |
| 16 | -44.5542 | 1.381 | 1.84042 | 43.35 |
| 17 | -1507.8848 | 3.998 | | |
| 18 | -15.8427 | 1.507 | 1.77279 | 49.45 |
| 19 | -207.8983 | (Bf) | | |

TABLE 12-continued (VARIABLE SPACIAL DISTANCE)

| f   | 38.8032 | 110.5132 |
|-----|---------|----------|
| d3  | 2.1349  | 15.9488  |
| d7  | 4.0186  | 1.5070   |
| d9  | 2.2605  | 4.7721   |
| d13 | 15.0698 | 1.2558   |
| Bf  | 9.7398  | 53.0727  |

FOCUSING DISPLACEMENT OF LENS GROUPS UPON
PHOTOGRAPHING MAGNIFICATION OF −1/40)

| f | 38.8032 | 110.5132 |
|---|---------|----------|
| Displacement | 0.4221 | 0.3326 |

(The sign of the displacement is positive in a direction toward the object.)

(VALUES CORRESPONDING TO CONDITIONS)

| (13) lf2l/f1 = | 0.363 |
|---|---|
| (14) (Bft − Bfw)/(ft − fw) = | 0.604 |
| (15) (f3 − f4)/(f3 + f4) = | 0.047 |
| (16) f1/(fw · ft)$^{1/2}$ = | 1.026 |
| (17) f5/f2 = | 1.147 |

[Thirteenth Embodiment]

Figure 21:
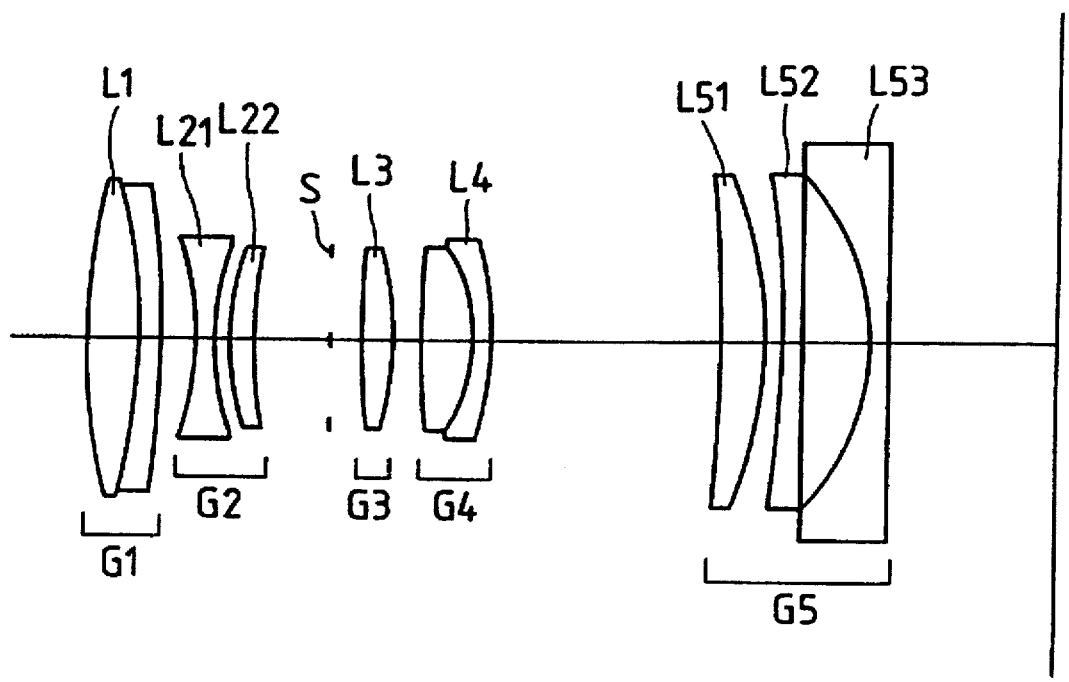
FIG. 21 is a view illustrating a configuration of a variable focal length optical system in a thirteenth embodiment of the present invention.

FIG. 21 is a view which shows the configuration of a variable focal length optical system in a thirteenth embodiment of the present invention. Viewing from the object side, the first lens group G1 is composed of a positive joint lens component L1 consisting of a double convex lens and a negative meniscus lens having a concave surface facing the object side. The second lens group G2 is composed of a double concave lens component L21 and a positive meniscus lens L22 having a convex surface facing the object side. The third lens group G3 is composed of a double convex lens L3, and the fourth lens group G4 is a positive joint lens component L4 consisting of a double convex lens component L41 and a negative meniscus lens component L42 having a concave surface facing the object side. Further, the fifth lens group G5 is composed of a positive meniscus lens L51 having a concave surface facing the object side, a negative meniscus lens L52 having a concave surface facing the object side, and a negative meniscus lens L53 having a concave surface facing the object side.

FIG. 21 shows the positional relationship of the lens groups at the wide-angle end, and they are displaced on the optical axis along a zoom locus indicated by the arrow in FIG. 5 during moving of lens groups from the wide-angle end to the telephoto end.

In more detail, during moving of lens groups from the wide-angle end to the telephoto end, the first lens group G1 and the fifth lens group G5 are displaced toward the object side with an air gap therebetween maintained to be unchanged, and the second lens group G2 and the fourth lens group G4 are displaced toward the object side with an air gap therebetween maintained to be unchanged. Further, the second lens group G2 and the fourth lens group G4 are displaced toward the object side with an air gap therebetween maintained to be unchanged for focusing. Further, a stop S is located between the second lens group G2 and the third lens group G3, and is displaced with the third lens group G3 with an air gap therebetween maintained to be unchanged during moving of lens groups from the wide-angle end to the telephoto end.

The variable focal length optical system in the thirteenth embodiment has a configuration similar to that of the variable focal length optical system in the twelfth embodiment, but the refractive powers and shapes of the lens groups are different from those in the twelfth embodiment.

Table 13 shows data as to the thirteenth embodiment.

TABLE 13 f = 38.8 − 110.5 mm
FN = 4.2 − 8.2
2ω = 58.8 − 21.4°

| Surface Number | Radius of Curvature | Intersurface Distance | Refractive Index | Abbe's Number |
|---|---|---|---|---|
| 1  | 41.8928   | 3.642          | 1.51860 | 69.98  |
| 2  | −35.9226  | 1.381          | 1.86074 | 23.01  |
| 3  | −62.8731  | (d3 = variable) |        |        |
| 4  | −21.5211  | 1.256          | 1.74810 | 52.30  |
| 5  | 17.6373   | 1.005          |        |        |
| 6  | 18.2437   | 1.758          | 1.86074 | 23.01  |
| 7  | 52.8946   | (d7 = variable) |        |        |
| 8  | ∞         | 1.884          |        | (stop) |
| 9  | 63.1504   | 1.884          | 1.51860 | 69.98  |
| 10 | −26.3130  | (d10 = variable) |       |        |
| 11 | 57.6124   | 3.265          | 1.53996 | 59.60  |
| 12 | −11.2510  | 1.256          | 1.80518 | 25.35  |
| 13 | −21.4692  | (d13 = variable) |       |        |
| 14 | −100.8975 | 2.888          | 1.80518 | 25.35  |
| 15 | −27.4305  | 1.256          |        |        |
| 16 | −61.0862  | 1.381          | 1.84042 | 43.35  |
| 17 | −443.8644 | 4.240          |        |        |
| 18 | −16.2198  | 1.507          | 1.77279 | 49.45  |
| 19 | −913.8859 | (Bf)           |        |        |

(VARIABLE SPACIAL DISTANCE)

| f   | 38.7867 | 110.5204 |
|-----|---------|----------|
| d3  | 2.1349  | 15.9488  |
| d7  | 4.6465  | 1.5070   |
| d10 | 1.8837  | 5.0233   |
| d13 | 15.0698 | 1.2558   |
| Bf  | 9.7398  | 53.0727  |

(FOCUSING DISPLACEMENT OF LENS GROUPS UPON
PHOTOGRAPHING MAGNIFICATION OF −1/40)

| f | 38.7867 | 110.5204 |
|---|---------|----------|
| Displacement | 0.4112 | 0.4026 |

(The sign of the displacement is positive in a direction toward the object.)

(VALUES CORRESPONDING TO CONDITIONS)

| (13) lf2l/f1 = | 0.368 |
|---|---|
| (14) (Bft − Bfw)/(ft − fw) = | 0.569 |
| (15) (f3 − f4)/(f3 + f4) = | −0.085 |
| (16) f1/(fw · ft)$^{1/2}$ = | 0.932 |
| (17) f5/f2 = | 1.268 |

[Fourteenth Embodiment]

Figure 22:
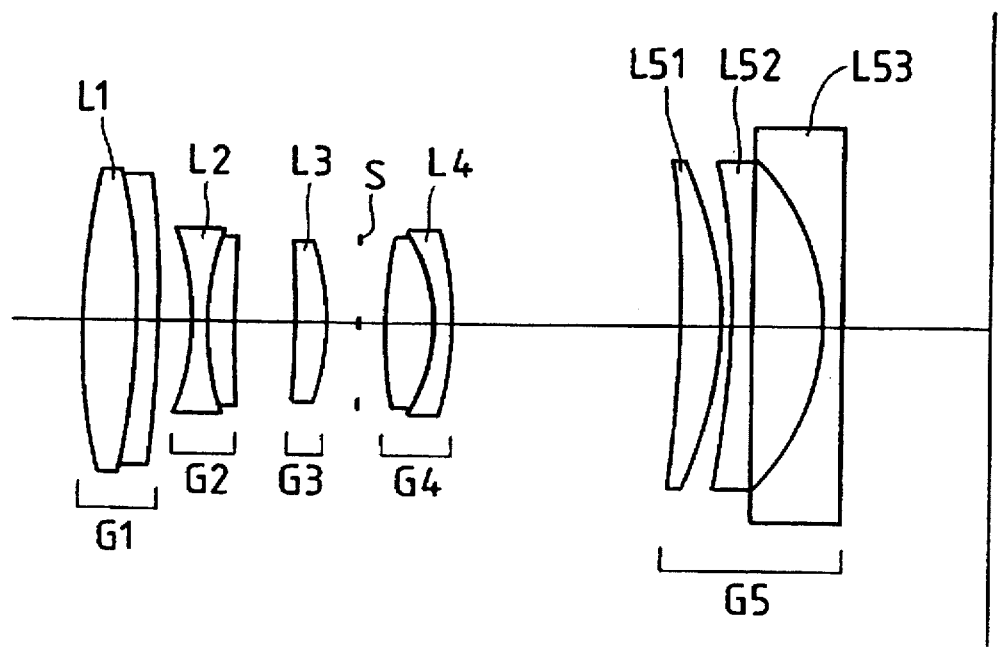
FIG. 22 is a view illustrating a configuration of a variable focal length optical system in a fourteenth embodiment of the present invention.

FIG. 22 is a view which shows the configuration of a variable focal length optical system in a fourteenth embodiment of the present invention. Viewing from the object side, the first lens group G1 is composed of a positive joint lens component L1 consisting of a double convex lens and a negative meniscus lens having a concave surface facing the object side. The second lens group G2 is composed of a negative joint lens component consisting of a double concave lens and a positive meniscus lens L22 having a convex surface facing the object side. The third lens group G3 is composed of a positive meniscus lens LJ, and the fourth lens group G4 is a positive joint lens component L4 consisting of a double convex lens and a negative meniscus lens component L42 having a convex surface facing the object side. Further, the fifth lens group G5 is composed of a positive meniscus lens L51 having a concave surface facing the object side, a negative meniscus lens L52 having a concave surface facing the object side, and a negative meniscus lens L53 having a concave surface facing the object side.

FIG. 22 shows the positional relationship of the lens groups at the wide-angle end, and they are displaced on the optical axis along a zoom locus indicated by the arrow in FIG. 5 during moving of lens groups from the wide-angle end to the telephoto end.

In more detail, during moving of lens groups from the wide-angle end to the telephoto end, the first lens group G1 and the fifth lens group G5 are displaced toward the object side with an air gap therebetween maintained to be unchanged, and the second lens group G2 and the fourth lens group G4 are displaced toward the object side with an air gap therebetween maintained to be unchanged. Further, the second lens group G2 and the fourth lens group G4 are displaced toward the object side with an air gap therebetween maintained to be unchanged for focusing. Further, a stop S is located between the third lens group G3 and the fourth lens group G4, and is displaced with the fourth lens group G4 with an air gap therebetween maintained to be unchanged during moving of lens groups from the wide-angle end to the telephoto end.

The configuration of the variable focal length optical system in the fourteenth embodiment is similar to that of the twelfth embodiment, but the refractive powers and the shapes of the lens groups are different from those of the twelfth embodiment.

Table 14 shows data as to the fourteenth embodiment.

TABLE 14 f = 38.8 - 110.5 mm
FN = 4.1 - 8.2
2ω = 58.4 - 21.6°

| Surface Number | Radius of Curvature | Intersurface Distance | Refractive Index | Abbe's Number |
|---|---|---|---|---|
| 1 | 45.0891 | 3.893 | 1.51860 | 69.98 |
| 2 | −41.1675 | 1.381 | 1.86074 | 23.01 |
| 3 | −70.7892 | (d3 = variable) | | |
| 4 | −19.0835 | 1.356 | 1.79668 | 45.37 |
| 5 | 19.5061 | 1.758 | 1.86074 | 23.01 |
| 6 | 252.3507 | (d6 = variable) | | |
| 7 | −70.8049 | 1.884 | 1.51860 | 69.98 |
| 8 | −19.5338 | (d8 = variable) | | |
| 9 | ∞ | 1.884 | | (stop) |
| 10 | 40.7059 | 3.014 | 1.62041 | 60.14 |
| 11 | −11.9437 | 1.256 | 2.80518 | 25.35 |
| 12 | −24.3877 | (d12 = variable) | | |
| 13 | −80.4516 | 2.888 | 1.80518 | 25.35 |
| 14 | −24.1593 | 0.628 | | |
| 15 | −59.6153 | 1.381 | 1.84042 | 43.35 |
| 16 | −680.8291 | 4.395 | | |
| 17 | −15.8286 | 1.507 | 1.77279 | 49.45 |
| 18 | −806.1242 | (Bf) | | |

VARIABLE SPACIAL DISTANCE)

| f | 38.7864 | 110.5144 |
|---|---|---|
| d3 | 2.0721 | 16.9535 |
| d6 | 4.0186 | 1.5070 |
| d8 | 2.2605 | 4.7721 |
| d12 | 16.1372 | 1.2558 |
| Bf | 9.8065 | 51.6140 |

TABLE 14-continued (FOCUSING DISPLACEMENT OF LENS GROUPS UPON PHOTOGRAPHING MAGNIFICATION OF −1/40)

| f | 38.7864 | 110.5144 |
|---|---|---|
| Displacement | 0.4256 | 0.3497 |

(The sign of the displacement is positive in a direction toward the object.)

(VALUES CORRESPONDING TO CONDITIONS)

| (13) f2/f1 = | 0.362 |
|---|---|
| (14) (Bft − Bfw)/(ft − fw) = | 0.616 |
| (15) (f3 − f4)/(f3 + f4) = | 0.248 |
| (16) f1/(fw · ft)$^{1/2}$ = | 1.005 |
| (17) f5/f2 = | 1.226 |

[Fifteenth Embodiment]

Figure 23:
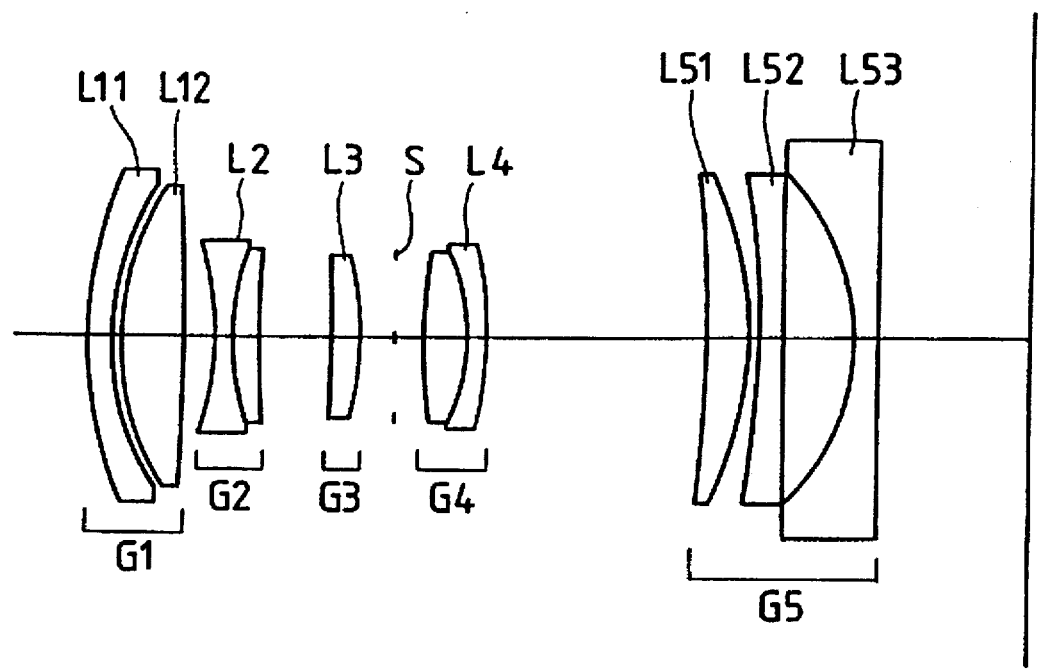
FIG. 23 is a view illustrating a configuration of a variable focal length optical system in a fifteenth embodiment of the present invention.

FIG. 23 is a view which shows the configuration of a variable focal length optical system in a fifteenth embodiment of the present invention. Viewing from the object side, the first lens group G1 is composed of a negative meniscus lens L11 having a convex surface facing the object side and a double convex lens L12. The second lens group G2 is composed of a negative joint lens consisting of a double concave lens and a positive meniscus lens having a convex surface facing the object side. The third lens group G3 is composed of a positive meniscus lens L3 having a concave surface facing the object side, and the fourth lens group G4 is a positive joint lens component L4 consisting of a double convex lens and a negative meniscus lens having a concave surface facing the object side. Further, the fifth lens group G5 is composed of a positive meniscus lens L51 having a concave surface facing the object side, a double concave lens L52, and a negative meniscus lens L53 having a concave surface facing the object side.

FIG. 23 shows the positional relationship of the lens groups at the wide-angle end, and they are displaced on the optical axis along a zoom locus indicated by the arrow in FIG. 5 during moving of lens groups from the wide-angle end to the telephoto end.

In more detail, during moving of lens groups from the wide-angle end to the telephoto end, the first lens group G1 and the fifth lens group G5 are displaced toward the object side with an air gap therebetween maintained to be unchanged, and the second lens group G2 and the fourth lens group G4 are displaced toward the object side with an air gap therebetween maintained to be unchanged. Further, the second lens group G2 and the fourth lens group G4 are displaced toward the object side with an air gap therebetween maintained to be unchanged for focusing. Further, a stop S is located between the third lens group G3 and the fourth lens group G4, and is displaced with the fourth lens group G4 with an air gap therebetween maintained to be unchanged during moving of lens groups from the wide-angle end to the telephoto end.

The variable focal length optical system in the fifteenth embodiment has a configuration similar to that of the twelfth embodiment, but the refractive powers and the shapes of the lens groups are different from those of the twelfth embodiment.

Table 15 shows data as to the fifteenth embodiment.

TABLE 15 f = 38.8 - 110.5 mm
FN = 4.3 - 8.2
2ω = 58.8 - 21.4°

| Surface Number | Radius of Curvature | Intersurface Distance | Refractive Index | Abbe's Number |
|---|---|---|---|---|
| 1 | 29.9937 | 3.642 | 1.80518 | 25.35 |
| 2 | 19.7920 | 0.628 | | |
| 3 | 19.4934 | 4.144 | 1.51680 | 64.10 |
| 4 | 172.1624 | (d4 = variable) | | |
| 5 | −19.5053 | 1.256 | 1.79668 | 45.37 |
| 6 | 17.5758 | 1.758 | 1.86074 | 23.01 |
| 7 | 114.1474 | (d7 = variable) | | |
| 8 | −105.8093 | 1.884 | 1.51860 | 69.98 |
| 9 | −19.5673 | (d9 = variable) | | |
| 10 | ∞ | 1.884 | | (stop) |
| 11 | 35.8829 | 3.014 | 1.58913 | 61.09 |
| 12 | −12.3374 | 1.256 | 1.80518 | 25.35 |
| 13 | −24.2023 | (d13 = variable) | | |
| 14 | −94.6287 | 2.888 | 1.80518 | 25.35 |
| 15 | −24.2511 | 0.628 | | |
| 16 | −64.1029 | 1.381 | 1.84042 | 43.35 |
| 17 | 668.0727 | 4.395 | | |
| 18 | −15.3384 | 1.507 | 1.77279 | 49.45 |
| 19 | −561.0800 | (Bf) | | |

(VARIABLE SPACIAL DISTANCE)

| | | |
|---|---|---|
| f | 38.7878 | 110.5149 |
| d4 | 2.0721 | 16.1372 |
| d8 | 4.6465 | 1.5070 |
| d9 | 2.2605 | 5.4000 |
| d13 | 15.3209 | 1.2558 |
| Bf | 9.8656 | 50.5415 |

(FOCUSING DISPLACEMENT OF LENS GROUPS UPON PHOTOGRAPHING MAGNIFICATION OF −1/40)

| | | |
|---|---|---|
| f | 38.7878 | 110.5149 |
| Displacement | 0.4126 | 0.3774 |

(The sign of the displacement is positive in a direction toward the object.)

(VALUES CORRESPONDING TO CONDITIONS)

| | |
|---|---|
| (13) f2/f1 = | 0.356 |
| (14) (Bft − Bfw)/(ft − fw) = | 0.567 |
| (15) (f3 − f4)/(f3 + f4) = | 0.186 |
| (16) f1/(fw · ft)$^{1/2}$ = | 0.951 |
| (17) f5/f2 = | 1.279 |

[Sixteenth Embodiment]

Figure 24:
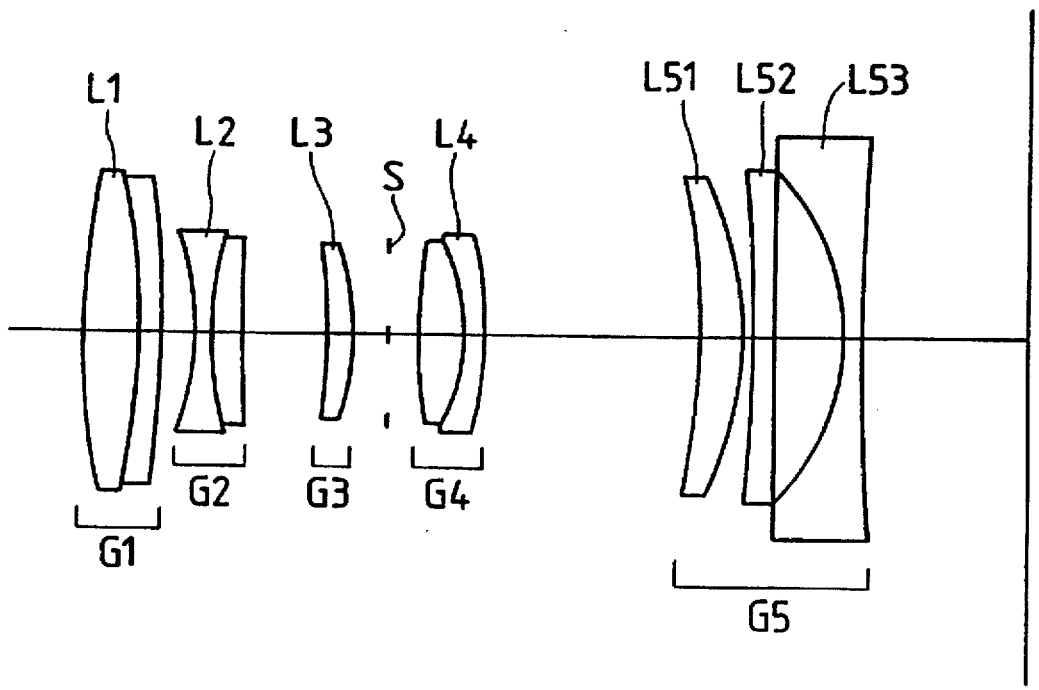
FIG. 24 is a view illustrating a configuration of a variable focal length optical system in a sixteenth embodiment of the present invention.

FIG. 24 is a view which shows the configuration of a variable focal length optical system in a sixteenth embodiment of the present invention. Viewing from the object side, the first lens group G1 is composed of a positive joint lens component L1 consisting of a double convex lens and a negative meniscus lens having a concave surface facing the object side. The second lens group G2 is composed of a negative joint lens component L2 consisting of a double concave lens and a double convex lens. The third lens group G3 is composed of a positive meniscus lens L3 having a concave surface facing the object side, and the fourth lens group G4 is a positive joint lens component L4 consisting of a double convex lens component L41 and a negative meniscus lens component L42 having a concave surface facing the object side. Further, the fifth lens group G5 is composed of a positive meniscus lens L51 having a concave surface facing the object side, a negative meniscus lens L52 having a concave surface facing the object side, and a double concave lens L53.

FIG. 24 shows the positional relationship of the lens groups at the wide-angle end, and they are displaced on the optical axis along a zoom locus indicated by the arrow in FIG. 5 during moving of lens groups from the wide-angle end to the telephoto end.

In more detail, during moving of lens groups from the wide-angle end to the telephoto end, the first lens group G1 and the fifth lens group G5 are displaced toward the object side with an air gap therebetween maintained to be unchanged, and the second lens group G2 and the fourth lens group G4 are displaced toward the object side with an air gap therebetween maintained to be unchanged. Further, the second lens group G2 and the fourth lens group G4 are displaced toward the object side with an air gap therebetween maintained to be unchanged for focusing. Further, a stop S is located between the third lens group G3 and the fourth lens group G4, and is displaced with the fourth lens group G4 with an air gap therebetween maintained to be unchanged during moving of lens groups from the wide-angle end to the telephoto end.

The variable focal length optical system in the sixteenth embodiment has a configuration similar to that of the twelfth embodiment, but the refractive powers and the shapes of the lens groups are different from those of the twelfth embodiment.

Table 16 shows data as to the sixteenth embodiment.

TABLE 16 f = 38.8 - 110.5 mm
FN = 4.1 - 8.2
2ω = 58.4 - 21.6°

| Surface Number | Radius of Curvature | Intersurface Distance | Refractive Index | Abbe's Number |
|---|---|---|---|---|
| 1 | 46.7864 | 3.893 | 1.51860 | 69.98 |
| 2 | −40.8003 | 1.381 | 1.86074 | 23.01 |
| 3 | −68.2308 | (d3 = variable) | | |
| 4 | −19.7046 | 1.256 | 1.79668 | 45.37 |
| 5 | 26.4257 | 2.009 | 1.86074 | 23.01 |
| 6 | −1554.1225 | (d6 = variable) | | |
| 7 | −52.3656 | 1.633 | 1.51860 | 69.98 |
| 8 | −18.9936 | (d8 = variable) | | |
| 9 | ∞ | 1.884 | | (stop) |
| 10 | 32.7840 | 3.014 | 1.62041 | 60.14 |
| 11 | −12.2849 | 1.256 | 1.80518 | 25.35 |
| 12 | −23.6745 | (d12 = variable) | | |
| 13 | −45.4323 | 2.888 | 1.80518 | 25.35 |
| 14 | −22.2579 | 0.628 | | |
| 15 | −109.5302 | 1.381 | 1.84042 | 43.35 |
| 16 | −767.9709 | 4.395 | | |
| 17 | −15.6089 | 1.507 | 1.77279 | 49.45 |
| 18 | 420.1129 | (Bf) | | |

(VARIABLE SPACIAL DISTANCE)

| | | |
|---|---|---|
| f | 38.7941 | 110.5136 |
| d3 | 2.1349 | 15.3209 |
| d6 | 5.2744 | 1.5070 |
| d8 | 2.2605 | 6.0279 |
| d12 | 14.4419 | 1.2558 |
| Bf | 10.5320 | 54.2531 |

(FOCUSING DISPLACEMENT OF THIRD LENS GROUP UPON PHOTOGRAPHING MAGNIFICATION OF −1/40)

| | | |
|---|---|---|
| f | 38.7941 | 110.5136 |
| Displacement | 0.4531 | 0.3534 |

(The sign of the displacement is positive in a direction toward the object.)

(VALUES CORRESPONDING TO CONDITIONS)

| | |
|---|---|
| (13) f2/f1 = | 0.406 |
| (14) (Bft − Bfw)/(ft − fw) = | 0.610 |

TABLE 16-continued

| | |
|---|---|
| (15) (f3 − f4)/(f3 + f4) = | 0.283 |
| (16) f1/(fw · ft)$^{1/2}$ = | 1.007 |
| (17) f5/f2 = | 1.034 |

In the following seventeenth to 20th embodiments, the second lens group G2, the third lens group G3 and the fourth lens group G4 are displaced during focusing from a far distance object to a near distance object.

[Seventeenth Embodiment]

Figure 25:
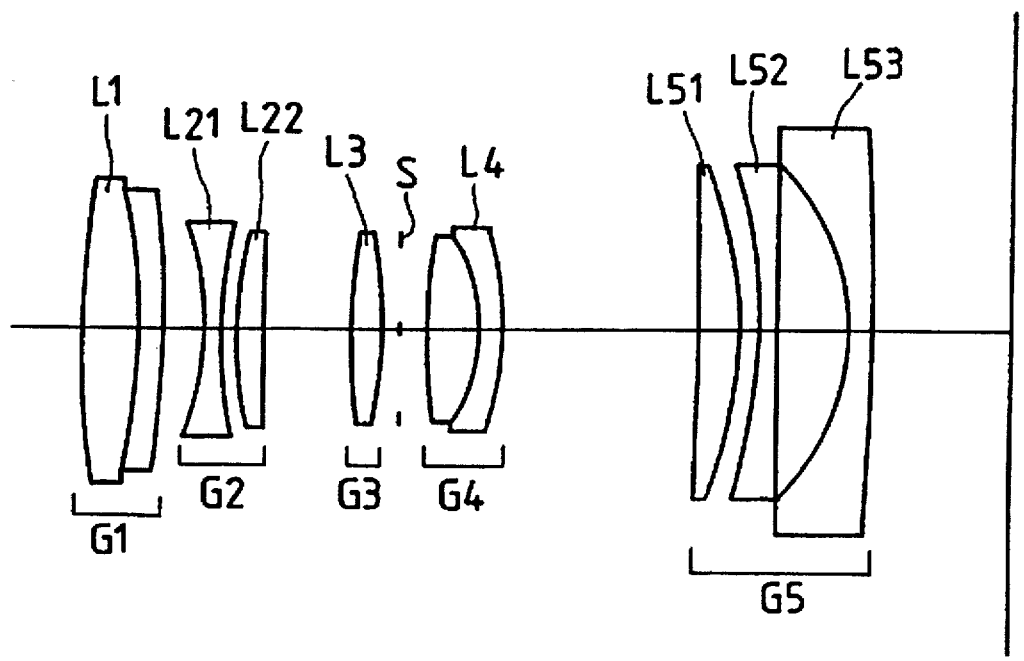
FIG. 25 is a view illustrating a configuration of a variable focal length optical system in a seventeenth embodiment of the present invention.

FIG. 25 is a view which shows the configuration of a variable focal length optical system in a seventeenth embodiment of the present invention. Viewing from the object side, the first lens group G1 is composed of a positive joint lens component L1 consisting of a double convex lens and a negative meniscus lens having a concave surface facing the object side. The second lens group G2 is composed of a double concave lens L21 and a positive meniscus lens L22 having a convex surface facing the object side. The third lens group G3 is composed of a double convex lens L3, and the fourth lens group G4 is a positive joint lens component L4 consisting of a double convex lens component L41 and a negative meniscus lens component L42 having a concave surface facing the object side. Further, the fifth lens group G5 is composed of a positive meniscus lens L51 having a concave surface facing the object side, a negative meniscus lens L52 having a concave surface facing the object side, and a negative meniscus lens L53 having a concave surface facing the object side.

Figure 6:
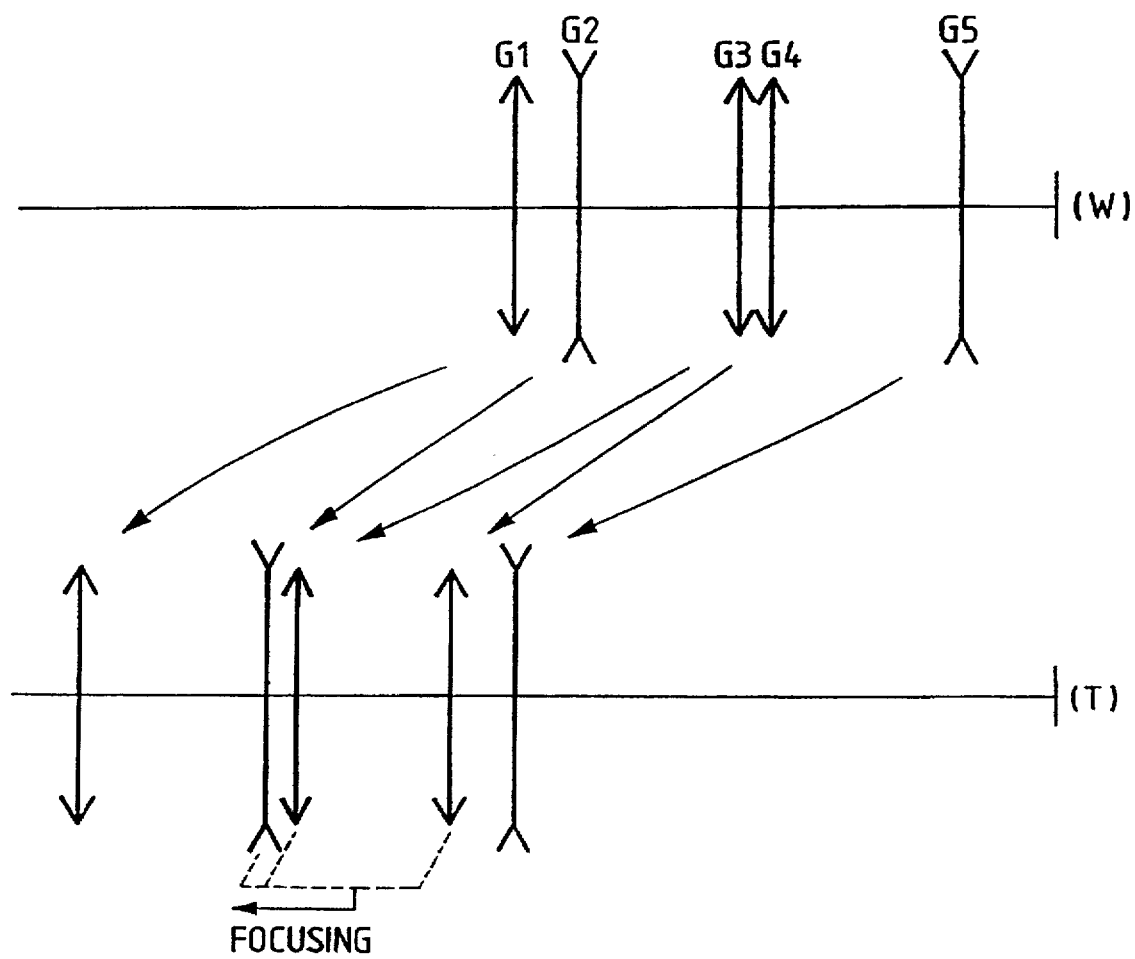
FIG. 6 is a view similar to FIG. 1A, showing displacement of the second lens group G2, the third lens group G3 and the fourth lens group G4 toward the object side during focusing from a far distance object to a near distance object.

FIG. 25 shows the positional relationship of the lens groups at the wide-angle end, and they are displaced on the optical axis along a zoom locus indicated by the arrow in FIG. 6 during moving of lens groups from the wide-angle end to the telephoto end.

In more detail, during moving of lens groups from the wide-angle end to the telephoto end, the first lens group G1 and the fifth lens group G5 are displaced toward the object side with an air gap therebetween maintained to be unchanged, and the second lens group G2 and the fourth lens group G4 are displaced toward the object side with an air gap therebetween maintained to be unchanged. Further, the second lens group G2, the third lens group G3 and the fourth lens group G4 are displaced toward the object side with an air gap therebetween maintained to be unchanged for focusing.

Further, a stop S is located between the third lens group G3 and the fourth lens group G4, and is displaced with the fourth lens group G4 with an air gap therebetween maintained to be unchanged during moving of lens groups from the wide-angle end to the telephoto end.

Table 17 shows data as to the seventeenth embodiment.

TABLE 17 f = 38.8 − 110.5 mm
FN = 3.9 − 8.2
2ω = 58.4 − 21.6°

| Surface Number | Radius of Curvature | Intersurface Distance | Refractive Index | Abbe's Number |
|---|---|---|---|---|
| 1 | 65.4600 | 3.893 | 1.51860 | 69.98 |
| 2 | −36.4022 | 1.507 | 1.86074 | 23.01 |
| 3 | −67.2710 | (d3 = variable) | | |
| 4 | −22.0553 | 1.256 | 1.77279 | 49.45 |
| 5 | 33.7444 | 0.879 | | |
| 6 | 26.5267 | 1.884 | 1.86074 | 23.01 |
| 7 | 177.2058 | (d7 = variable) | | |
| 8 | 67.5377 | 1.758 | 1.51860 | 69.98 |
| 9 | −34.0631 | (d9 = variable) | | |
| 10 | ∞ | 1.884 | | (Stop) |
| 11 | 40.6944 | 3.265 | 1.51860 | 69.98 |
| 12 | −12.2981 | 1.507 | 1.80518 | 25.35 |
| 13 | −24.0237 | (d13 = variable) | | |
| 14 | −255.2574 | 2.888 | 1.80518 | 25.35 |
| 15 | −27.2559 | 1.322 | | |
| 16 | −35.5307 | 1.381 | 1.84042 | 43.35 |
| 17 | −237.2884 | 4.078 | | |
| 18 | −15.5029 | 1.507 | 1.77279 | 49.45 |
| 19 | −294.6632 | (Bf) | | |

(VARIABLE SPACIAL DISTANCE)

| f | 38.7915 | 110.4902 |
|---|---|---|
| d3 | 2.6847 | 15.2484 |
| d7 | 5.9634 | 1.5070 |
| d9 | 1.2558 | 5.7123 |
| d13 | 14.0707 | 1.5070 |
| Bf | 9.3281 | 52.9840 |

(FOCUSING DISPLACEMENT OF LENS GROUPS UPON PHOTOGRAPHING MAGNIFICATION OF −1/40)

| f | 38.7915 | 110.4902 |
|---|---|---|
| Displacement | 0.6274 | 0.3991 |

(The sign of the displacement is positive in a direction toward the object.)

(VALUES CORRESPONDING TO CONDITIONS)

| | |
|---|---|
| (18) f1/(fw · ft)$^{1/2}$ = | 1.301 |
| (19) f5/f2 = | 0.777 |
| (20) (Bft − Bfw)/(ft − fw) = | 0.602 |
| (21) tf2t/f1 = | 0.406 |
| (22) (f3 − f4)/(f3 + f4) = | 0.004 |

[Eighteenth Embodiment]

Figure 26:
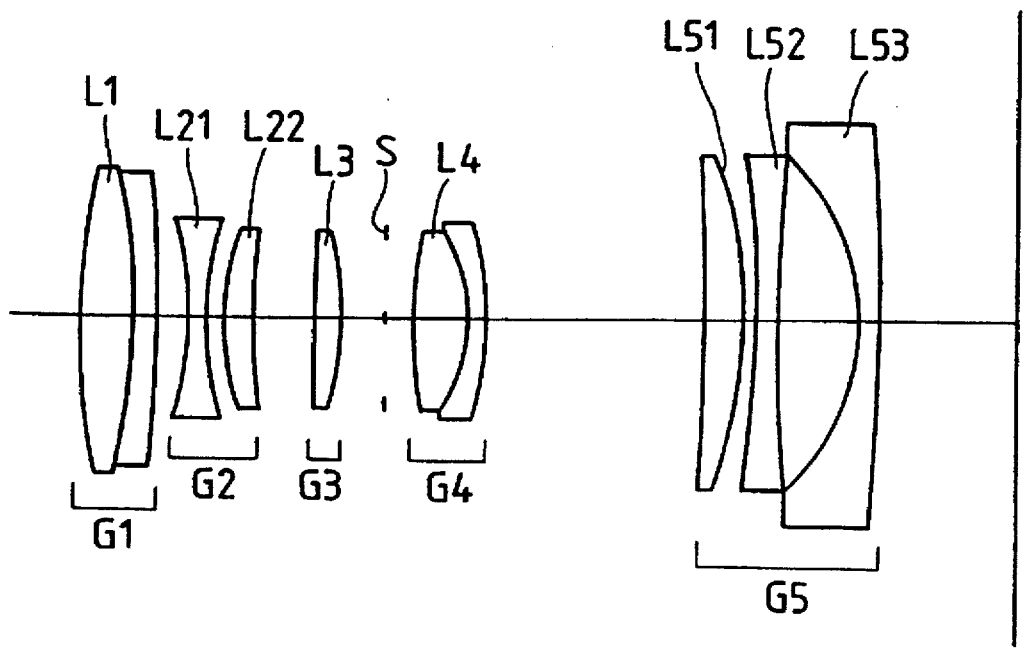
FIG. 26 is a view illustrating a configuration of a variable focal length optical system in an eighteenth embodiment of the present invention.

FIG. 26 is a view which shows the configuration of a variable focal length optical system in an eighteenth embodiment of the present invention. Viewing from the object side, the first lens group G1 is composed of a positive joint lens component L1 consisting of a double convex lens and a negative meniscus lens having a convex surface facing the object side. The second lens group G2 is composed of a double concave lens L21 and a positive meniscus lens L22 having a convex surface facing the object side. The third lens group G3 is composed of a double convex lens L3, and the fourth lens group G4 is a positive joint lens component L4 consisting of a double convex lens and a negative meniscus lens having a concave surface facing the object side. Further, the fifth lens group G5 is composed of a positive meniscus lens L51 having a concave surface facing the object side, a double concave lens L52, and a negative meniscus lens L53 having a concave surface facing the object side.

FIG. 26 shows the positional relationship of the lens groups at the wide-angle end, and they are displaced on the optical axis along a zoom locus indicated by the arrow in FIG. 6 during moving of lens groups from the wide-angle end to the telephoto end.

In more detail, during moving of lens groups from the wide-angle end to the telephoto end, the first lens group G1 and the fifth lens group G5 are displaced toward the object side with an air gap therebetween maintained to be unchanged, and the second lens group G2 and the fourth lens group G4 are displaced toward the object side with an air gap therebetween maintained to be unchanged. Further, the second lens group G2, the third lens group G3 and the fourth lens group G4 are displaced toward the object side with an air gap therebetween maintained to be unchanged for focusing.

Further, a stop S is located between the third lens group G3 and the fourth lens group G4, and is displaced with the fourth lens group G4 with an air gap therebetween maintained to be unchanged during moving of lens groups from the wide-angle end to the telephoto end.

The variable focal length optical system in the eighteenth embodiment has a configuration similar to that of the seventeenth embodiment, but the refractive powers and the shapes of the lens groups are different from those of the seventeenth embodiment.

Table 18 shows data as to the eighteenth embodiment.

TABLE 18 f = 38.8 - 110.5 mm
FN = 4.1 - 8.2
2ω = 58.6 - 21.6°

| Surface Number | Radius of Curvature | Intersurface Distance | Refractive Index | Abbe's Number |
|---|---|---|---|---|
| 1 | 46.1529 | 3.767 | 1.51860 | 69.98 |
| 2 | -42.3759 | 1.507 | 1.86074 | 23.01 |
| 3 | -74.5100 | (d3 = variable) | | |
| 4 | -20.8372 | 1.256 | 1.77279 | 49.45 |
| 5 | 22.4232 | 1.256 | | |
| 6 | 21.2435 | 1.884 | 1.86074 | 23.01 |
| 7 | 72.0180 | (d7 = variable) | | |
| 8 | 177.2496 | 1.758 | 1.51860 | 69.98 |
| 9 | -24.1704 | (d9 = variable) | | |
| 10 | ∞ | 1.884 | | (stop) |
| 11 | 36.1780 | 3.516 | 1.51680 | 64.10 |
| 12 | -11.4427 | 1.256 | 1.80518 | 25.35 |
| 13 | -21.5337 | (d13 = variable) | | |
| 14 | -315.6313 | 2.888 | 1.80518 | 25.35 |
| 15 | -30.6587 | 0.782 | | |
| 16 | -86.5660 | 1.381 | 1.84042 | 43.35 |
| 17 | 120.3806 | 4.867 | | |
| 18 | -15.5225 | 1.507 | 1.77279 | 49.45 |
| 19 | -185.4644 | (Bf) | | |

(VARIABLE SPACIAL DISTANCE)

| f | 38.8067 | 110.5402 |
|---|---|---|
| d3 | 2.1349 | 16.3256 |
| d7 | 4.0186 | 1.5070 |
| d9 | 3.0139 | 5.5256 |
| d13 | 15.6978 | 1.5071 |
| Bf | 9.3281 | 52.9840 |

(FOCUSING DISPLACEMENT OF LENS GROUPS UPON PHOTOGRAPHING MAGNIFICATION OF -1/40)

| f | 38.8067 | 110.5402 |
|---|---|---|
| Displacement | 0.6983 | 0.5161 |

(The sign of the displacement is positive in a direction toward the object.)

(VALUES CORRESPONDING TO CONDITIONS)

(18) f1/(fw · ft)$^{1/2}$ = 1.047
(19) f5/f2 = 1.164
(20) (Bft - Bfw)/(ft - fw) = 0.597
(21) |f2|/f1 = 0.357
(22) (f3 - f4)/(f3 + f4) = 0.040

[Nineteenth Embodiment]

Figure 27:
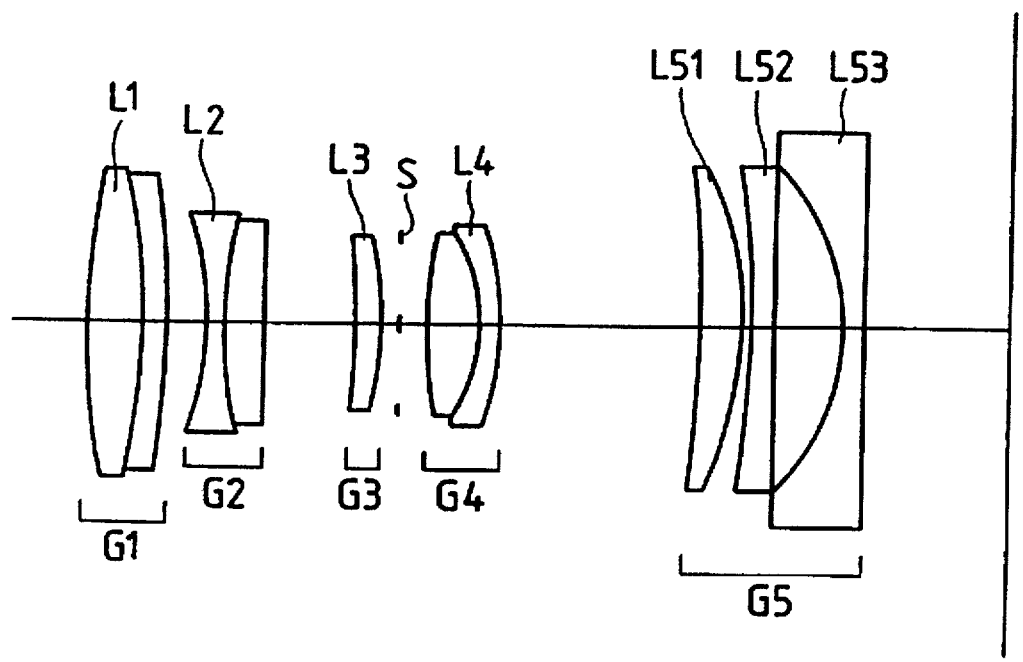
FIG. 27 is a view illustrating a configuration of a variable focal length optical system in a nineteenth embodiment of the present invention.

FIG. 27 is a view which shows the configuration of a variable focal length optical system in a nineteenth embodiment of the present invention. Viewing from the object side, the first lens group G1 is composed of a positive joint lens component L1 consisting of a double convex lens and a negative meniscus lens having a concave surface facing the object side. The second lens group G2 is composed of a negative joint lens consisting of a double concave lens and a double convex lens. The third lens group G3 is composed of a positive meniscus lens L3 having a concave surface facing the object side, and the fourth lens group G4 is a positive joint lens component L4 consisting of a double convex lens and a negative meniscus lens component L42 having a concave surface facing the object side. Further, the fifth lens group G5 is composed of a positive meniscus lens L51 having a concave surface facing the object side, a double concave lens L52, and a negative meniscus lens L53 having a concave surface facing the object side.

FIG. 27 shows the positional relationship of the lens groups at the wide-angle end, and they are displaced on the optical axis along a zoom locus indicated by the arrow in FIG. 6 during moving of lens groups from the wide-angle end to the telephoto end.

In more detail, during moving of lens groups from the wide-angle end to the telephoto end, the first lens group G1 and the fifth lens group G5 are displaced toward the object side with an air gap therebetween maintained to be unchanged, and the second lens group G2 and the fourth lens group G4 are displaced toward the object side with an air gap therebetween maintained to be unchanged. Further, the second lens group G2, the third lens group G3 and the fourth lens group G4 are displaced toward the object side with an air gap therebetween maintained to be unchanged for focusing.

Further, a stop S is located between the third lens group G3 and the fourth lens group G4, and is displaced with the fourth lens group G4 with an air gap therebetween maintained to be unchanged during moving of lens groups from the wide-angle end to the telephoto end.

The variable focal length optical system in the nineteenth embodiment has a configuration similar to that of the seventeenth embodiment, but the refractive powers and the shapes of the lens groups are different from those of the seventeenth embodiment.

Table 19 shows data as to the nineteenth embodiment.

TABLE 19 f = 38.8 - 110.5 mm
FN = 3.9 - 8.2
2ω = 59.2 - 21.6°

| Surface Number | Radius of Curvature | Intersurface Distance | Refractive Index | Abbe's Number |
|---|---|---|---|---|
| 1 | 53.8434 | 3.893 | 1.51860 | 69.98 |
| 2 | -39.8476 | 1.507 | 1.86074 | 23.01 |
| 3 | -67.6229 | (d3 = variable) | | |
| 4 | -21.7663 | 1.256 | 1.79668 | 45.37 |
| 5 | 31.6545 | 2.763 | 1.86074 | 23.01 |
| 6 | -203.4848 | (d6 = variable) | | |
| 7 | -84.5769 | 1.758 | 1.58913 | 61.09 |
| 8 | -26.0816 | (d8 = variable) | | |
| 9 | ∞ | 1.884 | | (stop) |
| 10 | 34.9165 | 3.265 | 1.51860 | 69.98 |
| 11 | -12.1485 | 1.507 | 1.80518 | 25.35 |
| 12 | -20.8015 | (d12 = variable) | | |
| 13 | -79.6581 | 2.888 | 1.80518 | 25.35 |
| 14 | -24.1267 | 0.628 | | |
| 15 | -65.6891 | 1.381 | 1.84042 | 43.35 |
| 16 | 653.3201 | 4.772 | | |
| 17 | -14.8026 | 1.507 | 1.77279 | 49.45 |
| 18 | -567.1514 | (Bf) | | |

(VARIABLE SPACIAL DISTANCE)

| f | 38.7958 | 110.5332 |
|---|---|---|
| d3 | 2.6847 | 15.2484 |
| d6 | 5.9634 | 1.5070 |
| d8 | 1.2558 | 5.7123 |
| d12 | 14.0707 | 1.5071 |
| Bf | 9.5049 | 52.5253 |

TABLE 19-continued (FOCUSING DISPLACEMENT OF LENS GROUPS UPON PHOTOGRAPHING MAGNIFICATION OF −1/40)

| f | 38.7958 | 110.5332 |
|---|---|---|
| Displacement | 0.6290 | 0.4098 |

(The sign of the displacement is positive in a direction toward the object.)

(VALUES CORRESPONDING TO CONDITIONS)

| | |
|---|---|
| (18) f1/(fw · ft)$^{1/2}$ = | 1.118 |
| (19) f5/f2 = | 0.781 |
| (20) (Bft − Bfw)/(ft − fw) = | 0.600 |
| (21) lf2l/f1 = | 0.456 |
| (22) (f3 − f4)/(f3 + f4) = | 0.306 |

[20th Embodiment]

Figure 28:
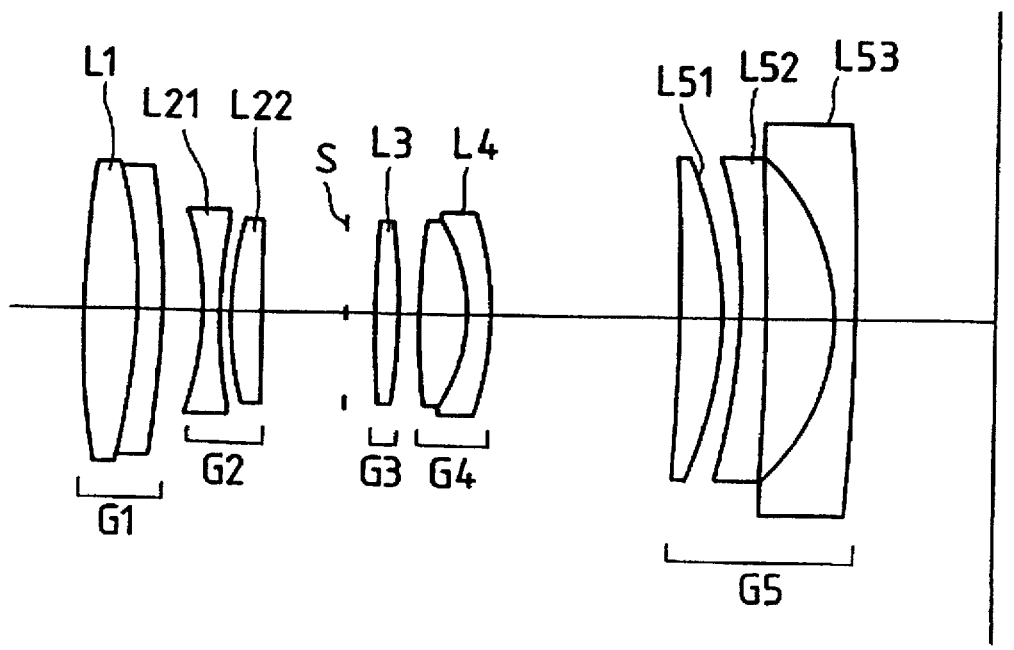
FIG. 28 is a view illustrating a configuration of a variable focal length optical system in 20th embodiment of the present invention.

FIG. 28 is a view which shows the configuration of a variable focal length optical system in a 20th embodiment of the present invention. Viewing from the object side, the first lens group G1 is composed of a positive joint lens component L1 consisting of a double convex lens and a negative meniscus lens having a concave surface facing the object side. The second lens group G2 is composed of a double concave lens L21 and a positive meniscus lens L22 having a convex surface facing the object side. The third lens group G3 is composed of a double convex lens LJ, and the fourth lens group G4 is a positive joint lens component L4 consisting of a double convex lens and a negative meniscus lens having a concave surface facing the object side. Further, the fifth lens group G5 is composed of a positive meniscus lens L51 having a concave surface facing the object side, a negative meniscus lens L52 having a concave surface facing the object side, and a negative meniscus lens L53 having a concave surface facing the object side.

FIG. 28 shows the positional relationship of the lens groups at the wide-angle end, and they are displaced on the optical axis along a zoom locus indicated by the arrow in FIG. 6 during moving of lens groups from the wide-angle end to the telephoto end.

In more detail, during moving of lens groups from the wide-angle end to the telephoto end, the first lens group G1 and the fifth lens group G5 are displaced toward the object side with an air gap therebetween maintained to be unchanged, and the second lens group G2 and the fourth lens group G4 are displaced toward the object side with an air gap therebetween maintained to be unchanged. Further, the second lens group G2, the third lens group G3 and the fourth lens group G4 are displaced toward the object side with an air gap therebetween maintained to be unchanged for focusing.

Further, a stop S is located between the second lens group G2 and the third lens group G3, and is displaced with the third lens group G3 with an air gap therebetween maintained to be unchanged during moving of lens groups from the wide-angle end to the telephoto end.

The variable focal length optical system in the 20th embodiment has a configuration similar to that of the seventeenth embodiment, but the refractive powers and the shapes of the lens groups are different from those of the seventeenth embodiment.

Table 20 shows data as to the 20th embodiment.

TABLE 20 f = 38.8 - 110.5 mm
FN = 3.7 - 8.2
2ω = 59.6 - 21.6°

| Surface Number | Radius of Curvature | Intersurface Distance | Refractive Index | Abbe's Number |
|---|---|---|---|---|
| 1 | 61.0010 | 3.893 | 1.51860 | 69.98 |
| 2 | −37.9210 | 1.507 | 1.86074 | 23.01 |
| 3 | −66.6463 | (d3 = variable) | | |
| 4 | −23.2066 | 1.256 | 1.77279 | 49.45 |
| 5 | 32.9037 | 0.879 | | |
| 6 | 25.9209 | 1.884 | 1.86074 | 23.01 |
| 7 | 175.3307 | (d7 = variable) | | |
| 8 | ∞ | 1.884 | | (stop) |
| 9 | 60.9239 | 1.758 | 1.51860 | 69.98 |
| 10 | −39.3372 | (d10 = variable) | | |
| 11 | 42.3682 | 3.265 | 1.51860 | 69.98 |
| 12 | −12.5005 | 1.507 | 1.80518 | 25.35 |
| 13 | −24.5112 | (d13 = variable) | | |
| 14 | −158.5445 | 2.888 | 1.80518 | 25.35 |
| 15 | −26.5670 | 1.322 | | |
| 16 | −37.6133 | 1.381 | 1.84042 | 43.35 |
| 17 | −302.2108 | 4.078 | | |
| 18 | −14.9555 | 1.507 | 1.77279 | 49.45 |
| 19 | −191.2889 | (Bf) | | |

(VARIABLE SPACIAL DISTANCE)

| f | 38.7923 | 110.5161 |
|---|---|---|
| d3 | 2.6847 | 15.2484 |
| d7 | 5.9634 | 1.5070 |
| d9 | 1.2558 | 5.7123 |
| d13 | 14.0707 | 1.5070 |
| Bf | 9.4356 | 52.5100 |

(FOCUSING DISPLACEMENT OF LENS GROUPS UPON PHOTOGRAPHING MAGNIFICATION OF −1/40)

| f | 38.7923 | 110.5161 |
|---|---|---|
| Displacement | 0.6091 | 0.3835 |

(The sign of the displacement is positive in a direction toward the object.)

(VALUES CORRESPONDING TO CONDITIONS)

| | |
|---|---|
| (18) f1/(fw · ft)$^{1/2}$ = | 1.240 |
| (19) f5/f2 = | 0.703 |
| (20) (Bft − Bfw)/(ft − fw) = | 0.601 |
| (21) lf2l/f1 = | 0.455 |
| (22) (f3 − f4)/(f3 + f4) = | 0.017 |

In the following 21st to 24th embodiments, the fourth lens group G4 is displaced during the focusing from a far distance object to a near distance object.

[21st Embodiment]

Figure 29:
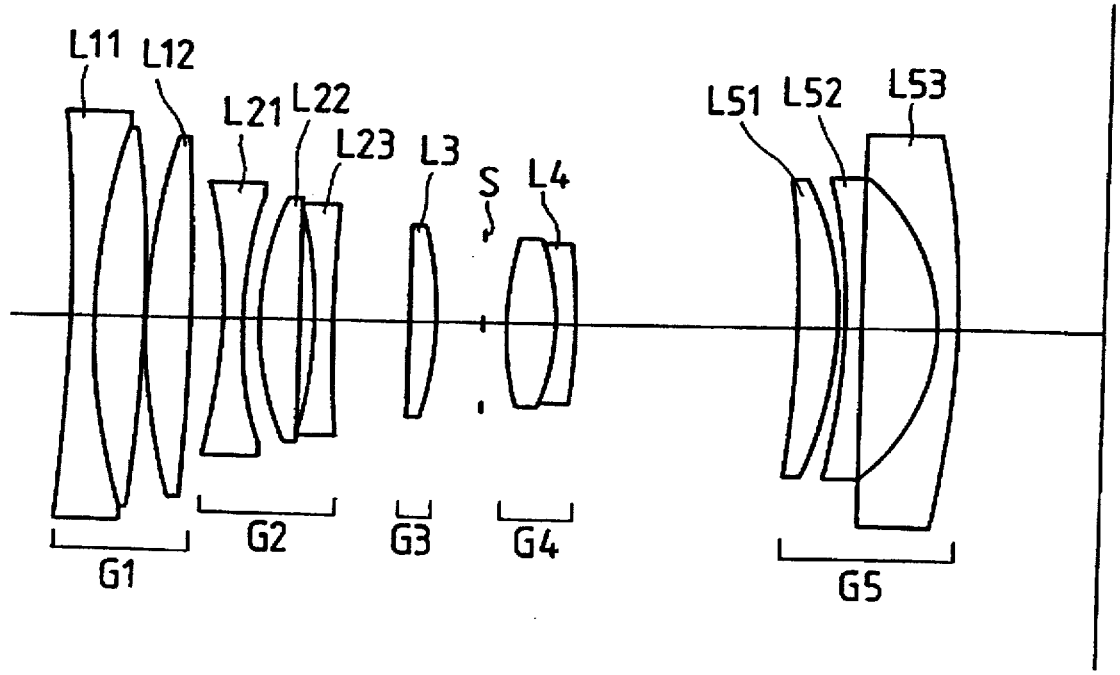
FIG. 29 is a view illustrating a configuration of a variable focal length optical system in a 21st embodiment of the present invention.

FIG. 29 is a view which shows the configuration of a variable focal length optical system in a 21st embodiment of the present invention. Viewing from the object side, the first lens group G1 is composed of a joint lens L11 consisting of a double concave lens and a double convex lens and a double convex Lens L12. The second lens group G2 is composed of a double concave lens L21, a double convex lens L22 and a double concave lens L23. The third lens group G3 is composed of a double convex lens L3, and the fourth lens group G4 is a positive joint lens component L4 consisting of a double convex lens and a negative meniscus lens having a concave surface facing the object side. Further, the fifth lens group G5 is composed of a positive meniscus lens L51 having a concave surface facing the object side, a negative meniscus lens L52 having a concave surface facing the object side, and a negative meniscus lens L53 having a concave surface facing the object side.

Figure 7:
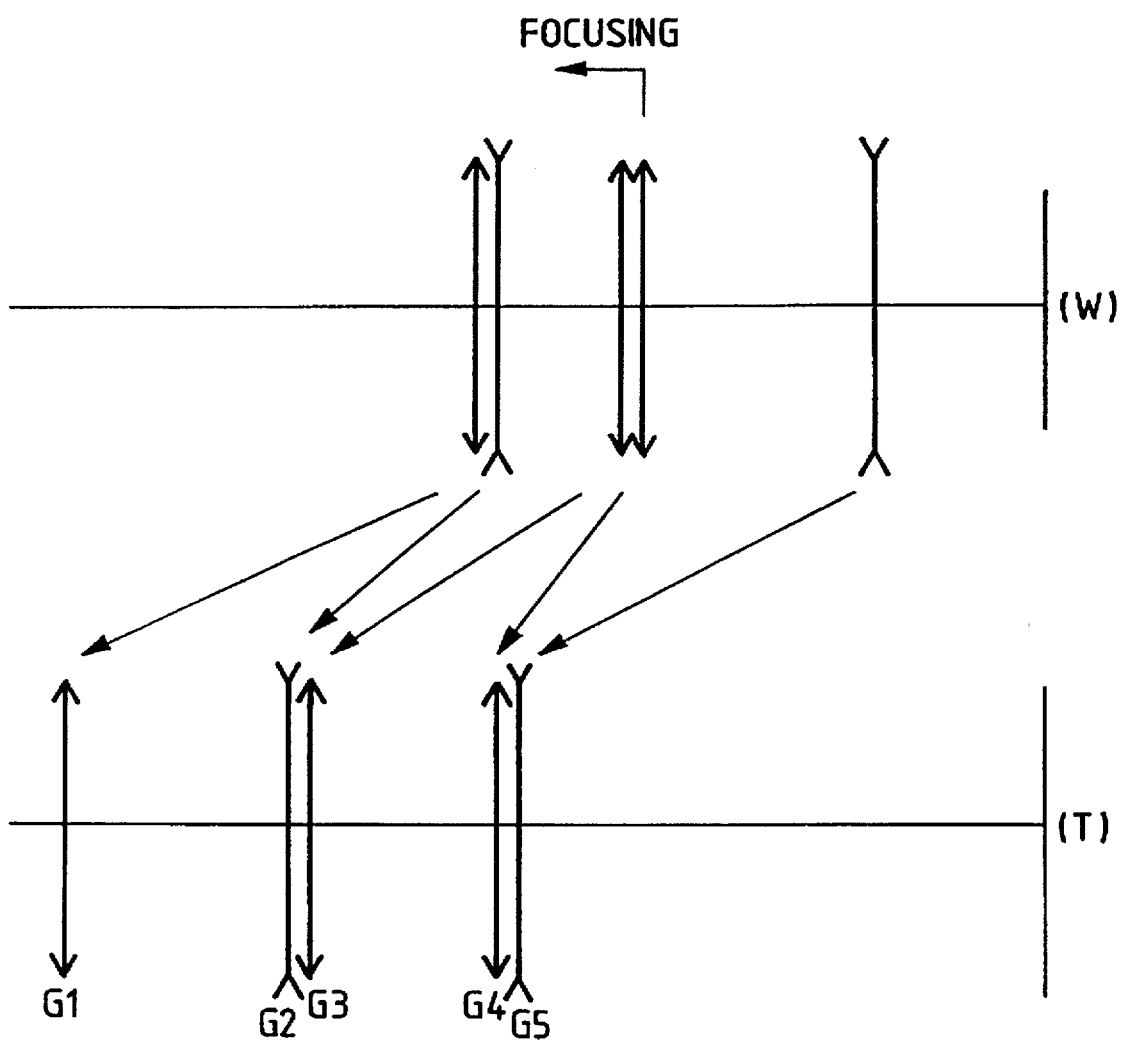
FIG. 7 is a view, similar to FIG. 1A, showing displacement of the fourth lens group G4 toward the object side during focusing from a far distance object to a near distance object.
Figure 8:
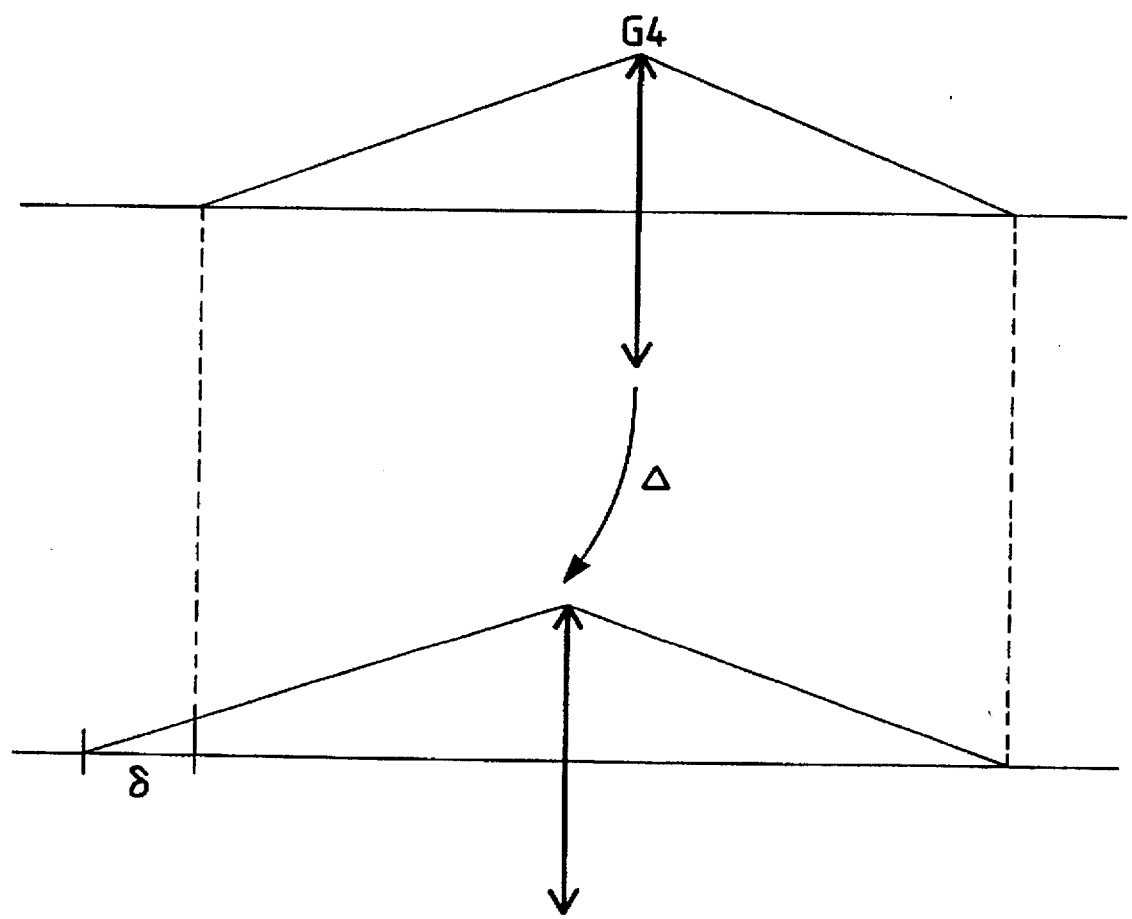
FIG. 8 is a view for explaining a focusing method.

FIG. 29 shows the positional relationship of the lens groups at the wide-angle end, and they are displaced on the optical axis along a zoom locus indicated by the arrow in FIG. 7 during moving of lens groups from the wide-angle end to the telephoto end.

Further, a stop S is located between the third lens group G3 and the fourth lens group G4, and is displaced with the fourth lens group G4 with an air gap therebetween maintained to be unchanged during moving of lens groups from the wide-angle end to the telephoto end.

Table 21 shows data as to the 21st embodiment.

TABLE 21 f = 38.80 - 75.68 - 121.80 mm
FN = 4.3 - 6.9 - 9.0
2ω = 59.2 - 31.4 - 19.8°

| Surface Number | Radius of Curvature | Intersurface Distance | Refractive Index | Abbe's Number |
|---|---|---|---|---|
| 1 | -136.6894 | 1.50 | 1.80384 | 33.89 |
| 2 | 39.0402 | 3.51 | 1.56384 | 60.69 |
| 3 | -80.2574 | 0.13 | | |
| 4 | 42.4571 | 3.01 | 1.62280 | 57.03 |
| 5 | -147.2072 | (d5 = variable) | | |
| 6 | -32.7823 | 1.26 | 1.77279 | 49.45 |
| 7 | 28.5446 | 1.00 | | |
| 8 | 18.8958 | 2.76 | 1.78472 | 25.80 |
| 9 | -251.4186 | 1.00 | | |
| 10 | -26.8968 | 1.26 | 1.79668 | 45.37 |
| 11 | 129.1609 | (d11 = variable) | | |
| 12 | 360.3996 | 1.88 | 1.53996 | 59.60 |
| 13 | -20.5975 | (d13 = variable) | | |
| 14 | ∞ | 1.51 | (stop) | |
| 15 | 21.9826 | 3.27 | 1.53996 | 59.60 |
| 16 | -13.3086 | 1.26 | 1.80518 | 25.35 |
| 17 | -36.5419 | (d17 = variable) | | |
| 18 | -71.7851 | 2.89 | 1.80518 | 25.35 |
| 19 | -20.7264 | 0.38 | | |
| 20 | -37.6538 | 1.26 | 1.84042 | 45.35 |
| 21 | -504.2084 | 4.40 | | |
| 22 | -12.4513 | 1.51 | 1.77279 | 49.45 |
| 23 | -53.6689 | (Bf) | | |

(VARIABLE SPACIAL DISTANCE)

| f | 38.8006 | 75.6784 | 121.8082 |
|---|---|---|---|
| d5 | 2.1349 | 10.3930 | 17.1158 |
| d11 | 4.7612 | 3.5057 | 1.2558 |
| d13 | 3.1959 | 4.4513 | 6.7013 |
| d17 | 15.1723 | 6.4633 | 2.5116 |
| Bf | 9.4854 | 33.6355 | 54.8653 |

(FOCUSING DISPLACEMENT OF FOURTH LENS GROUP UPON PHOTOGRAPHING MAGNIFICATION OF -1/40)

| f | 38.8006 | 75.6784 | 121.8082 |
|---|---|---|---|
| R | 1621.2778 | 3113.3359 | 4977.7728 |
| Displacement | 0.5229 | 0.3701 | 0.3292 |

(The sign of the displacement Δ is positive in a direction toward the object.)

(VALUES CORRESPONDING TO CONDITIONS)

f1 = 68.3664
f3 = 37.7648
d1w = 2.1349
d1t = 17.1158
d2w = 4.7612
d2t = 1.2558
β4w = 0.15099
β4t = 0.20497
Bfw = 9.4854
Bft = 54.8653
fw = 38.80
ft = 121.80

TABLE 21-continued

(23) f3/f1 = 0.552
(24) (d2w - d2t)/(d1t - d1w) = 0.234
(25) β4t/β4w = 1.358
(26) (Bft - Bfw)/(ft - fw) = 0.547

[22nd Embodiment]

Figure 30:
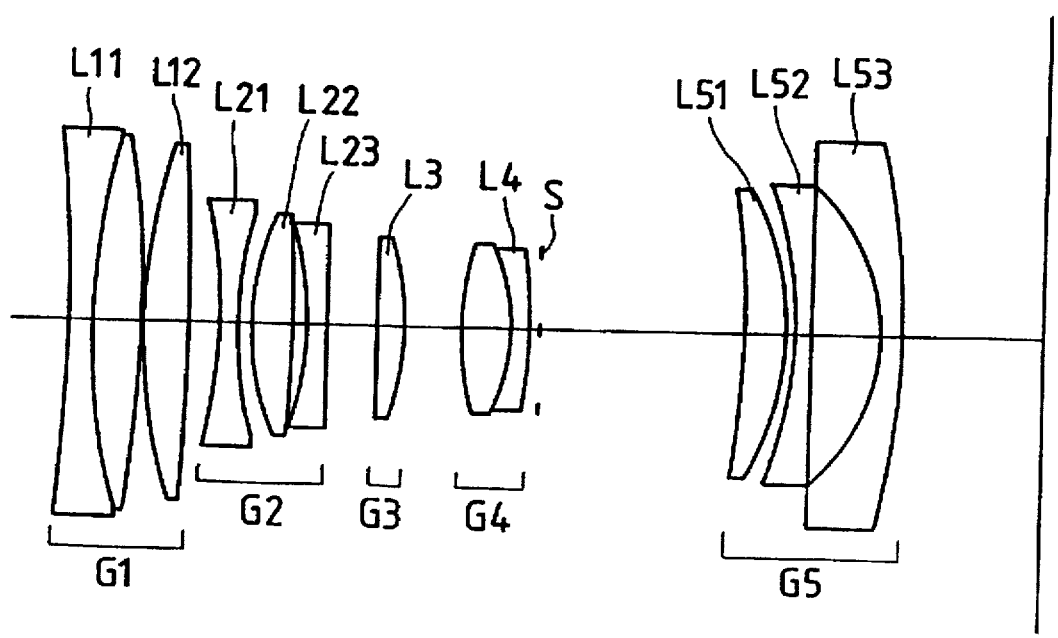
FIG. 30 is a view illustrating a configuration of a variable focal length optical system in a 22nd embodiment of the present invention.

FIG. 30 is a view which shows the configuration of a variable focal length optical system in a 22nd embodiment of the present invention. Viewing from the object side, the first lens group G1 is composed of a joint lens L11 consisting of a double concave lens and a double convex lens and a double convex lens L12. The second lens group G2 is composed of a double concave lens L21, a double convex lens L22 and a double concave lens L23. The third lens group G3 is composed of a positive meniscus lens L3 having a concave surface facing the object side, and the fourth lens group G4 is a positive joint lens component L4 consisting of a double convex lens and a negative meniscus lens having a concave surface facing the object side. Further, the fifth lens group G5 is composed of a positive meniscus lens L51 having a concave surface facing the object side, a negative meniscus lens L52 having a concave surface facing the object side, and a negative meniscus lens L53 having a concave surface facing the object side.

FIG. 30 shows the positional relationship of the lens groups at the wide-angle end, and they are displaced on the optical axis along a zoom locus indicated by the arrow in FIG. 7 during moving of lens groups from the wide-angle end to the telephoto end.

Further, a stop S is located between the fourth lens group G4 and the fifth lens group G5, and is displaced with the fourth lens group G4 with an air gap therebetween maintained to be unchanged during moving of lens groups from the wide-angle end to the telephoto end.

Table 22 shows data as to the 22nd embodiment.

TABLE 22 f = 38.80 - 75.57 - 121.82 mm
FN = 4.2 - 6.4 - 9.1
2ω = 59.2 - 31.4 - 19.8°

| Surface Number | Radius of Curvature | Intersurface Distance | Refractive Index | Abbe's Number |
|---|---|---|---|---|
| 1 | -100.5729 | 1.50 | 1.80384 | 33.89 |
| 2 | 42.6868 | 3.51 | 1.56384 | 60.69 |
| 3 | -71.3582 | 0.13 | | |
| 4 | 39.2139 | 3.01 | 1.62280 | 57.03 |
| 5 | -183.9500 | (d5 = variable) | | |
| 6 | -31.2574 | 1.26 | 1.80411 | 46.54 |
| 7 | 26.1122 | 1.00 | | |
| 8 | 18.5106 | 2.76 | 1.78472 | 25.80 |
| 9 | -85.1359 | 1.00 | | |
| 10 | -21.4109 | 1.26 | 1.76684 | 46.80 |
| 11 | 301.5949 | (d11 = variable) | | |
| 12 | -2139.4562 | 1.88 | 1.51860 | 69.98 |
| 13 | -17.7170 | (d13 = variable) | | |
| 14 | 23.2348 | 3.27 | 1.53996 | 59.60 |
| 15 | -12.1777 | 1.26 | 1.80518 | 25.35 |
| 16 | -32.5065 | 0.63 | | |
| 17 | ∞ | (d17 = variable) | (stop) | |
| 18 | -64.1787 | 2.89 | 1.80518 | 25.35 |
| 19 | -18.9047 | 0.68 | | |
| 20 | -25.1436 | 1.26 | 1.84042 | 45.35 |
| 21 | -120.8813 | 4.10 | | |
| 22 | -12.9063 | 1.51 | 1.77279 | 49.45 |
| 23 | -53.5807 | (Bf) | | |

TABLE 22-continued (VARIABLE SPACIAL DISTANCE)

| f | 38.8004 | 75.5681 | 121.8183 |
|---|---|---|---|
| d5 | 2.1349 | 12.3788 | 17.2777 |
| d11 | 3.5163 | 2.1298 | 1.0047 |
| d13 | 4.0186 | 5.4051 | 6.5302 |
| d17 | 14.2797 | 6.1305 | 1.8837 |
| Bf | 9.4962 | 31.2449 | 56.5986 |

(FOCUSING DISPLACEMENT OF FOURTH LENS GROUP UPON PHOTOGRAPHING MAGNIFICATION OF −1/40)

| f | 38.8004 | 75.5681 | 121.8183 |
|---|---|---|---|
| R | 1553.4629 | 3015.8638 | 4861.5888 |
| Displacement | 0.5077 | 0.3860 | 0.3021 |

(The sign of the displacement Δ is positive in a direction toward the object.)

(VALUES CORRESPONDING TO CONDITIONS)

```
f1  =    69.0790
f3  =    34.4379
d1w =     2.1349
d1t =    17.2777
d2w =     3.5163
d2t =     1.0047
β4w =     0.23882
β4t =     0.18342
Bfw =     9.4962
Bft =    56.5986
fw  =    38.80
ft  =   121.82
(23) f3/f1 =                    0.499
(24) (d2w − d2t)/(d1t − d1w) =  0.166
(25) β4t/β4w =                  1.302
(26) (Bft − Bfw)/(ft − fw) =    0.567
```

[23rd Embodiment]

Figure 31:
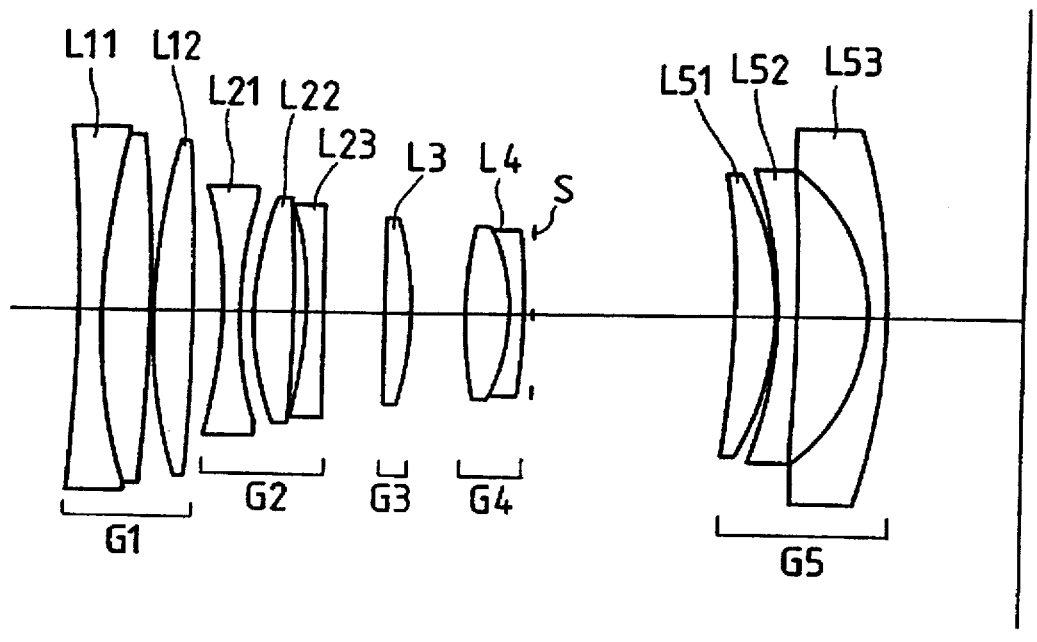
FIG. 31 is a view illustrating a configuration of a variable focal length optical system in a 23rd embodiment of the present invention.

FIG. 31 is a view which shows the configuration of a variable focal length optical system in a 23rd embodiment of the present invention. Viewing from the object side, the first lens group G1 is composed of a joint lens L11 consisting of a double concave lens and a double convex lens and a double convex lens L12. The second lens group G2 is composed of a double concave lens L21, a double convex lens L22 and a double concave lens L23. The third lens group G3 is composed of a double convex lens L3, and the fourth lens group G4 is a positive joint lens component L4 consisting of a double convex lens and a negative meniscus lens having a concave surface facing the object side. Further, the fifth lens group G5 is composed of a positive meniscus lens L51 having a concave surface facing the object side, a negative meniscus lens L52 having a concave surface facing the object side, and a negative meniscus lens L53 having a concave surface facing the object side.

FIG. 31 shows the positional relationship of the lens groups at the wide-angle end, and they are displaced on the optical axis along a zoom locus indicated by the arrow in FIG. 7 during moving of lens groups from the wide-angle end to the telephoto end.

Further, a stop S is located between the third lens group G3 and the fourth lens group G4, and is displaced with the fourth lens group G4 with an air gap therebetween maintained to be unchanged during moving of lens groups from the wide-angle end to the telephoto end.

Table 23 shows data as to the 23rd embodiment.

TABLE 23 f = 38.80 − 77.87 − 134.38 mm
FN = 3.9 − 6.5 − 9.5
2ω = 60.6 − 31.0 − 18.2°

| Surface Number | Radius of Curvature | Intersurface Distance | Refractive Index | Abbe's Number |
|---|---|---|---|---|
| 1 | −118.8494 | 1.50 | 1.80384 | 33.89 |
| 2 | 43.4496 | 3.51 | 1.56384 | 60.69 |
| 3 | −123.1496 | 0.13 | | |
| 4 | 39.7137 | 3.01 | 1.62280 | 57.03 |
| 5 | −151.1848 | (d5 = variable) | | |
| 6 | −31.3246 | 1.26 | 1.80411 | 46.54 |
| 7 | 29.6582 | 0.88 | | |
| 8 | 20.5366 | 2.89 | 1.78472 | 25.80 |
| 9 | −121.1359 | 1.00 | | |
| 10 | −25.3972 | 1.26 | 1.76684 | 46.80 |
| 11 | 530.2191 | (d11 = variable) | | |
| 12 | 158.0786 | 1.88 | 1.58913 | 61.09 |
| 13 | −23.4619 | (d13 = variable) | | |
| 14 | 25.8414 | 3.27 | 1.53996 | 59.60 |
| 15 | −13.2417 | 1.26 | 1.80518 | 25.35 |
| 16 | −39.2875 | 0.63 | | |
| 17 | ∞ | (d17 = variable) | (Stop) | |
| 18 | −58.5051 | 2.89 | 1.80518 | 25.35 |
| 19 | −19.5210 | 0.13 | | |
| 20 | −28.8382 | 1.26 | 1.84042 | 45.35 |
| 21 | −181.9438 | 4.65 | | |
| 22 | −13.0533 | 1.51 | 1.77279 | 49.45 |
| 23 | −41.2762 | (Bf) | | |

(VARIABLE SPACIAL DISTANCE)

| f | 38.8004 | 75.5681 | 121.8183 |
|---|---|---|---|
| d5 | 2.1349 | 11.0232 | 17.2356 |
| d11 | 4.3380 | 2.7166 | 1.0047 |
| d13 | 4.0186 | 5.6400 | 7.3506 |
| d17 | 14.9595 | 6.2751 | 1.8837 |
| Bf | 9.5605 | 36.4211 | 68.9655 |

(FOCUSING DISPLACEMENT OF FOURTH LENS GROUP UPON PHOTOGRAPHING MAGNIFICATION OF −1/40)

| f | 38.8004 | 75.5681 | 121.8183 |
|---|---|---|---|
| R | 1553.4629 | 3015.8638 | 4861.5888 |
| Displacement | 0.5077 | 0.3860 | 0.3021 |

(The sign of the displacement Δ is positive in a direction toward the object.)

(VALUES CORRESPONDING TO CONDITIONS)

```
f1  =    62.0761
f3  =    27.7205
d1w =     2.1349
d1t =    17.2356
d2w =     4.3380
d2t =     1.0047
β4w =     0.2495
β4t =     0.2220
Bfw =     9.5605
Bft =    68.9655
fw  =    38.80
ft  =   134.38
(23) f3/f1 =                    0.447
(24) (d2w − d2t)/(d1t − d1w) =  0.221
(25) β4t/β4w =                  1.124
(26) (Bft − Bfw)/(ft − fw) =    0.622
```

[24th Embodiment]

Figure 32:
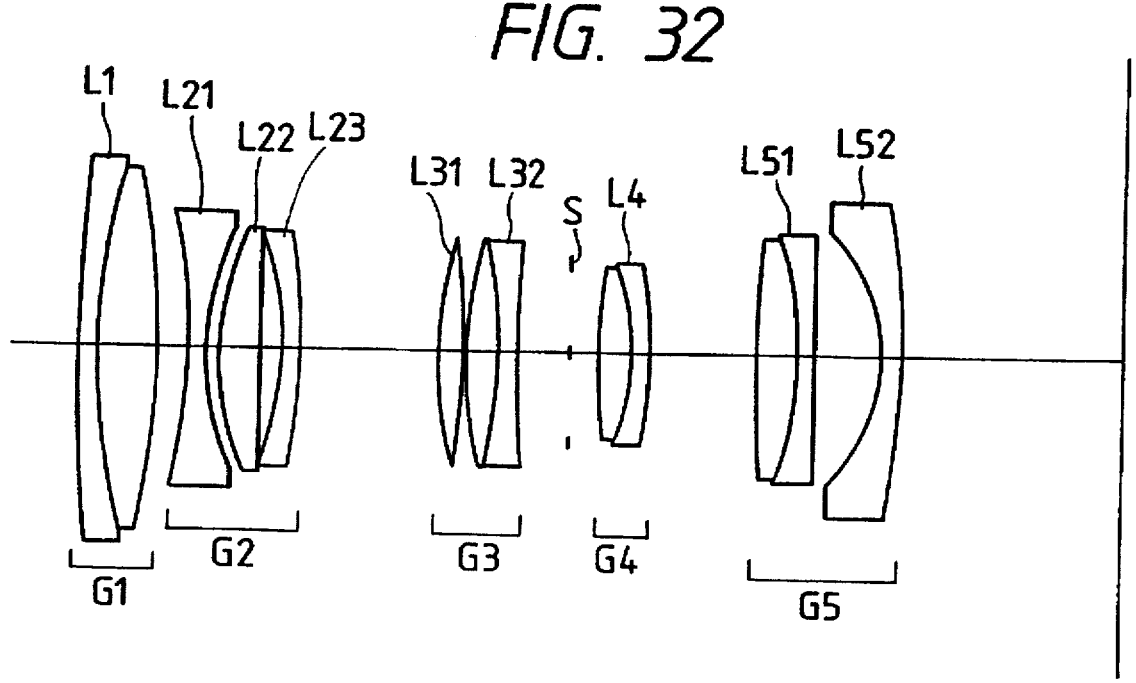
FIG. 32 is a view illustrating a configuration of a variable focal length optical system in a 24th embodiment of the present invention.

FIG. 32 is a view which shows the configuration of a variable focal length optical system in a 24th embodiment of the present invention. Viewing from the object side, the first lens group G1 is composed of a joint lens L1 consisting of a negative meniscus lens having a concave surface facing the object side and a double convex lens. The second lens group G2 is composed of a double concave lens L21, a positive meniscus lens L22 having a convex surface facing the object side and a negative meniscus lens having a concave surface facing the object side L23. The third lens group G3 is composed of a double convex lens L31, and a joint lens L32 consisting of a double convex lens and a double concave lens, and the fourth lens group G4 is a positive joint lens component L4 consisting of a double convex lens and a negative meniscus lens having a concave surface facing the object side. Further, the fifth lens group G5 is composed of a joint lens L51 consisting of a positive lens and a negative lens, and a negative meniscus lens L52 having a concave surface facing the object side.

FIG. 32 shows the positional relationship of the lens groups at the wide-angle end, and they are displaced on the optical axis along a zoom locus indicated by the arrow in FIG. 7 during moving of lens groups from the wide-angle end to the telephoto end.

Further, a stop S is located between the third lens group G3 and the fourth lens group G4, and is displaced with the fourth lens group G4 with an air gap therebetween maintained to be unchanged during moving of lens groups from the wide-angle end to the telephoto end. It is noted that the third lens group G3 and the fifth lens group G5 are displaced with an air gap therebetween maintained to be unchanged during moving of lens groups.

Table 24 shows data as to the 24th embodiment.

TABLE 24 f = 38.80 - 75.33 - 146.85 mm
FN = 3.9 - 6.1 - 9.7
2ω = 60.4 - 31.0 - 16.4°

| Surface Number | Radius of Curvature | Intersurface Distance | Refractive Index | Abbe's Number |
|---|---|---|---|---|
| 1 | 120.2315 | 1.38 | 1.86074 | 23.01 |
| 2 | 43.7628 | 4.40 | 1.51860 | 69.98 |
| 3 | −53.8968 | (d3 = variable) | | |
| 4 | −40.1762 | 1.26 | 1.74809 | 52.30 |
| 5 | 20.8189 | 0.88 | | |
| 6 | 21.3856 | 2.76 | 1.80458 | 25.50 |
| 7 | 1851.4159 | 1.60 | | |
| 8 | −21.7157 | 1.26 | 1.79668 | 45.37 |
| 9 | −52.5487 | (d9 = variable) | | |
| 10 | 27.3726 | 1.88 | 1.62041 | 60.14 |
| 11 | −52.4243 | 0.13 | | |
| 12 | 30.8175 | 2.51 | 1.56384 | 60.69 |
| 13 | −30.7809 | 1.26 | 1.79631 | 40.90 |
| 14 | 125.5814 | (d14 = variable) | | |
| 15 | ∞ | 1.88 | | (Stop) |
| 16 | 38.5145 | 2.51 | 1.51835 | 60.23 |
| 17 | −15.3596 | 1.26 | 1.80518 | 25.35 |
| 18 | −40.1933 | (d18 = variable) | | |
| 19 | 109.9525 | 2.89 | 1.78472 | 25.80 |
| 20 | −24.7439 | 1.26 | 1.79668 | 45.37 |
| 21 | 617.7218 | 4.63 | | |
| 22 | −12.9093 | 1.51 | 1.77279 | 45.37 |
| 23 | −57.6176 | (Bf) | | |

(VARIABLE SPACIAL DISTANCE)

| f | 38.7990 | 75.3280 | 146.8528 |
|---|---|---|---|
| d3 | 2.2273 | 7.6100 | 14.7855 |
| d9 | 9.7152 | 4.4285 | 1.2558 |
| d14 | 3.7674 | 7.3613 | 10.3543 |
| d18 | 7.6555 | 4.0613 | 1.0687 |
| Bf | 14.8873 | 34.1176 | 67.8124 |

TABLE 24-continued (FOCUSING DISPLACEMENT OF FOURTH LENS GROUP UPON PHOTOGRAPHING MAGNIFICATION OF −1/40)

| f | 38.7990 | 75.3280 | 146.8528 |
|---|---|---|---|
| R | 1614.6686 | 3093.6601 | 5986.8050 |
| Displacement | 0.5983 | 0.5097 | 0.3958 |

(The sign of the displacement Δ is positive in a direction toward the object.)

(VALUES CORRESPONDING TO CONDITIONS)

| f1 = | 111.9170 | |
|---|---|---|
| f3 = | 25.1163 | |
| d1w = | 2.227 | |
| d1t = | 14.7855 | |
| d2w = | 9.7152 | |
| d2t = | 1.2558 | |
| β4w = | 0.6088 | |
| β4t = | 0.5740 | |
| Bfw = | 14.8873 | |
| Bft = | 67.8124 | |
| fw = | 38.7990 | |
| ft = | 146.8528 | |
| (23) f3/f1 = | | 0.224 |
| (24) (d2w − d2t)/(d1t − d1w) = | | 0.674 |
| (25) β4t/β4w = | | 0.943 |
| (26) (Bft − Bfw)/(ft − fw) = | | 0.490 |

[25th Embodiment]

Figure 33:
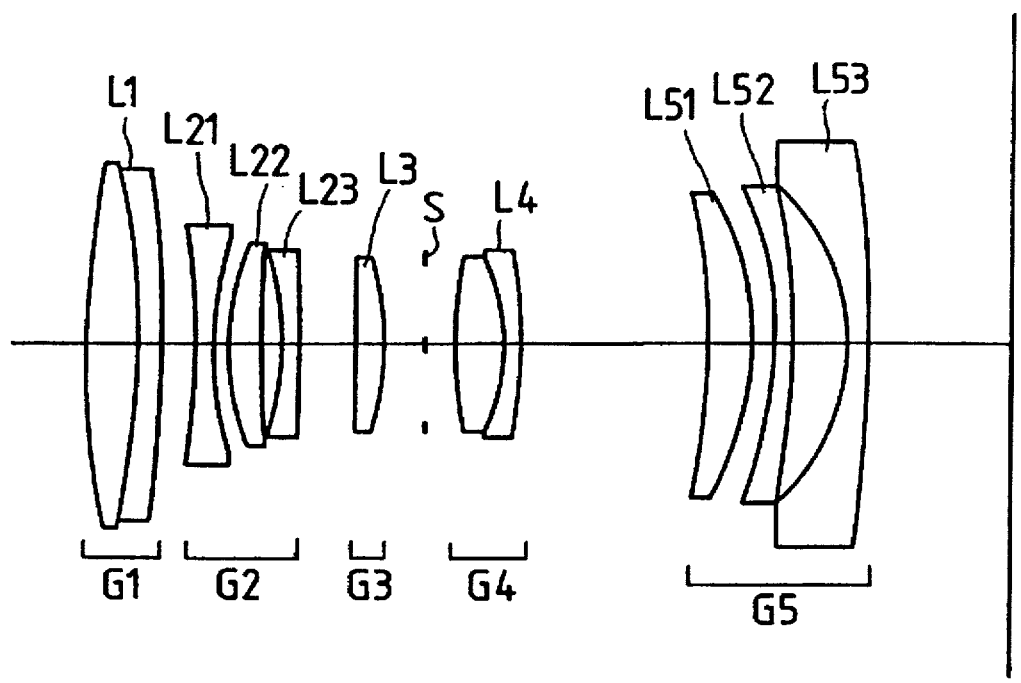
FIG. 33 is a view illustrating a configuration of a variable focal length optical system in a 25th embodiment of the present invention.

FIG. 33 is a view which shows the configuration of a variable focal length optical system in a 25th embodiment of the present invention. Viewing from the object side, the first lens group G1 is composed of a joint lens L1 consisting of a double convex lens and a negative meniscus lens having a concave surface facing the object side. The second lens group G2 is composed of a double concave lens L21, a positive meniscus lens L22 having a convex surface facing the object side and a negative meniscus lens L23 having a concave surface facing the object. The third lens group G3 is composed of a double convex lens L3, and the fourth lens group G4 is a positive Joint lens component L4 consisting of a double convex lens and a negative meniscus lens having a concave surface facing the object side. Further, the fifth lens group G5 is composed of a positive meniscus lens L51 having a concave surface facing the object side, a negative meniscus lens L52 having a concave surface facing the object side, and a negative meniscus lens L53 having a concave surface facing the object side.

Further, a stop S is located between the third lens group G3 and the fourth lens group G4, and is displaced with the fourth lens group G4 with an air gap therebetween maintained to be unchanged during moving of lens groups from the wide-angle end to the telephoto end.

Figure 1A:
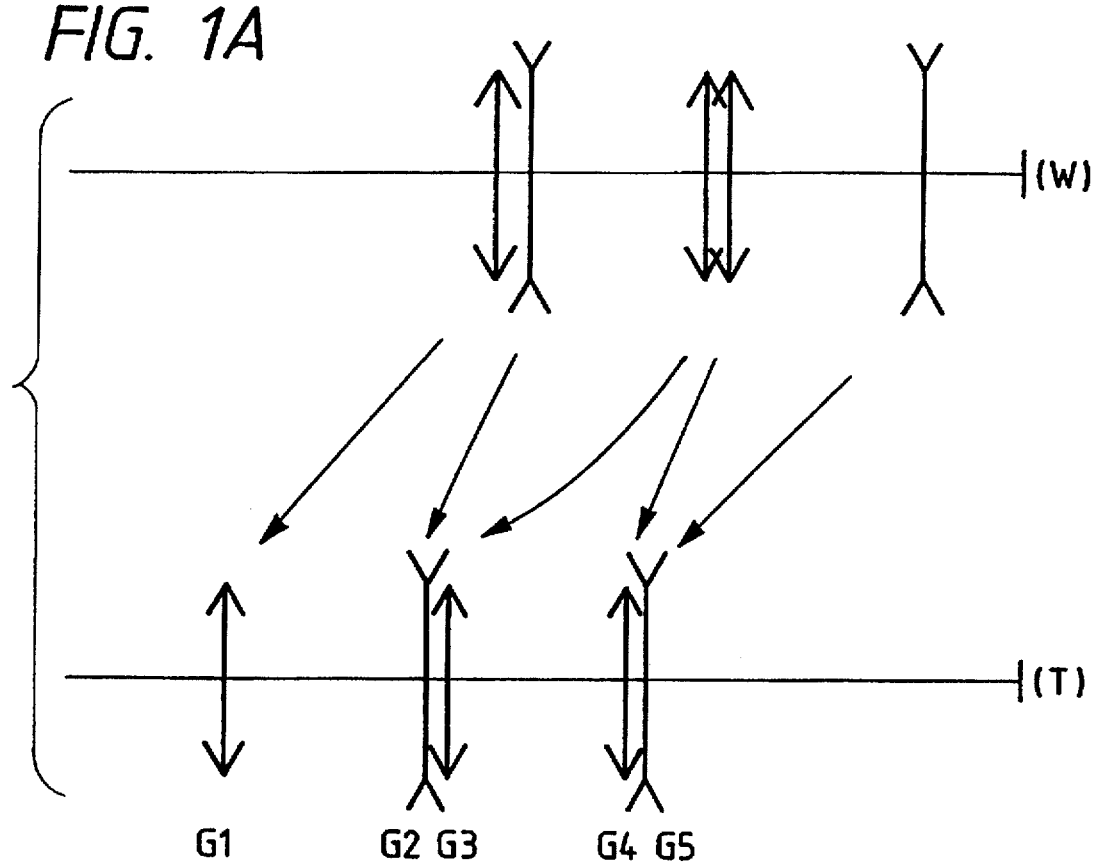
FIG. 1A is a view illustrating a basic configuration of a variable focal length optical system according to the present invention, and a state of displacement of lens groups during moving of lens groups from a wide-angle end to a telephoto end.
Figure 1B:
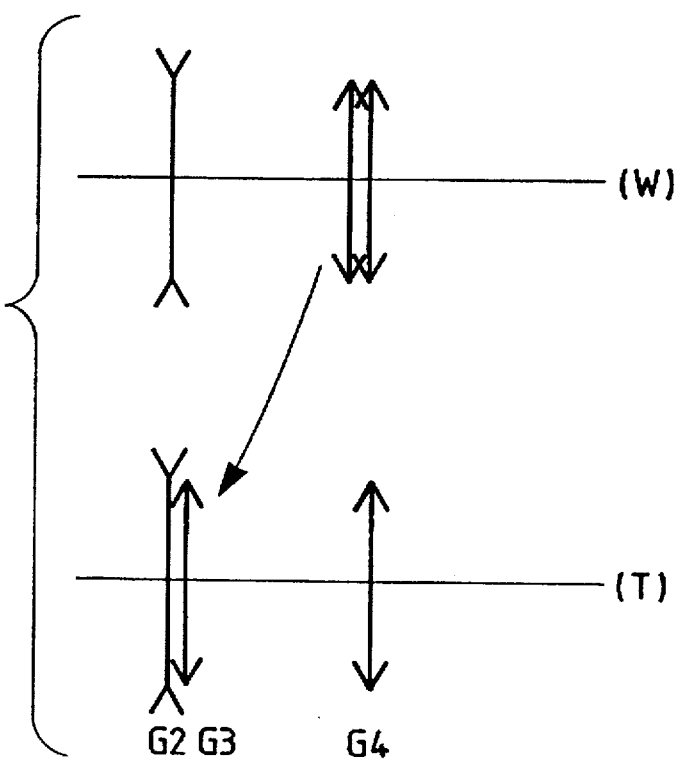
FIG. 1B is a view of positions of a third lens group G3 and a fourth lens group G4, relative to a second lens group G2 during moving of lens groups from the wide-angle end to the telephoto end.
Figure 2:
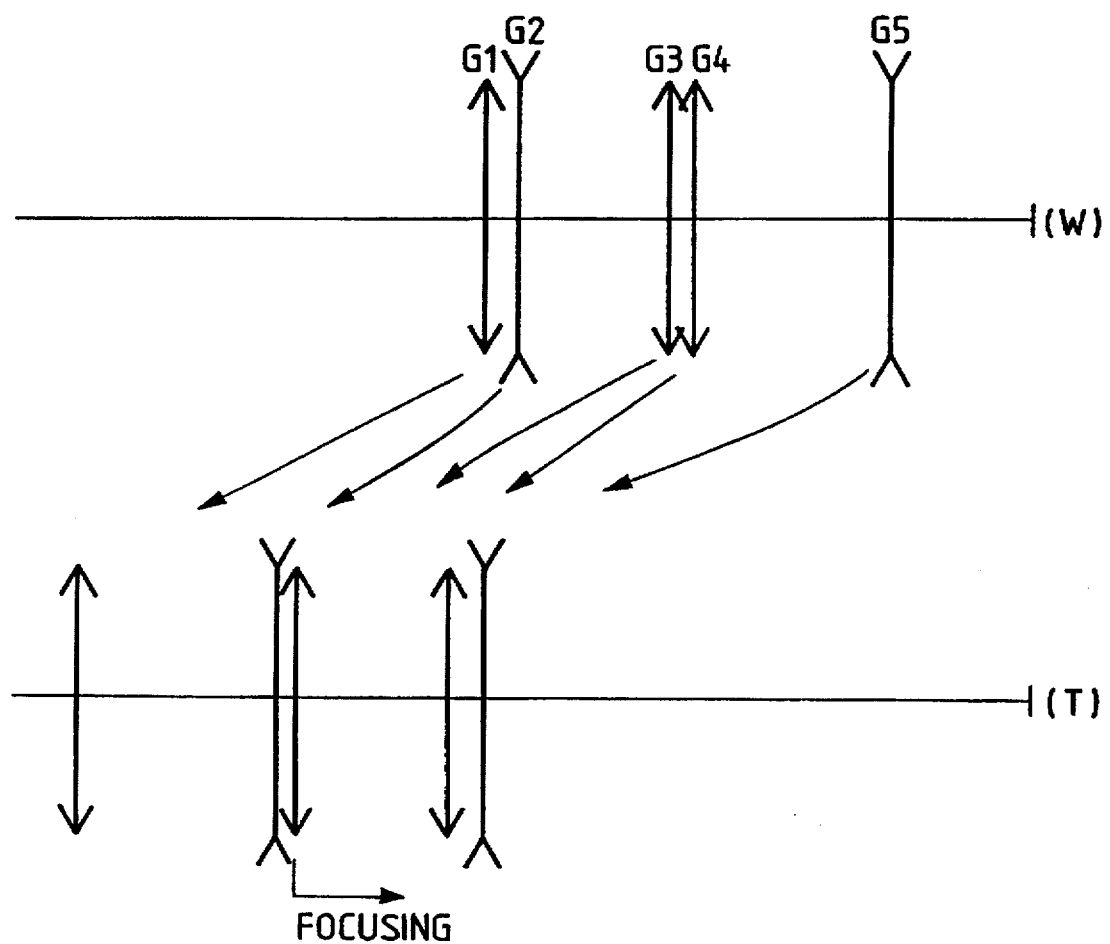
FIG. 2 is a view, similar to FIG. 1A, showing the displacement of the third lens group G3 toward the image side during focusing from a far distance object to a near distance object.
Figure 3:
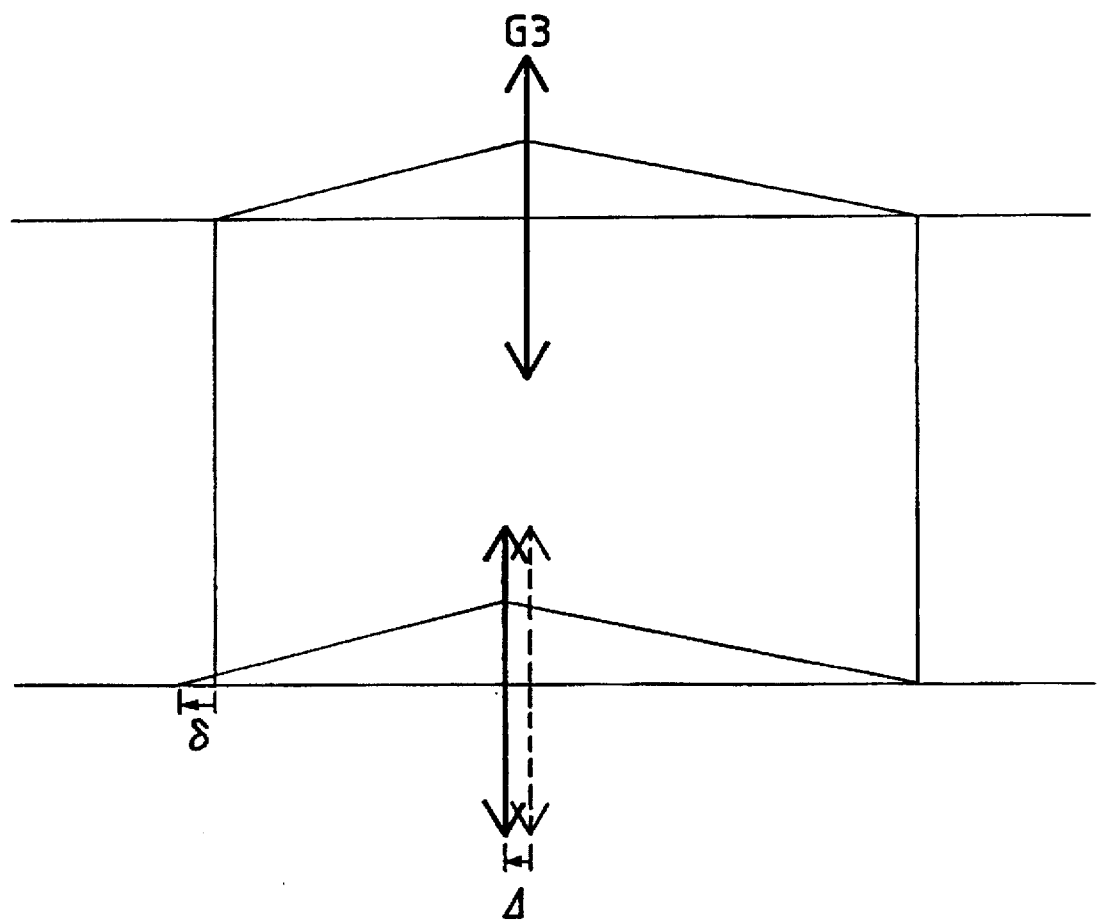
FIG. 3 is a view for explaining a focusing method.
Figure 4A:
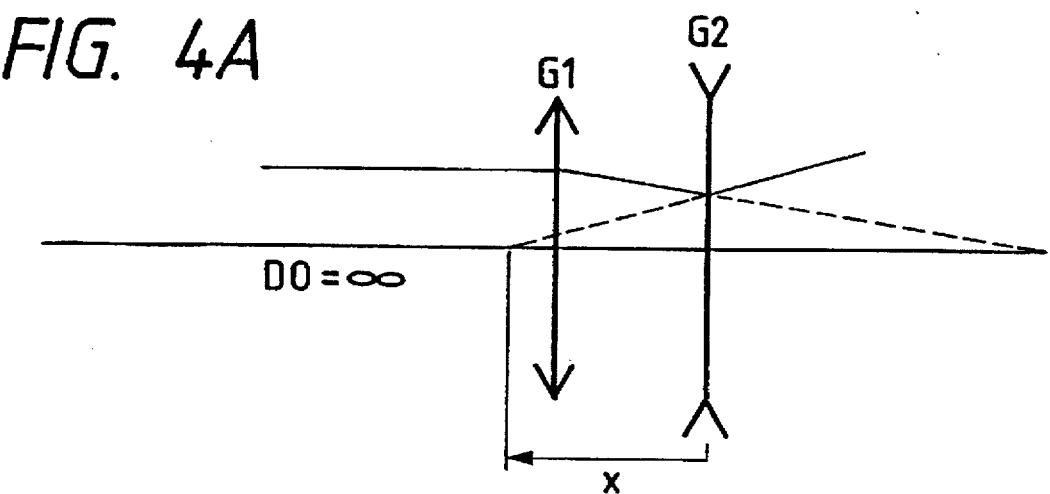
FIGS. 4A and 4B are views illustrating relationships of displacements of positions of image points by the first lens group G1 and the second lens group G2 when the position of an object point is moved from an infinite point to a near distance point.
Figure 4B:
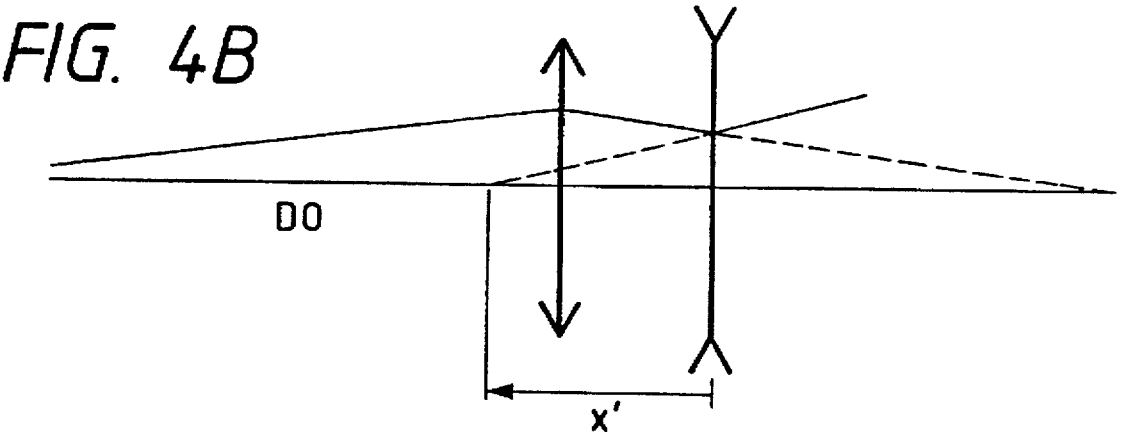

FIG. 33 shows the positional relationship of the lens groups at the wide-angle end, and they are displaced on the optical axis along a zoom locus indicated by the arrow in FIG. 1A during moving of lens groups from the wide-angle end to the telephoto end. It is noted that the second lens group G2 and the fourth lens group G4 are displaced with an air gap therebetween maintained to be unchanged during moving of lens groups from the wide-angle end to the telephoto end.

Table 25 shows data as to the 25th embodiment.

The spherical surface is exhibited by the following expression (i):

$$S(y) = (y^2/R)/[1 + (1 - k \cdot y^2/R^2)^{1/2}] + \qquad (i)$$
$$C_2 \cdot y^2 + C_4 \cdot y^4 + C_6 \cdot y^6 + C_8 \cdot y^8 +$$
$$C_{10} \cdot y^{10} + \ldots$$

where y is the height perpendicular to the optical axis, S(y) is the displacement in the optical axis direction at the height y, R is a reference radius of curvature, k=conical coefficient, and Cn is an n-th order spherical surface coefficient.

Further, the approximated radius r of curvature of the spherical surface is defined by the following expression (j):

$$r = 1/(2 \cdot C_2 + 1/R) \qquad (j)$$

A surface number attached on the left side thereof with the mark "*" gives a spherical surface, among the data of the embodiment.

TABLE 25 f = 38.8 - 74.8 - 110.5 mm
FNO = 4.0 - 6.2 - 8.1
2ω = 57.4 - 31.2 - 21.6°

| Surface Number | Radius of Curvature | Intersurface Distance | Refractive Index | Abbe's Number |
|---|---|---|---|---|
| 1 | 54.7980 | 3.767 | 1.51860 | 69.98 |
| 2 | −44.5884 | 1.507 | 1.86074 | 23.01 |
| 3 | −78.7295 | (d3 = variable) | | |
| 4 | −54.9069 | 1.256 | 1.71300 | 53.93 |
| 5 | 24.4992 | 1.005 | | |
| 6 | 17.9303 | 2.261 | 1.75520 | 27.61 |
| 7 | 96.5140 | 1.256 | | |
| 8 | −18.9385 | 1.256 | 1.74810 | 52.30 |
| 9 | −146.9549 | (d9 = variable) | | |
| 10 | 353.8640 | 1.884 | 1.62041 | 60.14 |
| 11 | −21.7044 | (d11 = variable) | | |
| 12 | ∞ | 1.884 | | (stop) |
| 13 | 24.8823 | 3.265 | 1.53996 | 59.60 |
| 14 | −12.7472 | 1.256 | 1.80518 | 25.35 |
| 15 | −30.4725 | (d15 = variable) | | |
| 16 | −40.9609 | 3.140 | 1.80518 | 25.35 |
| 17 | −18.6000 | 1.407 | | |
| 18 | −24.1455 | 1.256 | 1.84042 | 43.35 |
| 19 | −45.4651 | 3.365 | | |
| 20 | −13.2802 | 1.507 | 1.77279 | 49.45 |
| 21 | −78.3320 | (Bf) | | |

(VARIABLE SPACIAL DISTANCE)

| f | 38.8342 | 74.8480 | 110.5144 |
|---|---|---|---|
| d3 | 2.1349 | 12.3653 | 17.5814 |
| d9 | 3.5163 | 1.9043 | 1.0046 |
| d11 | 2.7628 | 4.3748 | 5.2744 |
| d15 | 13.3197 | 5.3470 | 1.6326 |
| Bf | 9.3860 | 30.8407 | 49.9960 |

(VALUES CORRESPONDING TO CONDITIONS)

(27) (f1 − f3)/(f1 − f3) = 0.411
(28) Bfw/fw = 0.242
(29) (f3 − f4)/(f3 + f4) = −0.057
(30) (β5t/β5w) · (fw/ft) = 0.745
(31) (ft − f1)/(f1 − fw) = 0.777

[26th Embodiment]

Figure 34:
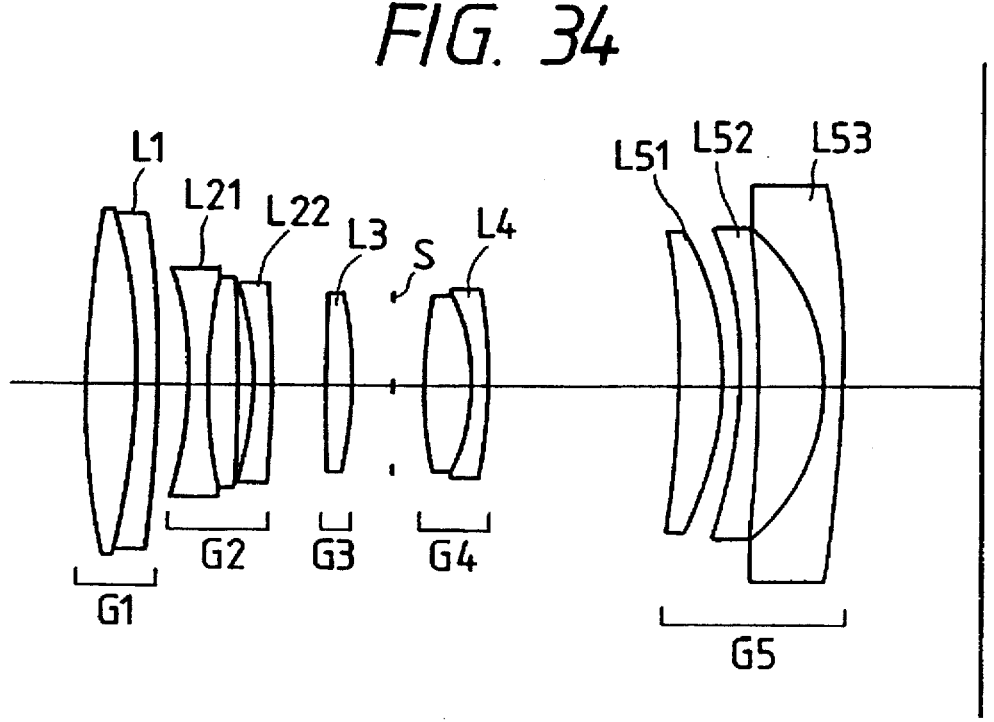
FIG. 34 is a view illustrating a configuration of a variable focal length optical system in a 26th embodiment of the present invention.

FIG. 34 is a view which shows the configuration of a variable focal length optical system in a 26th embodiment of the present invention. Viewing from the object side, the first lens group G1 is composed of a positive joint lens L1 consisting of a double convex lens and a negative meniscus lens having a concave surface facing the object side. The second lens group G2 is composed of a positive joint lens L21 consisting of a double concave lens and a double convex lens, a negative meniscus lens L22 having a concave surface facing the object side. The third lens group G3 is composed of a double convex lens L3, and the fourth lens group G4 is a positive joint lens L4 consisting of a double convex lens and a negative meniscus lens having a concave surface facing the object side. Further, the fifth lens group G5 is composed of a positive meniscus lens L51 having a concave surface facing the object side, a negative meniscus lens L52 having a concave surface facing the object side, and a negative meniscus lens L53 having a concave surface facing the object side.

Further, a stop S is located between the third lens group G3 and the fourth lens group G4, and is displaced with the fourth lens group G4 with an air gap therebetween maintained to be unchanged during moving of lens groups from the wide-angle end to the telephoto end.

FIG. 34 shows the positional relationship of the lens groups at the wide-angle end, and they are displaced on the optical axis along a zoom locus indicated by the arrow in FIG. 1A during moving of lens groups from the wide-angle end to the telephoto end. It is noted that the second lens group G2 and the fourth lens group G4 are displaced with an air gap therebetween maintained to be unchanged during moving of lens groups from the wide-angle end to the telephoto end.

Table 26 shows data as to the 26th embodiment.

TABLE 26 f = 38.8 - 75.3 - 110.6 mm
FNO = 4.0 - 6.3 - 8.0
2ω = 57.8 - 31.2 - 21.6°

| Surface Number | Radius of Curvature | Intersurface Distance | Refractive Index | Abbe's Number |
|---|---|---|---|---|
| 1 | 50.8321 | 3.767 | 1.51860 | 69.98 |
| 2 | −42.7845 | 1.507 | 1.86074 | 23.01 |
| 3 | −77.3101 | (d3 = variable) | | |
| 4 | −24.5740 | 1.256 | 1.74810 | 52.30 |
| 5 | 28.8867 | 2.399 | 1.80518 | 25.35 |
| 6 | −57.6325 | 0.867 | | |
| *7 | −20.7985 | 1.256 | 1.81474 | 37.03 |
| 8 | −70.4325 | (d8 = variable) | | |
| 9 | 121.9030 | 1.884 | 1.62041 | 60.14 |
| 10 | −24.5523 | (d10 = variable) | | |
| 11 | ∞ | 1.884 | | (stop) |
| 12 | 26.0330 | 3.265 | 1.53996 | 59.60 |
| 13 | −13.3920 | 1.256 | 1.80518 | 25.35 |
| 14 | −32.2562 | (d14 = variable) | | |
| 15 | −53.9376 | 3.140 | 1.80518 | 25.35 |
| 16 | −19.7511 | 1.236 | | |
| 17 | −26.7343 | 1.256 | 1.84042 | 43.35 |
| 18 | −70.9049 | 3.902 | | |
| 19 | −13.3254 | 1.507 | 1.77279 | 49.45 |
| 20 | −69.2724 | (Bf) | | |

(VARIABLE SPACIAL DISTANCE)

| f | 38.8217 | 75.3325 | 110.5581 |
|---|---|---|---|
| d3 | 2.0093 | 11.3819 | 17.2253 |
| d8 | 3.5163 | 1.9748 | 1.0047 |
| d10 | 2.7628 | 4.3044 | 5.2745 |
| d14 | 13.8392 | 5.4268 | 1.6326 |
| Bf | 9.2758 | 31.8273 | 49.9987 |

(ASPHERIC SURFACE DATA)

| | k | $C_2$ | $C_4$ |
|---|---|---|---|
| 7th Surface | 1.0000 | 0.0000 | $0.15320 \times 10^{-4}$ |

| | $C_6$ | $C_8$ | $C_{10}$ |
|---|---|---|---|
| | $0.56450 \times 10^{-7}$ | $-0.26640 \times 10^{-8}$ | $0.20890 \times 10^{-10}$ |

TABLE 26-continued

| (VALUES CORRESPONDING TO CONDITIONS) | |
|---|---|
| (27) (f1 − f3)/(f1 + f3) = | 0.391 |
| (28) Bfw/fw = | 0.239 |
| (29) (f3 − f4)/(f3 + f4) = | −0.082 |
| (30) (β5t/β5w) · (fw/ft) = | 0.745 |
| (31) (ft − f1)/(f1 − fw) = | 0.954 |

[27th Embodiment]

Figure 35:
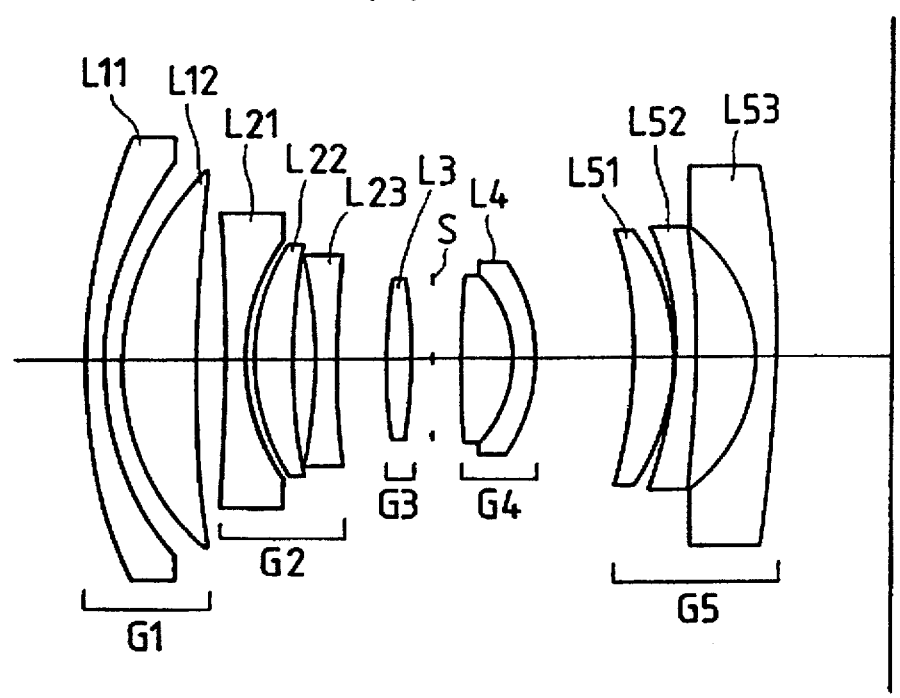
FIG. 35 is a view illustrating a configuration of a variable focal length optical system in a 27th embodiment of the present invention.

FIG. 35 is a view which shows the configuration of a variable focal length optical system in a 27th embodiment of the present invention. Viewing from the object side, the first lens group G1 is composed of a negative meniscus lens L11 having a convex surface facing the object side and a positive meniscus lens L12 having a convex surface facing the object side. The second lens group G2 is composed of a double concave lens L21, a double positive meniscus lens L22 having a convex surface facing the object side, and a double concave lens 23. The third lens group G3 is composed of a double convex lens LJ, and the fourth lens group G4 is a positive joint lens L4 consisting of a double convex lens and a negative meniscus lens having a concave surface facing the object side. Further, the fifth lens group G5 is composed of a positive meniscus lens L51 having a concave surface facing the object side, a negative meniscus lens L52 having a concave surface facing the object side, and a negative meniscus lens L53 having a concave surface facing the object side.

Further, a stop S is located between the third lens group G3 and the fourth lens group G4, and is displaced with the fourth lens group G4 with an air gap therebetween maintained to be unchanged during moving of lens groups from the wide-angle end to the telephoto end.

FIG. 35 shows the positional relationship of the lens groups at the wide-angle end, and they are displaced on the optical axis along a zoom locus indicated by the arrow in FIG. 1A during moving of lens groups from the wide-angle end to the telephoto end. It is noted that the second lens group G2 and the fourth lens group G4 are displaced with an air gap therebetween maintained to be unchanged during moving of lens groups from the wide-angle end to the telephoto end.

Table 27 shows data as to the 27th embodiment.

TABLE 27 f = 28.3 - 50.2 - 85.4 mm
FNO = 3.3 - 5.2 - 7.9
2ω = 75.8 - 45.8 - 27.8°

| Surface Number | Radius of Curvature | Intersurface Distance | Refractive Index | Abbe's Number |
|---|---|---|---|---|
| 1 | 34.5991 | 1.256 | 1.80518 | 25.35 |
| 2 | 19.2911 | 1.256 | | |
| 3 | 15.7512 | 5.023 | 1.62041 | 60.14 |
| 4 | 79.9184 | (d4 = variable) | | |
| 5 | −119.9705 | 1.256 | 1.71300 | 53.93 |
| 6 | 12.3679 | 0.650 | | |
| 7 | 12.9708 | 2.594 | 1.80518 | 25.35 |
| 8 | 47.6524 | 1.514 | | |
| 9 | −25.3109 | 1.256 | 1.79668 | 45.37 |
| 10 | 91.0879 | (d10 = variable) | | |
| *11 | 25.6795 | 1.758 | 1.58913 | 61.09 |
| 12 | −27.0790 | (d12 = variable) | | |
| 13 | ∞ | 1.884 | | (stop) |
| 14 | 53.9015 | 3.516 | 1.51860 | 69.98 |
| 15 | −7.0331 | 1.507 | 1.80518 | 25.35 |

TABLE 27-continued

| 16 | −10.4195 | (d16 = variable) | | |
|---|---|---|---|---|
| 17 | −24.4187 | 2.637 | 1.80518 | 25.35 |
| 18 | −13.2691 | 0.126 | | |
| 19 | −19.3608 | 1.256 | 1.84042 | 43.35 |
| 20 | −55.4415 | 4.096 | | |
| 21 | −9.4419 | 1.507 | 1.71300 | 53.93 |
| 22 | −57.7526 | (Bf) | | |

(VARIABLE SPACIAL DISTANCE)

| f | 28.2704 | 50.1532 | 85.3776 |
|---|---|---|---|
| d4 | 1.8838 | 6.3577 | 8.6719 |
| d10 | 3.1102 | 2.5346 | 1.2558 |
| d12 | 1.2558 | 1.8314 | 3.1102 |
| d16 | 6.7029 | 3.0019 | 1.2558 |
| Bf | 7.7417 | 22.7359 | 43.6537 |

(ASPHERIC SURFACE DATA)

| | k | $C_2$ | $C_4$ |
|---|---|---|---|
| 11th Surface | 0.0000 | 0.0000 | $-0.12500 \times 10^{-3}$ |

| | $C_6$ | $C_8$ | $C_{10}$ |
|---|---|---|---|
| | $-0.51280 \times 10^{-6}$ | $0.37640 \times 10^{-8}$ | $-0.18560 \times 10^{-9}$ |

(VALUES CORRESPONDING TO CONDITIONS)

| (27) (f1 − f3)/(f1 + f3) = | 0.505 |
|---|---|
| (28) Bfw/fw = | 0.274 |
| (29) (f3 − f4)/(f3 + f4) = | 0.034 |
| (30) (β5t/β5w) · (fw/ft) = | 0.804 |
| (31) (ft − f1)/(f1 − fw) = | 0.412 |

[28th Embodiment]

Figure 36:
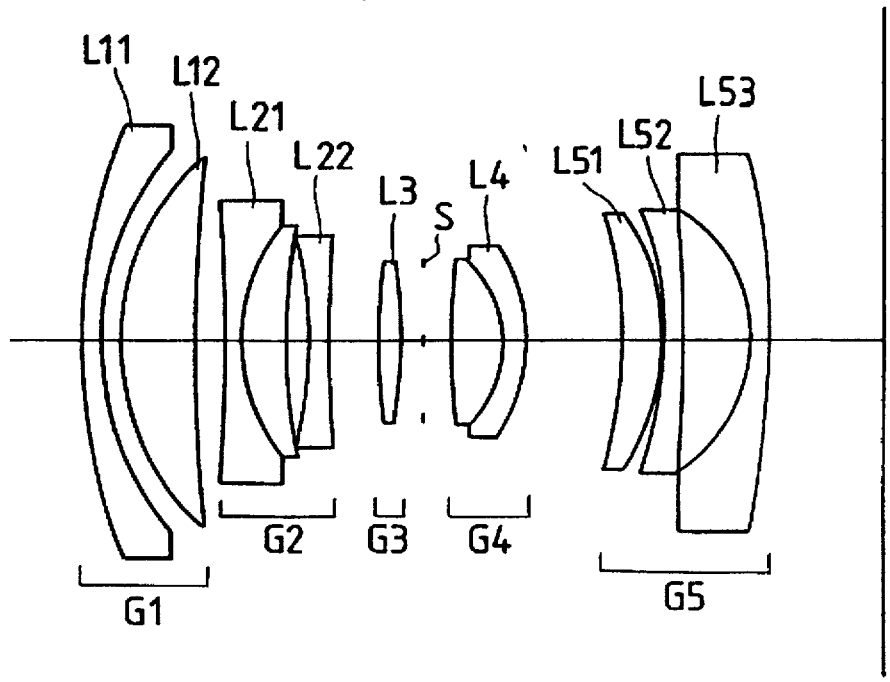
FIG. 36 is a view illustrating a configuration of variable focal length optical system in a 28th embodiment of the present invention.

FIG. 36 is a view which shows the configuration of a variable focal length optical system in a 28th embodiment of the present invention. Viewing from the object side, the first lens group G1 is composed of a negative meniscus lens L11 having a convex surface facing the object side and a positive meniscus lens having a convex surface facing the object side. The second lens group G2 is composed of a negative joint lens L21 consisting of a double concave lens and a positive meniscus lens having a convex surface facing the object side, and a double convex lens L22. The third lens group G3 is composed of a double convex lens L3, and the fourth lens group G4 is a positive joint lens L4 consisting of a double convex lens and a negative meniscus lens having a concave surface facing the object side. Further, the fifth lens group G5 is composed of a positive meniscus lens L51 having a concave surface facing the object side, a negative meniscus lens L52 having a concave surface facing the object side, and a negative meniscus lens L53 having a concave surface facing the object side.

Further, a stop S is located between the third lens group G3 and the fourth lens group G4, and is displaced with the fourth lens group G4 with an air gap therebetween maintained to be unchanged during moving of lens groups from the wide-angle end to the telephoto end.

FIG. 36 shows the positional relationship of the lens groups at the wide-angle end, and they are displaced on the optical axis along a zoom locus indicated by the arrow in FIG. 1A during moving of lens groups from the wide-angle end to the telephoto end. It is noted that the second lens group G2 and the fourth lens group G4 are displaced with an air gap therebetween maintained to be unchanged during moving of lens groups from the wide-angle end to the telephoto end.

Table 28 shows data as to the 28th embodiment.

TABLE 28 f = 28.3 - 49.8 - 85.4 mm
FNO = 3.3 - 5.1 - 8.0
2ω = 56.2 - 46.0 - 27.8°

| Surface Number | Radius of Curvature | Intersurface Distance | Refractive Index | Abbe's Number |
|---|---|---|---|---|
| 1 | 37.7609 | 1.256 | 1.80518 | 25.35 |
| 2 | 19.2931 | 1.256 | | |
| 3 | 15.9288 | 5.022 | 1.62041 | 60.14 |
| 4 | 96.4898 | (d4 = variable) | | |
| 5 | −126.7035 | 1.256 | 1.71300 | 53.93 |
| 6 | 11.6539 | 2.888 | 1.80518 | 25.35 |
| 7 | 40.0308 | 1.507 | | |
| 8 | −22.6318 | 1.256 | 1.79668 | 45.37 |
| 9 | 173.2295 | (d9 = variable) | | |
| 10 | 24.6449 | 1.758 | 1.58913 | 61.09 |
| 11 | −25.2190 | (d11 = variable) | | |
| 12 | ∞ | 1.884 | | (stop) |
| 13 | 66.7317 | 3.516 | 1.51860 | 69.98 |
| 14 | −7.0640 | 1.507 | 1.80518 | 25.35 |
| 15 | −10.3655 | (d15 = variable) | | |
| 16 | −25.1345 | 2.637 | 1.80518 | 25.35 |
| 17 | −13.6624 | 0.126 | | |
| 18 | −21.2807 | 1.256 | 1.84042 | 43.35 |
| 19 | −77.5442 | 4.096 | | |
| 20 | −9.4077 | 1.507 | 1.71300 | 53.93 |
| 21 | −48.4592 | (Bf) | | |

(VARIABLE SPACIAL DISTANCE)

| f | 28.2951 | 49.8197 | 85.4017 |
|---|---|---|---|
| d4 | 1.8837 | 6.3575 | 8.6717 |
| d9 | 3.1101 | 2.5346 | 1.2558 |
| d11 | 1.2558 | 1.8314 | 3.1101 |
| d15 | 6.7027 | 3.0018 | 1.2558 |
| Bf | 7.5972 | 22.5827 | 43.9649 |

(ASPHERIC SURFACE DATA)

| | k | $C_2$ | $C_4$ |
|---|---|---|---|
| 10th Surface | 0.0000 | 0.0000 | $-0.14130 \times 10^{-3}$ |

| $C_6$ | $C_8$ | $C_{10}$ |
|---|---|---|
| $0.43180 \times 10^{-7}$ | $-0.34090 \times 10^{-7}$ | $0.58020 \times 10^{-9}$ |

(VALUES CORRESPONDING TO CONDITIONS)

| (27) (f1 − f3)/(f1 + f3) = | 0.553 |
|---|---|
| (28) Bfw/fw = | 0.268 |
| (29) (f3 − f4)/(f3 + f4) = | −0.004 |
| (30) (β5t/β5w) · (fw/ft) = | 0.807 |
| (31) (ft − f1)/(f1 − fw) = | 0.239 |

[29th Embodiment]

Figure 37:
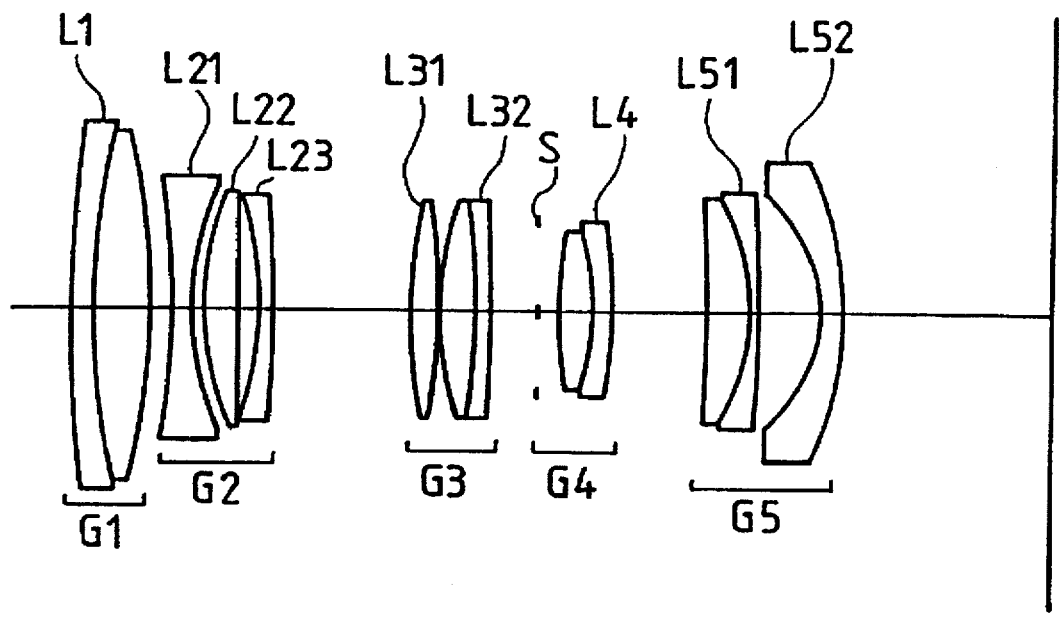
FIG. 37 is a view illustrating a configuration of a variable focal length optical system in a 29th embodiment of the present invention.

FIG. 37 is a view showing the configuration of a variable focal length optical system in a 29th embodiment of the present invention.

Viewing from the object side, the first lens group G1 is composed of a positive joint lens L1 consisting of a negative meniscus lens having a convex surface facing the object side and a double convex lens. The second lens group G2 is composed of a double concave lens L21, a double convex lens L22 and a negative meniscus lens L23 having a concave surface facing the object side. The third lens group G3 is composed of a double convex lens L31 and a joint lens L32 consisting of a double convex lens and a double concave lens. The fourth lens group G4 is composed of a positive joint lens L4 consisting of a double convex lens and a negative meniscus lens having a concave surface facing the object side. The fifth lens group G5 is composed of a joint lens L51 consisting of a positive meniscus lens having a concave surface facing the object side and a negative meniscus lens having a concave surface facing the object side, and a negative meniscus lens L52 having a concave surface facing the object side.

Further, a stop S is disposed between the third lens group G3 and the fourth lens group G4, and is moved with the fourth lens group G4 with an air gap therebetween maintained to be unchanged during moving the lens groups from the wide-angle end to the telephoto end.

FIG. 37 shows the positional relationship of the lens groups at the wide-angle end, and they are moved on the optical axis along zoom loci indicated by the arrows in FIG. 1A during moving of the lens groups from the wide-angle end to the telephoto end. Also, the third lens group G3 and the fifth lens group G5 are moved with an air gap therebetween maintained to be unchanged during moving of the lens groups from the wide-angle end to the telephoto end.

Table 29 shows data as to the 29th embodiment.

TABLE 29 f = 38.80 - 75.35 - 134.37 mm
FNO = 4.0 - 6.1 - 9.0
2ω = 60.4 - 31.0 - 17.8°

| Surface Number | Radius of Curvature | Intersurface Distance | Abbe's Number | Refractive Index |
|---|---|---|---|---|
| 1 | 102.3695 | 1.38 | 23.01 | 1.86074 |
| 2 | 45.7870 | 4.40 | 69.98 | 1.51860 |
| 3 | −60.9915 | (d3 = variable) | | |
| 4 | −43.7761 | 1.26 | 46.54 | 1.80411 |
| 5 | 19.8936 | 0.88 | | |
| 6 | 20.8266 | 2.76 | 25.80 | 1.78472 |
| 7 | −242.4147 | 1.13 | | |
| 8 | −27.4354 | 1.26 | 52.30 | 1.74810 |
| 9 | −166.9688 | (d9 = variable) | | |
| 10 | 46.8910 | 1.88 | 61.09 | 1.58913 |
| 11 | −69.7480 | 0.13 | | |
| 12 | 20.6174 | 2.51 | 61.09 | 1.58913 |
| 13 | −59.5192 | 1.26 | 28.56 | 1.79504 |
| 14 | 436.9679 | (d14 = variable) | | |
| 15 | ∞ | 1.88 | (Stop S) | |
| 16 | 53.8202 | 2.51 | 60.23 | 1.51835 |
| 17 | −16.8025 | 1.26 | 25.35 | 1.80518 |
| 18 | −44.6622 | (d18 = variable) | | |
| 19 | −83.6953 | 2.89 | 25.35 | 1.80518 |
| 20 | −18.0993 | 1.26 | 45.35 | 1.84042 |
| 21 | −81.1007 | 4.63 | | |
| 22 | −11.1111 | 1.51 | 49.45 | 1.77279 |
| 23 | −24.8181 | (Bf) | | |

(VARIABLE SPACIAL DISTANCE)

| f | 38.8046 | 75.3488 | 134.3721 |
|---|---|---|---|
| d3 | 2.2273 | 8.0410 | 16.1664 |
| d9 | 10.8513 | 4.6265 | 1.2558 |
| d14 | 3.7674 | 6.5729 | 8.7907 |
| d18 | 7.5349 | 4.7295 | 2.5116 |
| Bf | 16.1663 | 35.0513 | 62.2809 |

(VALUES CORRESPONDING TO CONDITION)

| f3 = | 22.6046 |
|---|---|
| f4 = | 93.7799 |
| β5w = | 1.7128 |
| β5t = | 3.4910 |
| (32) (f4 − f3)/(f4 + f3) = | 0.612 |
| (33) (d2t − d2w)/(d3t − d3w) = | 1.910 |
| (34) (Bft − Bfw)/(ft − fw) = | 0.483 |
| (35) (β5t/β5w)/(ft/fw) = | 0.589 |
| (36) β3t = | −1.363 |

[30th Embodiment]

Figure 38:
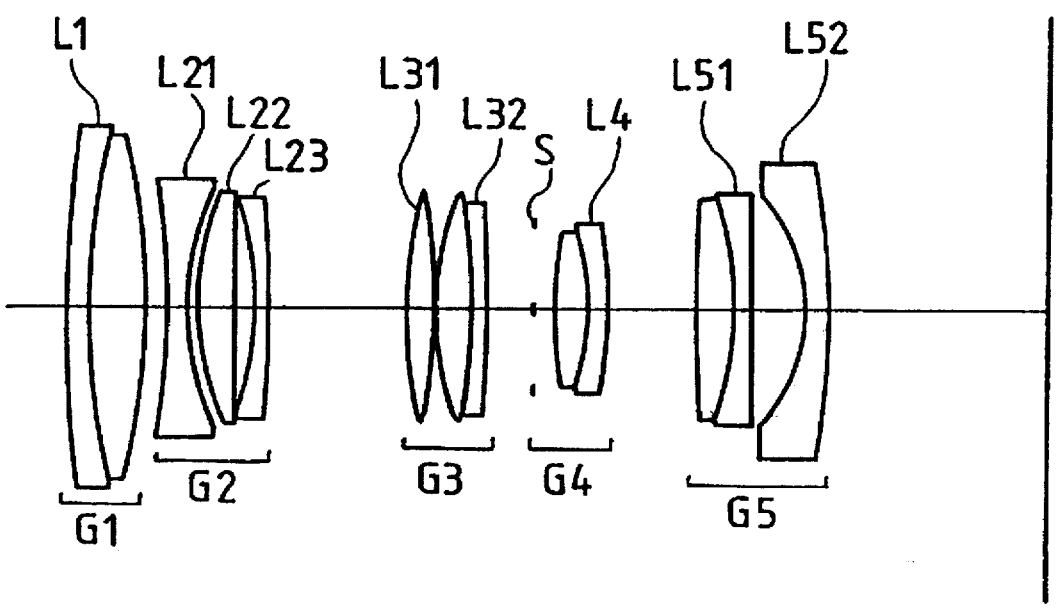
FIG. 38 is a view illustrating a configuration of a variable focal length optical system in a 30th embodiment of the present invention.

FIG. 38 is a view showing the configuration of a variable focal length optical system in a 30th embodiment of the present invention.

Viewing from the object side, the first lens group G1 is composed of a positive joint lens L1 consisting of a negative meniscus lens having a convex surface facing the object side and a double convex lens. The second lens group G2 is composed of a double concave lens L21, a positive meniscus lens L22 having a convex surface facing the object side, and a negative meniscus lens L23 having a concave surface facing the object side. The third lens group G3 is composed of a double convex lens L31 and a joint lens L32 consisting of a double convex lens and a double concave lens. The fourth lens group G4 is composed of a positive joint lens L4 consisting of a double convex lens and a negative meniscus lens having a concave surface facing the object side. The fifth lens group G5 is composed of a joint lens L51 consisting of a positive meniscus lens having a concave surface facing the object side and a negative meniscus lens having a concave surface facing the object side, and a negative meniscus lens L52 having a concave surface facing the object side.

Further, a stop S is disposed between the third lens group G3 and the fourth lens group G4, and is moved with the fourth lens group G4 with an air gap therebetween maintained to be unchanged during moving the lens groups from the wide-angle end to the telephoto end.

FIG. 38 shows the positional relationship of the lens groups at the wide-angle end, and they are moved on the optical axis along zoom loci indicated by the arrows in FIG. 1A during moving of the lens groups from the wide-angle end to the telephoto end. Also, the third lens group G3 and the fifth lens group G5 are moved with an air gap therebetween maintained to be unchanged during moving of the lens groups from the wide-angle end to the telephoto end.

Table 30 shows data as to the 30th embodiment.

TABLE 30 f = 38.80 - 75.33 - 146.85 mm
FNO = 3.9 - 6.1 - 9.7
2ω = 60.4 - 31.0 - 16.4°

| Surface Number | Radius of Curvature | Intersurface Distance | Abbe's Number | Refractive Index |
|---|---|---|---|---|
| 1 | 120.2315 | 1.38 | 23.01 | 1.86074 |
| 2 | 43.7628 | 4.40 | 69.98 | 1.51860 |
| 3 | −53.8968 | d3 = variable | | |
| 4 | −40.1762 | 1.26 | 52.30 | 1.74809 |
| 5 | 20.8189 | 0.88 | | |
| 6 | 21.3856 | 2.76 | 25.50 | 1.80458 |
| 7 | 1851.4159 | 1.60 | | |
| 8 | −21.7157 | 1.26 | 45.37 | 1.79668 |
| 9 | −52.5487 | (d9 = variable) | | |
| 10 | 27.3726 | 1.88 | 60.14 | 1.62041 |
| 11 | −52.4243 | 0.13 | | |
| 12 | 30.8175 | 2.51 | 60.69 | 1.56384 |
| 13 | −30.7809 | 1.26 | 40.90 | 1.79631 |
| 14 | 125.5814 | (d14 = variable) | | |
| 15 | ∞ | 1.88 | (Stop S) | |
| 16 | 38.5145 | 2.51 | 60.23 | 1.51835 |
| 17 | −15.3596 | 1.26 | 25.35 | 1.80518 |
| 18 | −40.1933 | (d18 = variable) | | |
| 19 | 109.9525 | 2.89 | 25.80 | 1.78472 |
| 20 | −24.7439 | 1.26 | 45.37 | 1.79668 |
| 21 | 617.7218 | 4.63 | | |
| 22 | −12.9093 | 1.51 | 45.37 | 1.79668 |
| 23 | −57.6176 | (Bf) | | |

(VARIABLE SPACIAL DISTANCE)

| f | 38.7990 | 75.3280 | 146.8528 |
|---|---|---|---|
| d3 | 2.2273 | 7.6100 | 14.7855 |
| d9 | 9.7152 | 4.4285 | 1.2558 |

TABLE 30-continued

| d14 | 3.7674 | 7.3613 | 10.3543 |
|---|---|---|---|
| d18 | 7.6555 | 4.0613 | 1.0687 |
| Bf | 14.8873 | 34.1176 | 67.8124 |

(VALUES CORRESPONDING TO CONDITION)

f3 = 25.1163
f4 = 67.3242
β5w = 1.5980
β5t = 3.7098
(32) (f4 − f3)/(f4 + f3) = 0.457
(33) (d2t − d2w)/(d3t − d3w) = 1.284
(34) (Bft − Bfw)/(ft − fw) = 0.490
(35) (β5t/β5w)/(ft/fw) = 0.613
(36) β3t = −1.667

[31st Embodiment]

Figure 39:
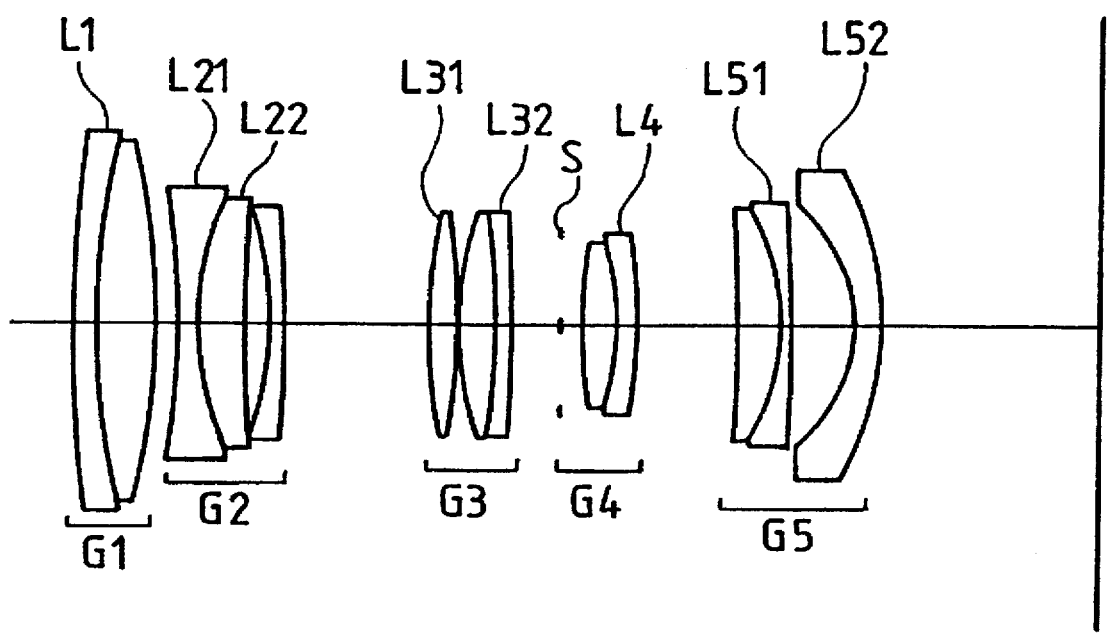
FIG. 39 is a view illustrating a configuration of a variable focal length optical system in a 31st embodiment of the present invention.

FIG. 39 is a view showing the configuration of a variable focal length optical system in a 31st embodiment of the present invention. Viewing from the object side, the first lens group G1 is composed of a positive joint lens L1 consisting of a negative meniscus lens having a convex surface facing the object side and a double convex lens. The second lens group G2 is composed of a joint lens L21 consisting of a double concave lens and a positive meniscus lens having a convex surface facing the object side, and a negative meniscus lens L22 having a concave surface facing the object side. The third lens group G3 is composed of a double convex lens L31 and a joint lens L32 consisting of a double convex lens and a negative meniscus lens having a concave surface facing the object side. The fourth lens group is composed of a positive joint lens L4 consisting of a double convex lens and a negative meniscus lens having a concave surface facing the object side. The fifth lens group G5 is composed of a joint lens L51 consisting of a positive meniscus lens having a concave surface facing the object side and a negative meniscus lens having a concave surface facing the object side, and a negative meniscus lens L52 having a concave surface facing the object side.

Further, a stop S is disposed between the third lens group G3 and the fourth lens group G4, and is moved with the fourth lens group G4 with an air gap therebetween maintained to be unchanged during moving the lens groups from the wide-angle end to the telephoto end.

FIG. 39 shows the positional relationship of the lens groups at the wide-angle end, and they are moved on the optical axis along zoom loci indicated by the arrows in FIG. 1A during moving of the lens groups from the wide-angle end to the telephoto end. Also, the third lens group G3 and the fifth lens group G5 are moved with an air gap therebetween maintained to be unchanged during moving of the lens groups from the wide-angle end to the telephoto end.

Table 31 shows data as to the 31st embodiment.

TABLE 31 f = 38.79 - 75.41 - 134.30 mm
FNO = 4.1 - 6.2 - 9.0
2ω = 62.2 - 31.2 - 17.8°

| Surface Number | Radius of Curvature | Intersurface Distance | Abbe's Number | Refractive Index |
|---|---|---|---|---|
| 1 | 87.6549 | 1.38 | 23.01 | 1.86074 |
| 2 | 39.2015 | 4.40 | 69.98 | 1.51860 |
| 3 | −62.7175 | (d3 = variable) | | |
| 4 | −45.9030 | 1.26 | 53.93 | 1.71300 |
| 5 | 19.5941 | 3.27 | 25.50 | 1.80458 |

TABLE 31-continued

| | | | | |
|---|---|---|---|---|
| 6 | 178.9901 | 1.51 | | |
| 7 | −22.5805 | 1.26 | 45.37 | 1.79668 |
| 8 | −73.6686 | (d8 = variable) | | |
| 9 | 79.3709 | 1.88 | 61.09 | 1.58913 |
| 10 | −67.2061 | 0.13 | | |
| 11 | 20.4984 | 2.51 | 61.09 | 1.58913 |
| 12 | −49.3638 | 1.26 | 33.89 | 1.80384 |
| 13 | −153.4973 | (d13 = variable) | | |
| 14 | ∞ | 1.88 | (Stop S) | |
| 15 | 34.0595 | 2.51 | 60.23 | 1.51835 |
| 16 | −18.5751 | 1.26 | 25.35 | 1.80518 |
| 17 | −76.0016 | (d17 = variable) | | |
| 18 | −67.5899 | 2.89 | 25.35 | 1.80518 |
| 19 | −16.3010 | 1.26 | 45.35 | 1.84042 |
| 20 | −92.0923 | 4.63 | | |
| 21 | −11.0898 | 1.51 | 49.95 | 1.77279 |
| 22 | −22.1015 | (Bf) | | |

(VARIABLE SPACIAL DISTANCE)

| | | | |
|---|---|---|---|
| f | 38.7886 | 75.4066 | 134.3033 |
| d3 | 2.2273 | 8.0410 | 14.2816 |
| d8 | 10.8513 | 4.6265 | 1.2558 |
| d13 | 3.7674 | 6.5729 | 8.7907 |
| d17 | 7.5349 | 4.7295 | 2.5116 |
| Bf | 15.1356 | 33.5467 | 59.9424 |

(VALUES CORRESPONDING TO CONDITION)

f3 = 22.1200
f4 = 95.3080
β5w = 1.7054
β5t = 3.4478
(32) (f4 − f3)/(f4 + f3) = 0.623
(33) (d2t − d2w)/(d3t − d3w) = 1.910
(34) (Bft − Bfw)/(ft − fw) = 0.469
(35) (β5t/β5w)/(ft/fw) = 0.584
(36) β3t = −1.357

Having described specific embodiments of the present invention, it is to be understood that variations will occur to those skilled in the art within the scope of the appended claims.

What is claimed is:

1. A variable focal length optical system comprising in order from an object side:

a first lens group having a positive refractive power;

a second lens group having a negative refractive power;

a third lens group having a positive refractive power;

a fourth lens group having a positive refractive power; and a fifth lens group having a negative refractive power;

at least said first lens group and said fifth lens group being moved toward said object side when said lens groups are moved from a wide-angle end to a telephoto end;

whereby both an air gap along an optical axis between said first lens group and said second lens group and an air gap along an optical axis between said third lens group and said fourth lens group are increased, respectively;

whereby an air gap along an optical axis between said fourth lens group and said fifth lens group is decreased;

wherein the following expression is satisfied:

$$0.4<(Bft-Bfw)/(ft-fw)<0.8$$

where fw is an effective focal length of the optical system at said wide-angle end; ft is an effective focal length of said optical system at said telephoto end; Bfw is a back focus at said wide-angle end; and Bft is a back focus at said telephoto end.

2. A variable focal length optical system according to claim 1, wherein the following expressions are satisfied:

$$0.15 \leq |f2|/f1<0.45$$

$$0.05<(d3t-d3w)/(d4w-d4t)<0.7$$

where f1 is an effective focal length of said first lens group; f2 is an effective focal length of said second lens group; d3w is an air gap between said third and fourth lens groups along an optical axis and at said wide-angle end; d3t is an air gap between said third and fourth lens groups along an optical axis and at said telephoto end; d4w is an air gap between said fourth and fifth lens groups along an optical axis and at said wide-angle end; and d4t is an air gap between said fourth and fifth lens groups along an optical axis and at said telephoto end.

3. A variable focal length optical system according to claim 2, wherein the following expressions are satisfied:

$$0.8<f1/(fw \cdot ft)^{1/2}<1.4$$

$$0.9<f3/f4<2.5$$

$$0.75<f5/f2<2.0$$

where f3 is an effective focal length of said third lens group; f4 is an effective focal length of said fourth lens group; and f5 is an effective focal length of said fifth lens group.

4. A variable focal length optical system according to claim 3, wherein said fifth lens group comprises at least one positive meniscus lens with its concave surface facing said object side, and one negative lens with its concave surface facing said object.

5. A variable focal length optical system according to claim 4, wherein said first lens group and said fifth lens group are moved such that an air gap therebetween is not changed when said lens groups are moved from said wide-angle end to said telephoto end.

6. A variable focal length optical system according to claim 5, wherein said second lens group and said fourth lens group are moved such that an air gap therebetween is not changed when said lens groups are moved from said wide-angle end to said telephoto end.

7. A variable focal length optical system according to claim 4, wherein said second lens group and said fourth lens group are moved such that an air gap therebetween is not changed when said lens groups are moved from said wide-angle end to said telephoto end.

8. A variable focal length optical system according to claim 1, wherein at least said third lens group is moved to perform a focusing operation and wherein the following expressions are satisfied:

$$0.8<f1/(fw \cdot ft)^{1/2}<1.6$$

$$0.6<f5/f2<1.6$$

where f1 is an effective focal length of said first lens group; f2 is an effective focal length of said second lens group; and f5 is an effective focal length of said fifth lens group.

9. A variable focal length optical system comprising in order from an object side:

a first lens group having a positive refractive power;

a second lens group having a negative refractive power;

a third lens group having a positive refractive power;

a fourth lens group having a positive refractive power; and a fifth lens group having a negative refractive power;

at least said first lens group and said fifth lens group being moved toward said object side when said lens groups are moved from a wide-angle end to a telephoto end;

whereby both an air gap along an optical axis between said first lens group and said second lens group and an air gap along an optical axis between said third lens group and said fourth lens group are increased, respectively;

whereby both an air gap along an optical axis between said second lens group and said third lens group and an air gap along an optical axis between said fourth lens group and said fifth lens group are decreased, respectively;

said second lens group and said fourth lens group being moved as a unit, wherein, when an effective focal length f1 of said first lens group is larger than an effective focal length fw of the optical system at said wide-angle end, the following formula is satisfied:

$$0.1 < (ft-f1)/(f1-fw) < 1.2$$

where ft is an effective focal length of said optical system at said telephoto end.

10. A variable focal length optical system comprising in order from an object side:

a first lens group having a positive refractive power;

a second lens group having a negative refractive power;

a third lens group having a positive refractive power;

a fourth lens group having a positive refractive power; and a fifth lens group having a negative refractive power;

at least said first lens group and said fifth lens group being moved toward said object side when said lens groups are moved from a wide-angle end to a telephoto end;

whereby both an air gap along an optical axis between said first lens group and said second lens group and an air gap along an optical axis between said third lens group and said fourth lens group are increased, respectively;

whereby both an air gap along an optical axis between said second lens group and said third lens group and an air gap along an optical axis between said fourth lens group and said fifth lens group are decreased, respectively;

wherein the following expressions are satisfied:

$$0.05 < (f1-f3)/(f1+f3) < 0.6$$

$$0.18 < Bfw/fw < 0.35$$

where f1 is an effective focal length of said first lens group; f3 is an effective focal length of said third lens group; fw is an effective focal length of the optical system at said wide-angle end; and Bfw is a back focus at said wide-angle end.

11. A variable focal length optical system according to claim 10, wherein the following expressions are satisfied:

$$-0.4 < (f3-f4)/(f3+f4) < 0.3$$

$$0.6 < (\beta 5t/\beta 5w) \cdot (fw/ft) < 0.9$$

where f4 is an effective focal length of said fourth lens group; $\beta 5w$ is a lateral magnification of said fifth lens group at said wide-angle end; $\beta 5t$ is a lateral magnification of said fifth lens group at said telephoto end; and ft is an effective focal length of said optical system at said telephoto end.

12. A variable focal length optical system according to claim 11, wherein when said effective focal length f1 of said first lens group is larger than said effective focal length fw of said optical system at said wide-angle end, the following expression is satisfied:

$$0.1 < (ft-f1)/(f1-fw) < 1.2$$

13. A variable focal length optical system according to claim 12, wherein said first lens group and said fifth lens group are moved such that an air gap therebetween is not changed when said lens groups are moved from said wide-angle end to said telephoto end.

14. A variable focal length optical system according to claim 13, wherein said second and fourth lens groups are moved such that an air gap therebetween is not changed when said lens groups are moved from said wide-angle end to said telephoto end.

15. A variable focal length optical system according to claim 10, wherein said second lens group and said fourth lens group are moved such that an air gap therebetween is not changed when said lens groups are moved from said wide-angle end to said telephoto end.

16. A variable focal length optical system according to claim 15, wherein said third lens group comprises a single positive lens.

17. A variable focal length optical system according to claim 16, wherein at least said third lens group is moved when a focusing operation is carried out from a distant object to a close object.

18. A variable focal length optical system according to claim 10, wherein said second lens group consists of a biconcave lens, a positive lens with a convex surface facing said object side, and a negative lens with a concave surface facing said object side.

19. A variable focal length optical system comprising in order from an object side:

a first lens group having a positive refractive power;

a second lens group having a negative refractive power;

a third lens group having a positive refractive power;

a fourth lens group having a positive refractive power; and a fifth lens group having a negative refractive power;

at least said first lens group and said fifth lens group being moved toward said object side when said lens groups are moved from a wide-angle end to a telephoto end;

whereby an air gap along an optical axis between said first lens group and said second lens group is increased;

whereby an air gap along an optical axis between said second lens group and said third lens group and an air gap along an optical axis between said fourth lens group and said fifth lens group are decreased, respectively;

whereby only said third lens group of said optical system is moved toward an image to perform a focusing operation ranging from an object at a long distance to an object at a short distance.

20. A variable focal length optical system according to claim 19, wherein the following expressions are satisfied:

$$0.2 < |f2|/f1 < 0.7$$

$$0.3 < |f2|/f3 < 0.8$$

where f1 is an effective focal length of said first lens group; f2 is an effective focal length of said second lens group; and f3 is an effective focal length of said third lens group.

21. A variable focal length optical system according to claim 20, wherein the following expression is satisfied:

$$-0.4 < ri/ro < 0.5; \; ri < 0$$

where ro is a radius of curvature of a surface of a lens in said third lens group, the surface being nearest to said object side; and ri is a radius of curvature of a surface of a lens which is nearest to an image side.

22. A variable focal length optical system according to claim 21, wherein said second lens group and said fourth lens group are moved such that an air gap therebetween is not changed when said lens groups are moved from said wide-angle end to said telephoto end.

23. A variable focal length optical system according to claim 19, wherein the following expressions are satisfied:

$$-1 < \beta 2w < -0.3$$

$$-0.5 < 1/\beta 3t < 0.2$$

where $\beta 2w$ is a lateral magnification of said second lens group at said wide-angle end; and $\beta 3t$ is a lateral magnification of said third lens group at said telephoto end.

24. A variable focal length optical system according to claim 23, wherein the following expression is satisfied:

$$-0.4 < ri/ro < 0.5; \; ri < 0$$

where ro is a radius of curvature of a surface of a lens in said third lens group, the surface being nearest to said object side; and ri is a radius of curvature of a surface of a lens which is nearest to an image side.

25. A variable focal length optical system according to claim 24, wherein said second lens group and said fourth lens group are moved such that an air gap therebetween is not changed when said lens groups are moved from said wide-angle end to said telephoto end.

26. A variable focal length optical system comprising in order from an object side:

a first lens group having a positive refractive power;

a second lens group having a negative refractive power;

a third lens group having a positive refractive power;

a fourth lens group having a positive refractive power; and a fifth lens group having a negative refractive power;

at least said first lens group and said fifth lens group being moved toward said object side when said lens groups are moved from a wide-angle end to a telephoto end;

whereby both an air gap along an optical axis between said first lens group and said second lens group and an air gap along an optical axis between said third lens group and said fourth lens group are increased, respectively;

whereby an air gap along an optical axis between said fourth lens group and said fifth lens group is decreased;

wherein said second lens group and said fourth lens group are moved to perform a focusing operation such that an air gap therebetween is not changed when said focusing operation is carried out.

27. A variable focal length optical system according to claim 26, wherein the following expression is satisfied:

$$0.4 < (Bft - Bfw)/(ft - fw) < 0.8$$

where fw is an effective focal length of the optical system at said wide-angle end; ft is an effective focal length of said optical system at said telephoto end; Bfw is a back focus at said wide-angle end; and Bft is a back focus at said telephoto end.

28. A variable focal length optical system according to claim 27, wherein the following expressions are satisfied:

$$0.2 < |f2|/f1 < 0.6$$

$$-0.3 < (f3-f4)/(f3+f4) < 0.5$$

where f1 is an effective focal length of said first lens group; f2 is an effective focal length of said second lens group; f3 is an effective focal length of said third lens group; and f4 is an effective focal length of said fourth lens group.

29. A variable focal length optical system according to claim 28, wherein said second lens group and said fourth lens group are moved such that an air gap therebetween is not changed when said lens groups are moved from said wide-angle end to said telephoto end.

30. A variable focal length optical system according to claim 29, wherein said first lens group and said fifth lens group are moved such that an air gap therebetween is not changed when said lens groups are moved from said wide-angle end to said telephoto end.

31. A variable focal length optical system according to claim 19, and wherein the following expressions are satisfied:

$$0.15 < f3/f1 < 0.7$$

$$0.1 < (d2w-d2t)/(dlt-dlw) < 0.85$$

where f1 is an effective focal length of said first lens group; f3 is an effective focal length of said third lens group; d1w is an air gap between said first lens group and said second lens group at said wide-angle end and along an optical axis; dlt is an air gap between said first lens group and said second lens group at said telephoto end and along an optical axis; d2w is an air gap between said second lens group and said third lens group at said wide-angle end and along an optical axis; and d2t is an air gap between said second lens group and said third lens group at said telephoto end and along an optical axis.

32. A variable focal length optical system according to claim 36, wherein the following expression is satisfied:

$$0.8 < \beta 4t/\beta 4w < 2.5$$

where $\beta 4w$ is a lateral magnification of said fourth lens group at said wide-angle end; and $\beta 4t$ is a lateral magnification of said fourth lens group at said telephoto end.

33. A variable focal length optical system according to claim 32, wherein the following expression is satisfied:

$$0.4 < (Bft-Bfw)/(ft-fw) < 0.8$$

where fw is an effective focal length of the optical system at said wide-angle end; ft is an effective focal length of said optical system at said telephoto end; Bfw is a back focus at said wide-angle end; and Bft is a back focus at said telephoto end.

34. A variable focal length optical system comprising in order from an object side:

a first lens group having a positive refractive power;

a second lens group having a negative refractive power;

a third lens group having a positive refractive power;

a fourth lens group having a positive refractive power; and a fifth lens group having a negative refractive power, wherein, when said lens groups are moved from a wide-angle end to a telephoto end, at least said first lens group and said fifth lens group are moved toward the object side such that an air gap between said first lens group and said second lens group is increased, an air gap between said third lens group and said fourth lens group is increased and an air gap between said fourth lens group and said fifth lens group is decreased, and when said lens groups are moved from said wide-angle end to said telephoto end, said third lens group and said fifth lens group are moved such that an air gap therebetween is not changed, wherein the following formula is satisfied:

$$0.4 < (Bft - Bfw)/(ft - fw) < 0.8$$

wherein Bfw is a back focus at said wide-angle end; Bft is a back focus at said telephoto end, fw is an effective focal length of the optical system at said wide-angle end; and ft is an effective focal length of said optical system at said telephoto end.

35. A variable focal length optical system according to claim 34, wherein the following espressions are satisfied:

$$0.2 < (f4-f3)/(f4+f3) < 8$$

$$1 < (d2t-d2w)/(d3t-d3w) < 3$$

wherein f3 is an effective focal length of said third lens group; f4 is an effective focal length of said fourth lens group; d2w is an air gap along an optical axis between said second lens group and said third lens group at said wide-angle end; d2t is an air gap along the optical axis between said second lens group and said third lens group at said telephoto end; d3w is an air gap along the optical axis between said third lens group and said fourth lens group at said wide-angle end; and d3t is an air gap along the optical axis between said third lens group and said fourth lens group at said telephoto end.

36. A variable focal length optical system according to claim 35, wherein the following expressions is satisfied:

$$0.3 < (\beta 5t/\beta 5w)/(ft/fw) < 0.8$$

wherein β5w is a lateral magnification of said fifth lens group at said wide-angle end; and β5t is a lateral magnification of said fifth lens group at said telephoto end.

37. A variable focal length optical system comprising in order from an object side:

a first lens group having a positive refractive power;

a second lens group having a negative refractive power;

a third lens group having a positive refractive power;

a fourth lens group having a positive refractive power; and a fifth lens group having a negative refractive power;

wherein, when said lens groups are moved from a wide-angle end to a telephoto end, at least said first lens group and said fifth lens group are moved toward the object side such that an air gap between said first lens group and said second lens group is increased, an air gap between said third lens group and said fourth lens group is increased, and an air gap between said fourth lens group and said fifth lens group is decreased;

wherein the following expression is satisfied:

$$-3 < \beta 3t < -1$$

where β3t is a lateral magnification of said third lens group at said telephoto end.

38. A variable focal length optical system according to claim 37, wherein the following expression is satisfied:

$$0.4 < (Bft - Bfw)/(ft - fw) < 0.8$$

wherein Bfw is a back focus at said wide-angle end; Bft is a back focus at said telephoto end; fw is an effective focal length of the optical system at said wide-angle end; and ft is an effective focal length of said optical system at said telephoto end.

39. A variable focal length optical system according to claim 38, wherein, when said lens groups are moved from said wide-angle end to said telephoto end, said third lens group and said fifth lens group are moved such that an air gap therebetween is not changed.

40. A variable focal length optical system comprising in order from an object side:

a first lens group having a positive refractive power;

a second lens group having a negative refractive power;

a third lens group having a positive refractive power;

a fourth lens group having a positive refractive power; and a fifth lens group having a negative refractive power;

at least said first lens group and said fifth lens group being moved toward said object side when said lens groups are moved from a wide-angle end to a telephoto end;

whereby an air gap along an optical axis between said first lens group and said second lens group is increased;

whereby an air gap along an optical axis between said second lens group and said third lens group and an air gap along an optical axis between said fourth lens group and said fifth lens group are decreased, respectively;

wherein said second lens group, said third lens group, and said fourth lens group are moved toward an object to perform a focusing operation ranging from an object at a long distance to an object at a short distance.

41. A variable focal length optical system according to claim 40, wherein said second lens group, said third lens group, and said fourth lens group are moved toward an object to perform a focusing operation ranging from an object at a long distance to an object at a short distance as a unit; and wherein the following formulas are satisfied:

$$0.15 < |f2|/f1 < 0.5$$

$$0.4 < (Bft - Bfw)/(ft - fw) < 0.8$$

$$-0.25 < (f3-f4)/(f3+f4) < 0.4$$

where f1 is an effective focal length of said first lens group; f2 is an effective focal length of said second lens group; f3 is an effective focal length of said third lens group; f4 is an effective focal length of said fourth lens group; fw is an effective focal length of the optical system at said wide-angle end; ft is an effective focal length of said optical system at said telephoto end; Bfw is a back focus at said wide-angle end; and Bft is a back focus at said telephoto end.

42. A variable focal length optical system according to claim 41, wherein said second lens group and said fourth lens group are moved such that an air gap therebetween is not changed when said focusing operation is carried out.

43. A variable focal length optical system according to claim 42, wherein the following expressions are satisfied:

$$0.8 < f5/(fW \cdot ft)^{1/2} < 1.4$$

$$0.75 < f5/f2 < 2.0$$

where f5 is an effective focal length of said fifth lens group.

44. A variable focal length optical system according to claim 28, wherein said second lens group and said fourth lens group are moved such that an air gap therebetween is not changed when said lens groups are moved from said wide-angle end to said telephoto end.

45. A variable focal length optical system according to claim 44, wherein said first lens group and said fifth lens group are moved such that an air gap therebetween is not changed when said lens groups are moved from said wide-angle end to said telephoto end.

46. A variable focal length optical system comprising in order from an object side:

a first lens group having a positive refractive power;

a second lens group having a negative refractive power;

a third lens ground having a positive refractive power;

a fourth lens ground having a positive refractive power; and a fifth lens group having a negative refractive power;

at least said first lens group and said fifth lens group being moved toward said object side when said lens groups are moved from a wide-angle end to a telephoto end;

whereby an air gap along an optical axis between said first lens group and said second lens group is increased;

whereby an air gap along an optical axis between said second lens group and said third lens group and an air gap along an optical axis between said fourth lens group and said fifth lens group are decreased, respectively;

wherein said fourth lens group is moved to perform a focusing operation ranging from an object at a long distance to an object at a short distance; and wherein the following formulas are satisfied:

$$0.15 < f3/f1 < 0.7$$

$$0.1 < (d2w-d2t)/(dlt-dlw) < 0.85$$

where f1 is an effective focal length of said first lens group; f3 is an effective focal length of said third lens group; dlw is an air gap along an optical axis between said first lens group and said second lens group at said wide-angle end; dlt is an air gap along an optical axis between said first lens group and said second lens group at said telephoto end; d2w is an air gap along an optical axis between said second lens group and said third lens group at said wide-angle end; and d2t is an air gap along an optical axis between said second lens group and said third lens group at said telephoto end.

47. A variable focal length optical system according to claim 46, wherein the following formula is satisfied:

$$0.8 < \beta 4t/\beta 4w < 2.5$$

where β4w is a lateral magnification of said fourth lens group at said wide-angle end; and β4t is a lateral magnification of said fourth lens group at said telephoto end.

48. A variable focal length optical system according to claim 47, wherein the following formula is satisfied:

$$0.4 < (Bft-Bfw)/(ft-fw) < 0.8$$

where fw is an effective focal length of the optical system at said wide-angle end; ft is an effective focal length of said optical system at said telephoto end; Bfw is a back focus at said wide-angle end; and Bft is a back focus at said telephoto end.

* * * * *